United States Patent
Sugimoto et al.

(10) Patent No.: US 6,470,140 B1
(45) Date of Patent: Oct. 22, 2002

(54) OPTICAL DISC OPTICAL DISC RECORDING AND REPRODUCING APPARATUS, AND OPTICAL DISC RECORDING AND REPRODUCING METHOD

(75) Inventors: Noriko Sugimoto, Hyogo; Tomoyuki Okada, Osaka; Kaoru Murase, Nara; Kazuhiro Tsuga, Hyogo, all of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/522,007

(22) Filed: Mar. 9, 2000

(30) Foreign Application Priority Data

Mar. 10, 1999 (JP) .......................... 11-062760

(51) Int. Cl.[7] .............................. H04N 5/91
(52) U.S. Cl. .................. 386/95; 386/125; 386/126
(58) Field of Search .................. 386/125–126, 386/95, 46, 98, 52, 55, 124, 110, 102; H04N 5/91

(56) References Cited

U.S. PATENT DOCUMENTS

| | | | |
|---|---|---|---|
| 5,568,461 A | 10/1996 | Nishiuchi et al. | |
| 6,266,483 B1 * | 7/2001 | Okada et al. | 386/126 |
| 6,360,056 B1 * | 3/2002 | Ando et al. | 386/95 |

FOREIGN PATENT DOCUMENTS

| | | |
|---|---|---|
| EP | 0346979 | 12/1989 |
| EP | 0673034 | 9/1995 |
| EP | 0686973 | 12/1995 |
| EP | 0903738 | 3/1999 |
| EP | 0903744 | 3/1999 |
| GB | 2332976 | 7/1999 |
| JP | 2-35683 | 2/1990 |
| JP | 4-242866 | 8/1992 |
| JP | 07093873 | 4/1995 |
| JP | 08007282 | 1/1996 |
| JP | 9-17159 | 1/1997 |
| JP | 9-73761 | 3/1997 |
| JP | 9-106631 | 4/1997 |
| JP | 11-213628 | 8/1999 |
| WO | 97/06531 | 2/1997 |
| WO | 98/39918 | 9/1998 |

OTHER PUBLICATIONS

Patent Abstracts of Japan, vol. 1997, No. 17, Jul. 31, 1997 & JP 09 073761 A (Toshiba Corp.), Mar. 18, 1997.

* cited by examiner

*Primary Examiner*—Vincent Boccio
(74) *Attorney, Agent, or Firm*—Wenderoth, Lind & Ponack, L.L.P.

(57) ABSTRACT

An optical disc recorder and player enable entry points to be set as desired in a plurality of logically meaningful reproduction paths to skip to various points as desired in any of the possible paths. The optical disc recorder and player use information about a plurality of of independent reproduction paths, and management information having a plurality of reproduction entry points for each of the reproduction paths, thereby efficiently utilizing the random access capability unique to disc media.

15 Claims, 55 Drawing Sheets

Fig. 7

| VERN | | | | | | | |
|---|---|---|---|---|---|---|---|
| b15 | b14 | b13 | b12 | b11 | b10 | b9 | b8 |
| | | | reserved | | | | |
| b7 | b6 | b5 | b4 | b3 | b2 | b1 | b0 |
| | | | Book version | | | | |

| TM_ZONE | | | | | | | |
|---|---|---|---|---|---|---|---|
| b15 | b14 | b13 | b12 | b11 | b10 | b9 | b8 |
| | TZ_TY | | | | TZ_OFFSET[11..8] | | |
| b7 | b6 | b5 | b4 | b3 | b2 | b1 | b0 |
| | | | TZ_OFFSET[7..0] | | | | |

Fig.9

| PL_TY | | | | | | | |
|---|---|---|---|---|---|---|---|
| b7 | b6 | b5 | b4 | b3 | b2 | b1 | b0 |
| PL_TY1 | | | | reserved | | | |

| PL_CREATE_TM | | | | | | | |
|---|---|---|---|---|---|---|---|
| b39 | b38 | b37 | b36 | b35 | b34 | b33 | b32 |
| b31 | b30 | b29 | b28 | b27 | b26 | b25 | b24 |
| b23 | b22 | b21 | b20 | b19 | b18 | b17 | b16 |
| Month[1..0] | | Year[5..0] | | | | | Month[3..2] |
| b15 | b14 | b13 | b12 | b11 | b10 | b9 | b8 |
| Hour[3..0] | | | Day[4..0] | | | | Hour[4] |
| b7 | b6 | b5 | b4 | b3 | b2 | b1 | b0 |
| Minute[1..0] | | Second[5..0] | | | | | |

Fig.10

| PTM describing format | | | | | | | |
|---|---|---|---|---|---|---|---|
| b47 | b46 | b45 | b44 | b43 | b42 | b41 | b40 |
| b39 | b38 | b37 | b36 | b35 | b34 | b33 | b32 |
| b31 | b30 | b29 | b28 | b27 | b26 | b25 | b24 |
| b23 | b22 | b21 | b20 | b19 | b18 | b17 | b16 |
| b15 | b14 | b13 | b12 | b11 | b10 | b9 | b8 |
| b7 | b6 | b5 | b4 | b3 | b2 | b1 | b0 |

PTM_base[31..24]
PTM_base[23..16]
PTM_base[15..8]
PTM_base[7..0]
PTM_extension[15..8]
PTM_extension[7..0]

Fig. 11

| S_VOB_ENTN describing format | | | | | | | |
|---|---|---|---|---|---|---|---|
| b47 | b46 | b45 | b44 | b43 | b42 | b41 | b40 |
| b39 | b38 | b37 | b36 | b35 | b34 | b33 | b32 |
| S_VOB_ENTN | | | | | | | |
| b31 | b30 | b29 | b28 | b27 | b26 | b25 | b24 |
| reserved | | | | | | | |
| b23 | b22 | b21 | b20 | b19 | b18 | b17 | b16 |
| reserved | | | | | | | |
| b15 | b14 | b13 | b12 | b11 | b10 | b9 | b8 |
| reserved | | | | | | | |
| b7 | b6 | b5 | b4 | b3 | b2 | b1 | b0 |
| reserved | | | | | | | |

Fig.13

| V_ATR | | | | | | | |
|---|---|---|---|---|---|---|---|
| b15 | b14 | b13 | b12 | b11 | b10 | b9 | b8 |
| Video compression | line21_ switch_2 | TV system | | Aspect ratio | | Application Flag | |
| b7 | b6 | b5 | b4 | b3 | b2 | b1 | b0 |
| line21_ switch_1 | | | Video resolution | | | reserved | |

| A_ATR0/1 | | | | | | | |
|---|---|---|---|---|---|---|---|
| b23 | b22 | b21 | b20 | b19 | b18 | b17 | b16 |
| | Audio coding mode | | reserved | Preference Flag | | Application Flag | |
| b15 | b14 | b13 | b12 | b11 | b10 | b9 | b8 |
| Quantization/DRC | | fs | | | Number of Audio channels | | |
| b7 | b6 | b5 | b4 | b3 | b2 | b1 | b0 |
| Bitrate | | | | | | | |

*Fig.14*

| SP_PLT | | | | | | | |
|---|---|---|---|---|---|---|---|
| | b23 | b22 | b21 | b20 | b19 | b18 | b17 | b16 |
| | | b14 | b13 | b12 | b11 | b10 | b9 | b8 |
| | | b6 | b5 | b4 | b3 | b2 | b1 | b0 |

(Note: row cells show: b23, b22, b21, b20, b19, b18, b17, b16 — Luminance signal (Y); b15, b14, b13, b12, b11, b10, b9, b8 — Color difference signal (Cr=R−Y); b7, b6, b5, b4, b3, b2, b1, b0 — Color difference signal (Cb=B−Y).)

Fig. 17

| VOB_TY | | | | | | | |
|---|---|---|---|---|---|---|---|
| b15 | b14 | b13 | b12 | b11 | b10 | b9 | b8 |
| TE | A0_STATUS | | A1_STATUS | | reserved | | |
| b7 | b6 | b5 | b4 | b3 | b2 | b1 | b0 |
| SML_FLG | A0_GAP_LOC | | A1_GAP_LOC | | reserved | | |

Fig.19

| VOBU_ENT | b23 | b22 | b21 | b20 | b19 | b18 | b17 | b16 |
|---|---|---|---|---|---|---|---|---|
| | b15 | b14 | b13 | b12 | b11 | b10 | b9 | b8 |
| | | | | 1STREF_SZ | | | | |
| | b7 | b6 | b5 | b4 | b3 | b2 | b1 | b0 |
| | | | VOBU_PB_TM | | | | VOBU_SZ(upper) | |
| | | | | | | VOBU_SZ(lower) | | |

Fig.22

V_ATR

| b15 | b14 | b13 | b12 | b11 | b10 | b9 | b8 |
|---|---|---|---|---|---|---|---|
| Video compression mode | | TV system | | Aspect ratio | | | reserved |
| b7 | b6 | b5 | b4 | b3 | b2 | b1 | b0 |
| reserved | | Video resolution | | | reserved | | |

OA_ATR

| b15 | b14 | b13 | b12 | b11 | b10 | b9 | b8 |
|---|---|---|---|---|---|---|---|
| Audio coding mode | | | | reserved | | | |
| b7 | b6 | b5 | b4 | b3 | b2 | b1 | b0 |
| Quan./DRC | | fs | | | | Number of Audio channels | |

Fig.23

| SP_PLT | | | | | | | | |
|---|---|---|---|---|---|---|---|---|
| | b23 | b22 | b21 | b20 | b19 | b18 | b17 | b16 |
| | | | | Luminance signal(Y) | | | | |
| | b15 | b14 | b13 | b12 | b11 | b10 | b9 | b8 |
| | | | | Color difference signal(Cr=R−Y) | | | | |
| | b7 | b6 | b5 | b4 | b3 | b2 | b1 | b0 |
| | | | | Color difference signal(Cb=B−Y) | | | | |

Fig.25

| S_VOB ENT (TYPE A) | 2bytes |
|---|---|
| S_VOB ENT_TY | 1byte |
| V_PART_SZ | 1byte |

| S_VOB ENT (TYPE B) | 6bytes |
|---|---|
| S_VOB_ENT_TY | 1byte |
| V_PART_SZ | 1byte |
| A_PART_SZ | 2bytes |
| A_PB_TM | 2bytes |

Fig.26

| S_VOB_ENT_TY | | | | | | | |
|---|---|---|---|---|---|---|---|
| b7 | b6 | b5 | b4 | b3 | b2 | b1 | b0 |
| MAP_TY | | TE | reserved | | | | SPST_Ns |

Fig.29

| AA_TY | b7 | b6 | b5 | b4 | b3 | b2 | b1 | b0 |
|---|---|---|---|---|---|---|---|---|
| reserved | | | TE | reserved | | | | |

*Fig.33*

| PG_TY | b7 | b6 | b5 | b4 | b3 | b2 | b1 | b0 |
|---|---|---|---|---|---|---|---|---|
| Protect | | | | reserved | | | | |

Fig.35

| C_TY | b7 | b6 | b5 | b4 | b3 | b2 | b1 | b0 |
|------|----|----|----|----|----|----|----|----|
|      |    | C_TY1 |  | reserved | | | | |

Fig.36

| M_C_EPI (Type A) | 7bytes |
|---|---|
| EP_TY | 1byte |
| EP_PTM | 6bytes |

| M_C_EPI (Type B) | 135bytes |
|---|---|
| EP_TY | 1byte |
| EP_PTM | 6bytes |
| PRM_TXTI | 128bytes |

| S_C_EPI (Type A) | 2bytes |
|---|---|
| EP_TY | 1byte |
| S_VOB_ENTN | 1byte |

| S_C_EPI (Type B) | 130bytes |
|---|---|
| EP_TY | 1byte |
| S_VOB_ENTN | 1byte |
| PRM_TXTI | 128bytes |

Fig.37

| EP_TY1 |   |   |   |   |   |   |   |
|--------|---|---|---|---|---|---|---|
| b7     | b6 | b5 | b4 | b3 | b2 | b1 | b0 |
| EP_TY1 | reserved | | | | | | |

Fig.43A VIDEO
Fig.43B VIDEO BUFFER
Fig.43C MPEG STREAM
Fig.43D AUDIO

Fig.49

491 REPRODUCTION FROM ENTRY POINT

492 DETERMINE PGC NUMBER, CELL NUMBER AND ENTRY NUMBER WHICH START REPRODUCTION

493 DETERMINED CELL TYPE

— STILL PICTURE →

— MOVING PICTURE ↓

494 SPECIFY EP_PTM IN M_C_EPI DETERMINED BY ENTRY POINT NUMBER

495 SPECIFY CORRESPONDING M_VOBI FROM M_CI DETERMINED BY CELL NUMBER

496 CONVERT EP_PTM TO ADDRESS USING TMAPI (TMAP) POSSESSED BY M_VOBI

497 SPECIFY S_VOB_ENTN IN S_C_EPI DETERMINED BY ENTRY POINT NUMBER

498 SPECIFY THE CORRESPONDING S_VOGI FROM THE S_CI DETERMINED BY THE CELL NUMBER

499 CONVERT S_VOB_ENTN TO ADDRESS USING V_PART_S2 (VOB ENTRY) POSSESSED BY S_VOGI

500 START DECODING BY SPECIFYING ADDRESS

END

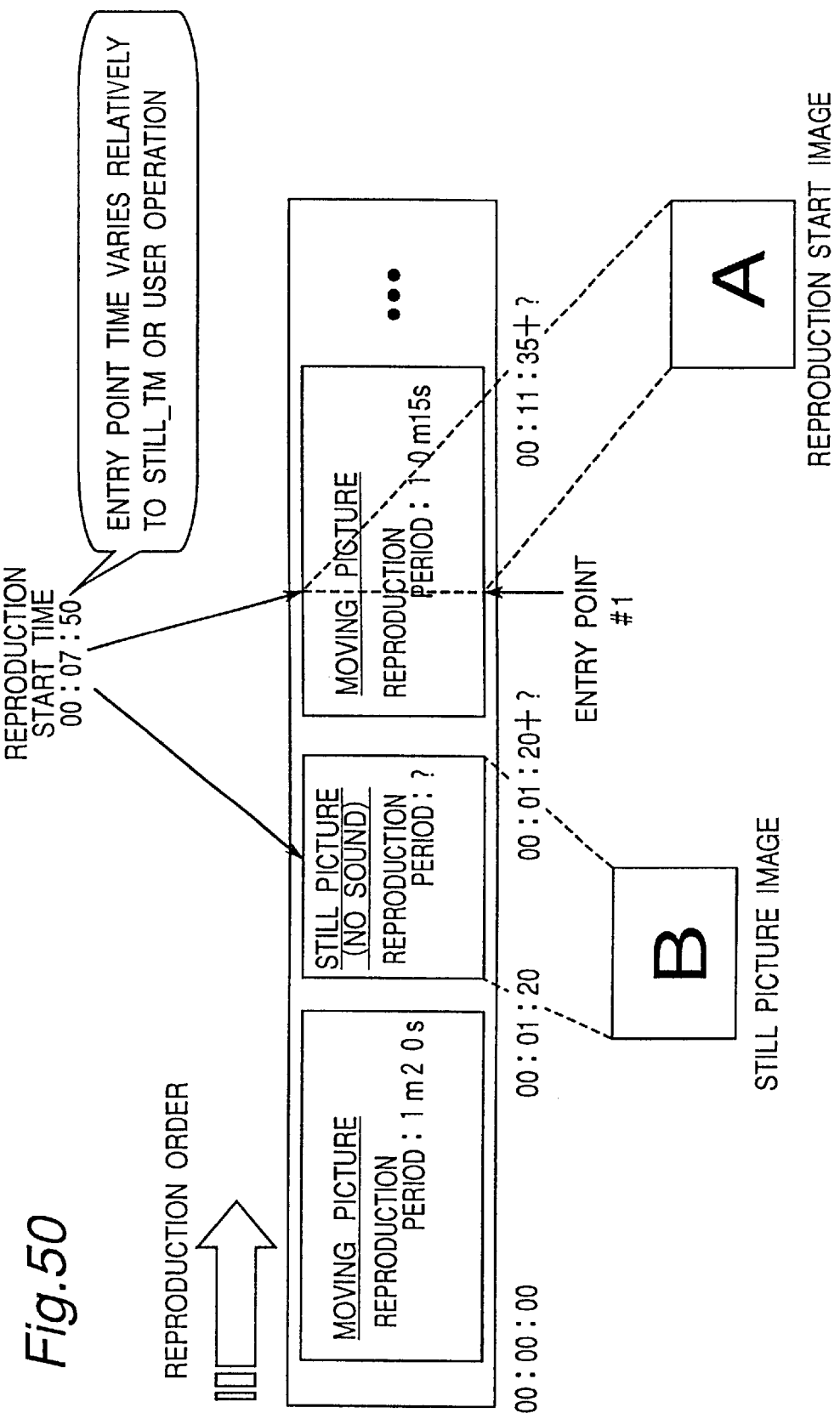

Fig.55

REPRODUCTION PATH [ATHLETIC MEET]

[ENTRY POINT LIST]

| No. | TEST INFORMATION | TARGET PICTURE / STREAM |
|---|---|---|
| 1 | ATHLETIC MEET | S |
| 2 | ENTRANCE MARCH | M |
| 3 | 100m DASH | M |
| 4 | | M |
| 5 | CHEERING BATTLE | S |

OPTICAL DISC OPTICAL DISC RECORDING AND REPRODUCING APPARATUS, AND OPTICAL DISC RECORDING AND REPRODUCING METHOD

BACKGROUND OF THE INVENTION

1. Field of the Invention

The present invention relates to a readable and writable optical disc, and to a method for recording and a method for reproducing this optical disc. More particularly, our invention relates to an optical disc for recording multimedia data including moving picture data, still image data, and audio data, and to a method for recording and a method for reproducing this optical disc.

2. Description of the Related Art

Rewritable optical discs have for years had a maximum storage capacity of approximately 650 MB, but this has changed by the development of phase change type DVD-RAM discs with a capacity of several gigabytes. Combined with the adoption of MPEG, and particularly MPEG-2, standards for encoding digital AV data, DVD-RAM is widely anticipated as a recording and reproducing medium with applications in the AV industry, as well as the computer industry. More specifically, DVD-RAM media are expected to replace magnetic tape as the storage medium of choice for AV recordings.

A. DVD-RAM

Increases in the storage density of rewritable optical disc media over the last few years has made it possible to use such media for applications ranging from storing computer data and recording audio data to recording image data, including movies.

The signal recording surface of a conventional optical disc is typically formatted with lands and grooves, one of which is used as a guide groove for signal recording and reproducing. The data signal is then recorded using only the land or the groove. With the advent of the land and groove recording method, however, it became possible to record signals to both the land and groove. This development approximately doubled the storage capacity of the disc (see Japanese Unexamined Patent Application (kokai) 8-7282).

The further development of a zone CLV (constant linear velocity) method simplified and made it easy to implement a CLV recording and reproducing technique, which is an effective means of further increasing the recording density. (See Japanese Unexamined Patent Application (kokai) 7-93873).

A major topic left for future development is how to use such a potentially high capacity optical disc media to record AV data containing image data to achieve new functions and performance far surpassing conventional AV products.

With the introduction of high capacity rewritable optical disc media, optical discs are widely expected to replace conventional tape media for recording and reproducing AV content. The transition from tape to disc recording media is also expected to greatly affect both the performance and functions of AV recording and reproducing products.

One of the greatest benefits of a transition to disc is a significant improvement in random access performance. While random access to tape content is possible, it generally takes on the order of minutes to rewind a full tape. This is several orders slower than the typical seek time of optical disc media, which is on the order of at most several tens of milliseconds. Tape is therefore considered, for practical purposes, not to be a random access medium.

The random access capability of optical disc media has also made possible distributed, that is, noncontiguous, recording of AV data, which is not possible with conventional tape.

FIG. 38 is a block diagram of the drive device of a DVD recorder. As shown in FIG. 38, this DVD recorder comprises an optical pickup 11 for reading data from a disc 10, an ECC (error correction code) processor 12, track buffer 13, switch 14 for changing between track buffer input/output, encoder 15, and decoder 16. An enlarged view of a disc format 17 is also shown.

As indicated by the disc format 17, the smallest unit used for recording data to a DVD-RAM disc is a sector, which is 2 KB. Sixteen sectors are combined as one ECC block, to which the ECC processor 12 applies error correction coding.

The track buffer 13 is used for recording AV data at a variable bit rate in order to record AV data to a DVD-RAM disc more efficiently. While the read/write rate (Va) to a DVD-RAM disc is fixed, the bit rate (Vb) of the AV data is variable, based on the complexity of the AV data content (e.g., images if the AV data is video). The track buffer 13 is used to absorb this bit rate difference. This means that the track buffer 13 is unnecessary if the AV data bit rate is also fixed, as it is in the Video CD format.

This track buffer 13 can be even more effectively used by dispersed placement of the AV data on the disc. This is explained with reference to FIGS. 39(a) and (b).

FIG. 39 (a) shows the disc address space. If the AV data recorded is divided between contiguous area A1 between addresses a1 and a2, and contiguous area A2 between a3 and a4, as shown in FIG. 39 (a), the AV data can be continuously reproduced by supplying data accumulated in the track buffer 13 to the decoder while the optical head seeks from a2 to a3. This is shown in FIG. 39 (b).

Once reading AV data starts from a1 at time t1, it is both input to the track buffer 13 and output from the track buffer 13 with data accumulating in the track buffer at the rate (Va–Vb), that is, the difference between the input rate Va to the track buffer and the output rate Vb from the track buffer. This continues to address a2 at time t2. Assuming that the data volume accumulated to the track buffer at this time is B(t2), data supply to the decoder can continue until the data B(t2) accumulated to the track buffer is depleted at time t3 at which reading resumes from address a3.

In other words, if it is assured that a certain volume of data ([a1, a2]) is read before a seek operation is performed, AV data can be continuously supplied to the decoder while the seek is in progress.

It should be noted that this example considers reading, that is, reproducing, data from DVD-RAM, but the same concept applies for writing or recording data to DVD-RAM.

It will thus be obvious that insofar as a specified amount of data is recorded continuously to a DVD-RAM disc, continuous reproduction and recording is possible even if the AV data is noncontiguously recorded to the disc.

B. MPEG

A common AV data format is described next below.

As noted above, AV data is recorded to DVD-RAM media using the MPEG international standard, also known as ISO/IEC 13818.

Even though DVD-RAM discs have a large, plural gigabyte, capacity, this is still not sufficient for recording uncompressed digital AV data. A way to compress and record AV data is therefore necessary. MPEG (ISO/IEC 13818) is now widely used around the world for AV data compression. MPEG decoders (compression/decompression ICs) have also been realized with advances in IC devices.

This has enabled the DVD recorder to handle MPEG compression and decompression internally.

MPEG signal processing is able to achieve high efficiency data compression chiefly as a result of the following two features.

First is that compression using a time correlation characteristic between frames (known as pictures in MPEG) is used in conjunction with conventional compression using a spatial frequency characteristic for moving picture data compression. Each video sequence of an MPEG video signal stream is divided into one or more groups of pictures, each group of pictures comprising one or more pictures of three different types: I-pictures (intraframe coded pictures), P-pictures (predictive-coded pictures, that is, intracoded with reference to a preceding picture), and B-pictures (bidirectionally predictive-coded pictures, that is, intraframe coded with reference to preceding and following pictures).

FIG. 40 shows the relationship between I, P, and B pictures. As shown in FIG. 40, P-pictures refer to temporally preceding I- or P-pictures in the sequence, while B-pictures refer to the first preceding and following I- or P-pictures. It should also be noted that because B-pictures reference an upcoming I- or P-picture, the display order of the pictures may not match the coding order of the pictures in the compressed data bitstream.

The second feature of MPEG coding is that code size is dynamically allocated by picture unit according to the complexity of the image. An MPEG decoder has an input buffer, and by accumulating data in this decoder buffer, a large amount of code can be allocated to complex images that are difficult to compress.

Three types of audio coding are used for the audio portion of a DVD-RAM recording: MPEG audio with data compression; Dolby Digital® (also known as AC-3); and non-compressive linear pulse code modulation (LPCM). Both Dolby Digital® and LPCM are fixed bit rate coding methods, but MPEG audio coding can select from several compression rates on an audio frame basis, although audio compression is not as high as video stream compression.

The resulting compressed video and audio streams are multiplexed to a single stream using a method known as the MPEG system. FIG. 41 shows the organization of an MPEG system stream. As shown in FIG. 41, each 2 KB sector comprises a pack header 41, packet header 42, and payload 43. The MPEG system thus has a hierarchical structure comprising packs and packets. Each packet comprises a packet header 42 and payload 43. AV data is segmented from the beginning into blocks of an appropriate size for storage to the payload 43.

Referring to the AV data stored in the associated payload 43, the packet header 42 contains a stream ID for identifying the data stored in the associated packet, and a decoding time stamp (DTS) and presentation time stamp (PTS) identifying the decoding time and presentation time of the data contained in the payload in 90 kHz precision. If the decoding and presentation are simultaneous, as in the case of audio data, the DTS can be omitted.

A pack is a unit of plural packets. In DVD-RAM, however, there is one pack for each packet, and each pack therefore comprises a pack header 41 and packet (containing a packet header 42 and payload 43).

The pack header contains a system clock reference (SCR) expressing with 27 MHz precision the time at which the data contained in this pack is input to the decoder buffer.

An MPEG system stream thus comprised is recorded one pack to a sector (=2048 bytes) on DVD-RAM.

A decoder for decoding the above-noted MPEG system stream is described next below. FIG. 42 is a block diagram of an exemplary decoder model (P_STD) of an MPEG system stream decoder. Shown in FIG. 42 are the system time clock (STC) 51, that is, the internal reference clock for decoder operation; a demultiplexer 52 for decoding (demultiplexing) the system stream; video decoder input buffer (video buffer) 53; video decoder 54; re-ordering buffer 55 for temporarily storing I and P pictures for absorbing the difference in the coding (data) sequence and presentation sequence that occurs between B pictures and I and P pictures; a switch 56 for adjusting the output order of the I, P, and B pictures buffered in the re-ordering buffer 55; an audio decoder 58; and audio decoder input buffer (audio buffer) 57.

This MPEG system decoder processes the above-noted MPEG system stream as follows.

When the time indicated by the STC 51 and the SCR written to the pack header match, the pack is input to the demultiplexer 52. The demultiplexer 52 then interprets the stream ID in the packet header, and passes the audio stream and video stream contained in the payload data to the appropriate decoder buffers. The PTS and DTS are also read from the packet header.

When the times indicated by the STC 51 and DTS match, the video decoder 54 reads and decodes the picture data from the video buffer 53. I and P pictures are stored to the re-ordering buffer 55 while B pictures are presented directly to screen. If the picture being decoded by the video decoder 54 is an I or P picture, the switch 56 switches to the re-ordering buffer 55 to output the previous I or P picture from the re-ordering buffer 55; if a B picture is decoded, the switch 56 switches to the video decoder 54.

Similar to the video decoder 54, the audio decoder 58 reads and decodes one audio frame of data from the audio buffer 57 when the PTS matches the STC 51 (a DTS is not recorded for audio data).

An exemplary method of multiplexing an MPEG system stream is described next with reference to FIGS. 43(a) to (d). Note that a sequence of video frames is shown in FIG. 43 (a), the change in data storage to the video buffer is shown in FIG. 43 (b), a typical MPEG system stream is shown in FIG. 43 (c), and an audio signal is shown in FIG. 43 (d). Each of FIGS. 43 (a) to (d) are shown on a common time base (horizontal axis). The vertical axis in FIG. 43 (b) indicates the amount of data stored to the video buffer. The bold line in this graph thus indicates the change over time in the buffered video data volume. The slope of this line is indicative of the video bit rate, and shows that data is input to the video buffer at a constant rate. The decrease in buffered data at regular intervals indicates the progression of data decoding. The intersection of the dotted line extension of the graphed line with the time base (horizontal axis) indicates the time at which video frame transfer to the video buffer begins.

MPEG encoding is described next using by way of example coding a complex image A in the video data stream. As shown in FIG. 43 (b), image A requires a large coding block, and data transfer to the video buffer must therefore begin from a time t1 before the image A decoding time. Note that the time from data input start time t1 to decoding is referred to as vbv_delay below. AV data is thus multiplexed to the position (time) of the shaded video pack.

Unlike video data, audio data does not require dynamic coding size control. It is therefore not necessary for audio data transfer to start before decoding starts, and audio data is thus typically multiplexed only slightly before decoding starts. Video data is thus multiplexed to the MPEG system stream before the audio data.

It should be further noted that data can be accumulated to the buffer for a limited time in the MPEG system. More specifically, the MPEG system standard requires all data other than still image data be output to the decoder from the buffer within one second of being stored to the buffer. This means that there is at most a one second offset between video data and audio data multiplexing (or more precisely, the time required for video frame reordering).

It will also be obvious that while the MPEG system stream is described above with video data preceding the audio, the audio can theoretically precede the video. This type of stream can be purposely generated by using for the video data simple images to which a high compression rate can be applied, and transferring the audio data earlier than required. Even in this case, however, the audio can precede the video by at most one second due to the restrictions imposed by the MPEG standard.

Video CD

Video CD, a moving picture format incorporating an entry point concept for playback control, is described next.

The Video CD standard was published in 1993. Version 2.0 of the standard, incorporating a playback control feature, was released the following year in 1994. The video CD can store a maximum 74 minutes of video compressed using the MPEG-1 standard, together with a maximum of 2000 high resolution still images (704×480 dots). A simple menu is compiled by the playback control function so that the presented content can be controlled to display only a required segment or so that a user can select specific content for display.

The Video CD format allows recording of absolute addresses on the disc as "entry points." An entry point is a specific address where the playback path can be entered to begin playback. Entry points can be achieved by using address information and time information. By using entry points, it is possible for playback to jump to a specifically recorded absolute address when playback reaches an entry point in the playback path, and the disc player can thus be controlled to jump from point to point in the disc content.

The Video CD format, however, requires a 1:1 correlation between entry points and the bitstream, and cannot use independent entry points to a plurality of reproduction paths.

In addition, Video CD is a non-writable medium, which means that the user cannot add or delete entry points to the content. The user therefore cannot create a reproduction path or entry points with logical meaning, and cannot make effective use of the disc's random accessibility.

Digital Video

Digital video tape, and particularly the Digital Video Cassette Tape Recorder (DVC) medium that has become most popular, is described next.

Published in 1994, the DVC standard records and reproduces at 19 Mb/s to 30 Mb/s using discrete cosine transform (DCT) and variable length coding (VLC) for image compression and signal processing.

The subcode data recorded with the video data can include, in the DVC format, the track number (Title Time Code) indicative of the recording time from the first recorded frame at the beginning of the tape, a time code (Rec Date) indicating the date the recording was made, and a time code (Rec Time) indicating the time the recording was made. This makes it possible to detect interruptions in the time code and use these interruptions as entry points to the content.

The drawback to this scheme is that because management information such as is used by a computer is not present, it is not possible to freely set a desired time as an entry point from which playback is possible.

Another obvious drawback to DVC is it is a tape-based medium. Random access performance is thus poor, and plural reproduction paths cannot be achieved.

To use plural reproduction paths or selectable entry points with DVC type media, the reproduction device must have memory to store this data, and the data cannot be used on different reproduction devices.

The introduction of DVD-RAM media solves the problem of random access performance present in DVC media, and makes it possible to achieve a new consumer AV product whereby entry points to plural reproduction paths on a Video CD can be freely used.

Problem to be Solved

The object of the present invention is to provide a DVD recorder that solves the following problems including the hindrance of obtaining maximum performance from DVD-RAM media, a high capacity rewritable storage medium widely anticipated as the next generation in AV recording media.

That is, the greatest problem in recording entry points to a plurality of reproduction paths and using these entry points for reproduction on a DVD recorder is how to best utilize the unique random accessibility of the disc medium to set individual entry points as desired to any of a plurality of reproduction paths, thus achieving functionality that is not possible with tape media.

SUMMARY OF THE INVENTION

To resolve the above problem, in an optical disc for recording a program stream of audio-visual content and management information for managing the program stream, the management information preferably comprises, according to the present invention: information (C_V_S_PTM) for specifying a start time of the program stream; information (C_V_E_PTM) for specifying an end time of the program stream; and entry point information (M_C_EPI/S_C_EPI) for accessing the program stream at a desired point, and reproducing the program stream from the desired point.

It is therefore not necessary with an optical disc according to the present invention for entry point information to be incorporated into the program stream itself.

When the program stream is moving picture content, the entry point information is preferably time information (EP_PTM). Using time information makes it possible to determine the distance (time) from the beginning of the reproduction path. When the program stream is still image content, the entry point information is preferably still image number information (S_VOB_ENTN). This still image number information represents the number of the still image in the bitstream, and therefore, makes it possible to determine how far from the beginning of the reproduction path.

Yet further preferably, the entry point information also includes text information (PRM_TXTI). By also including text information, the content of a desired access point can be displayed.

In a further optical disc for recording a program stream of audio-visual content, and management information for managing the program stream, the management information contains, according to the present invention: information (C_V_S_PTM) for specifying a first start time of the program stream; information (C_V_E_PTM) for specifying a first end time of the program stream; and first entry point information (M_C_EPI/S_C_EPI) for accessing the program stream at a desired point and reproducing the program stream from the desired point when reproducing the program stream from the first start time to the first end time; information (C_V_S_PTM) for specifying a second start time of the program stream; information (C_V_E_PTM) for specifying a second end time of the program stream; and second entry point information (M_C_EPI/S_C_EPI) for accessing the program stream at a desired point and reproducing the program stream from the desired point when reproducing the program stream from the second start time to the second end time.

There are cases when the program stream segment defined as a first reproduction path from the first start time to the first end time, and the program stream segment defined as a second reproduction path from the second start time to the second end time, overlap. However, even if these first and second reproduction paths overlap, entry point information can be individually and separately set for both paths. Entry points set for the first reproduction path therefore do not work on the second reproduction path.

The present invention further relates to an optical disc player for reproducing an optical disc according to the present invention as described above. The optical disc player comprises: a storage means (7802) for reading and storing entry point information from the optical disc; a decoder (7806) for decoding the program stream and generating address information during program stream reproduction; a conversion means (7802) for converting the address information to point information in the program stream; a selection means (7802) for selecting entry point information closest to the point information; a conversion means (7802) for converting the selected entry point information to address information; and a drive means (7808) for jumping to a location based on the converted address information. The decoder decodes and reproduces from the jump destination.

In the optical disc player, the point information is preferably time information (EP_PTM) when the program stream is moving picture content.

Further preferably, when the program stream is still image content the point information is still image number information (S_VOB_ENTN).

Yet further preferably, the entry point information further includes text information (PRM_TXTI), and the decoder further reproduces the text information.

The present invention can be further expressed as a playback method for playing back an optical disc where the optical disc is an optical disc according to the present invention as described above. This playback method includes reading and storing entry point information from the optical disc; decoding the program stream and generating address information during program stream reproduction; converting the address information to point information in the program stream; selecting entry point information closest to the point information; converting the selected entry point information to address information;jumping to a location based on the converted address information; and decoding and reproducing from the jump destination.

The present invention also provides an optical disc recorder for recording to an optical disc according to the present invention as described above. The optical disc recorder comprises: an interface (7801) for receiving entry point information input; means (7804, 7806) for generating address information at the time the entry point information is received; a conversion means (7802) for converting the address information to entry point information in the program stream; a storage means (7802) for temporarily storing the entry point information; and a drive means (7808) for recording the stored entry point information to the optical disc.

As noted above, when the program stream is moving picture content, the point information of this optical disc recorder is preferably time information (EP_PTM).

Yet further preferably, the point information is still image number information (S_VOB_ENTN) when the program stream is still image content.

Yet further preferably, the entry point information further includes text information (PRM_TXTI), and the storage means generates and stores the text information.

The invention also provides a recording method for an optical disc according to the present invention as described above. This recording method comprises receiving entry point information input; generating address information at the time the entry point information is received; converting the address information to entry point information in the program stream; temporarily storing the entry point information; and recording the stored entry point information to the optical disc.

BRIEF DESCRIPTION OF THE DRAWINGS

These and other objects and features of the present invention will be readily understood from the following detailed description taken in conjunction with preferred embodiments thereof with reference to the accompanying drawings, in which like parts are designated by like reference numerals and in which:

FIG. 7 shows the structure of the VERN and TM_ZONE format;

FIG. 9 shows the structure of the PL_TY and PL_CREATE format;

FIG. 10 shows the structure of the PTM recording format;

FIG. 11 shows the structure of the S_VOB_ENTN recording format;

FIG. 13 shows the structure of the V_ATR and A_ATR format;

FIG. 14 shows the structure of the movie SP_PLT format;

FIG. 17 shows the structure of the VOB_TY format;

FIG. 19 shows the structure of the VOBU_ENT format;

FIG. 22 shows the structure of the V_ATR and OA_ATR format;

FIG. 23 shows the structure of the still image SP_PLT format;

FIG. 25 shows the structure of the S_VOB_ENT block;

FIG. 26 shows the structure of the S_VOB_ENT_TY format;

FIG. 29 shows the structure of the AA_TY format;

FIG. 33 shows the structure of the PG_TY format;

Figure 35:
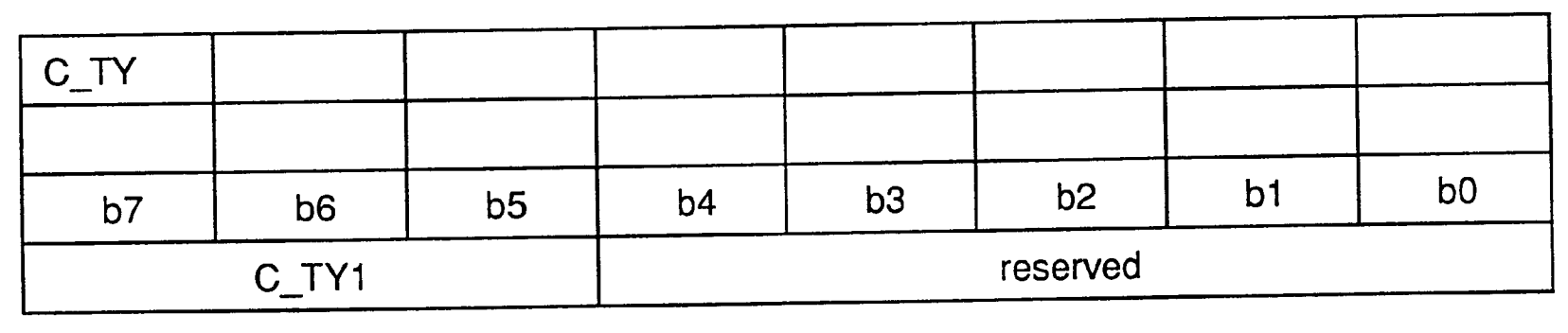

FIG. 35 shows the structure of the C_TY format;

FIG. 36 shows the structure of the C_EPI block;

FIG. 37 shows the structure of the EP_TY1 format;

FIG. 49 is a flow chart of entry point reproduction;

FIG. 50 is used to describe entry point reproduction in a reproduction path containing a still image;

FIG. 55 is an exemplary display of entry point types to a bitstream in a DVD recorder shown in FIG. 46.

DESCRIPTION OF THE PREFERRED EMBODIMENTS

A DVD recorder and DVD-RAM disc are described below as a preferred embodiment of the present invention with reference to the accompanying Figures.

Logical Structure of DVD-RAM

Figure 1:
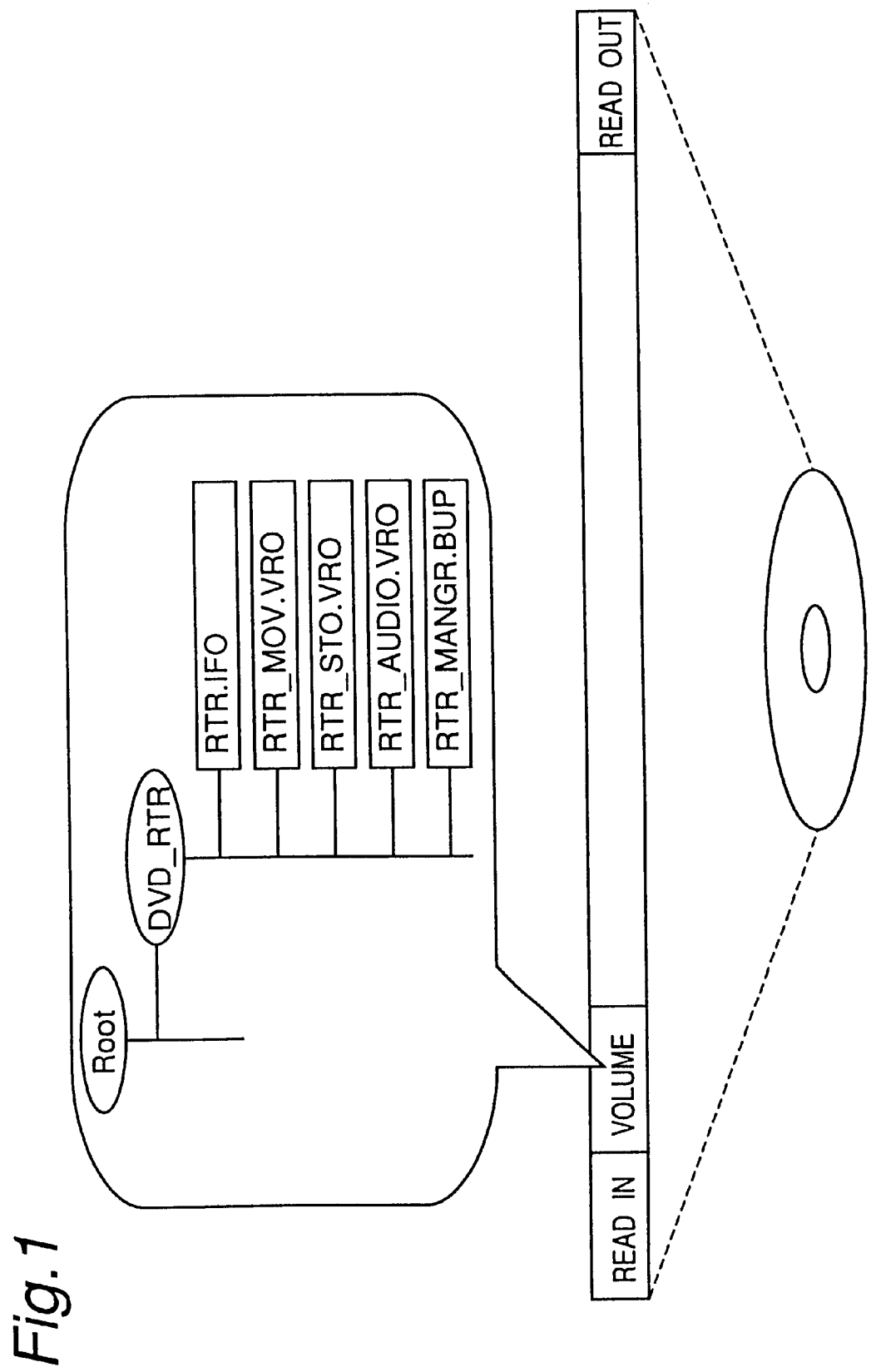
FIG. 1 shows the logical structure of a disc according to a preferred embodiment of the present invention.

The logical structure of a DVD-RAM disc is described first below with reference to FIG. 1. FIG. 1 shows the physical sector address area of the disc, and the structure whereby data is recorded to the disc as part of a file system.

The physical sector address area of the disc starts with a lead-in area to which a reference signal for servo stabilization, and an ID signal for differentiating DVD-RAM media from other media, are recorded. The user data area follows the lead-in area. Logically valid data is recorded to the user data area. A lead-out area ends the physical sector address area; a reference signal is also recorded here.

File system management information, called volume information, is recorded at the beginning of the user data area. The file system is not directly related to the present invention, and description thereof is thus omitted below. It should be noted, however, that by using a file system, data recorded to the disc can be managed as files and a directory to the files as shown in FIG. 1.

All data handled by the DVD recorder is filed under the DVD_RTR directory directly below the root directory as shown in FIG. 1.

Files handled by a DVD recorder can be grouped into three broad categories: a management information file; one or more AV files; and a copy of the management information file.

AV files can be an RTR_MOV.VRO file recording moving picture content (referred to as video below), an RTR_STO.VRO file recording still image data or still image data and simultaneously recorded audio data, or a RTR_AUDIO.VRO file recording audio data only.

Figure 2:
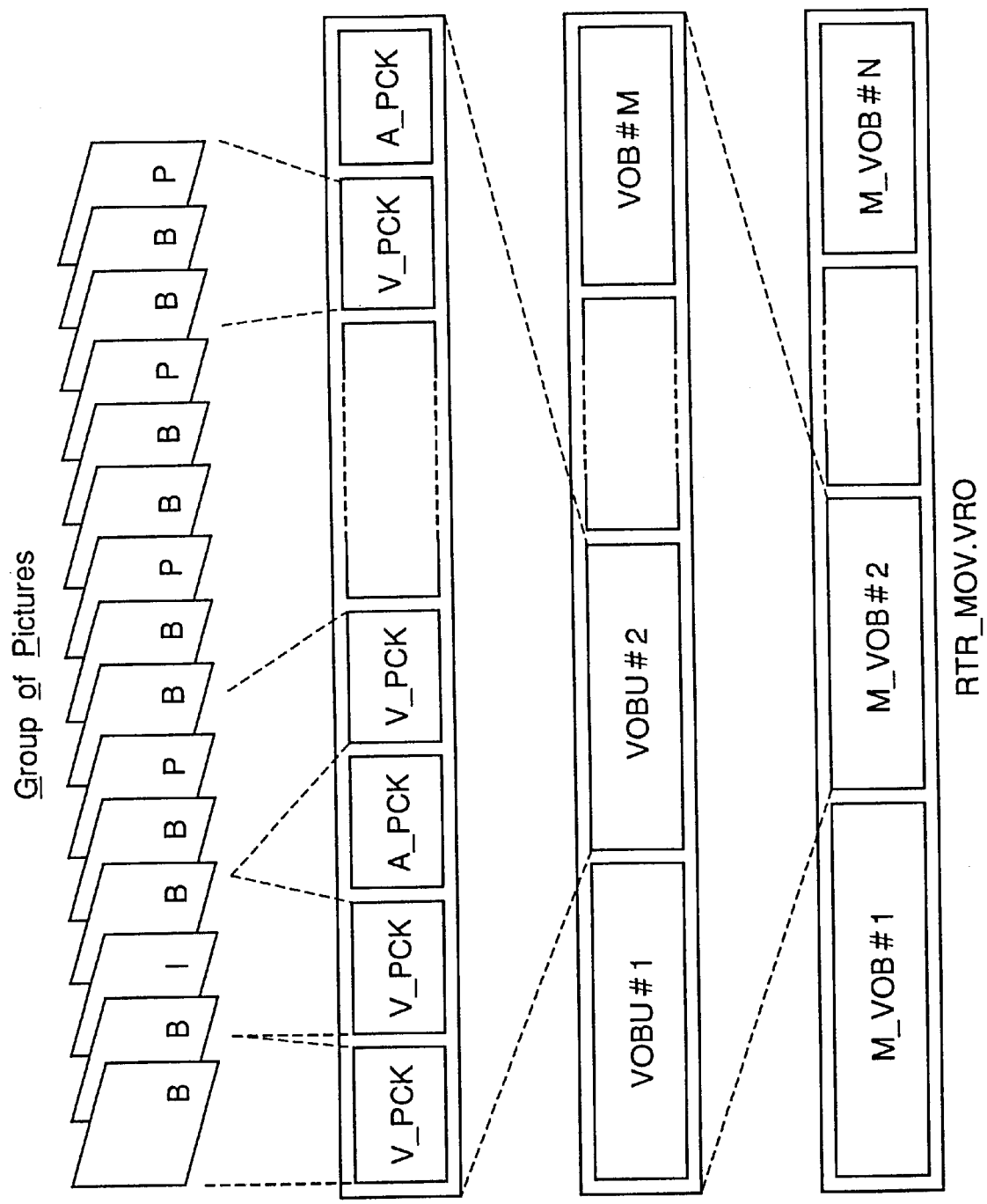
FIG. 2 shows the internal structure of an AV file for movies.

FIG. 2 shows the file structure of an RTR_MOV.VRO file recording video content. As shown in FIG. 2, MPEG program streams (M_VOB (Movie Video Object)) are arranged in a recording sequence in the RTR_MOV.VRO file.

Each program stream (M_VOB) is built from a plurality of Video Object Units (VOBU), each with a video reproduction time of 0.4 sec. to 1.0 sec.

Each VOBU comprises a number of video packs (V_PCK), audio packs (A_PCK), and subpicture packs (SP_PCK); and each pack is 2 KB. Notice that audio packs are multiplexed with the video in an M_VOB.

Figure 3:
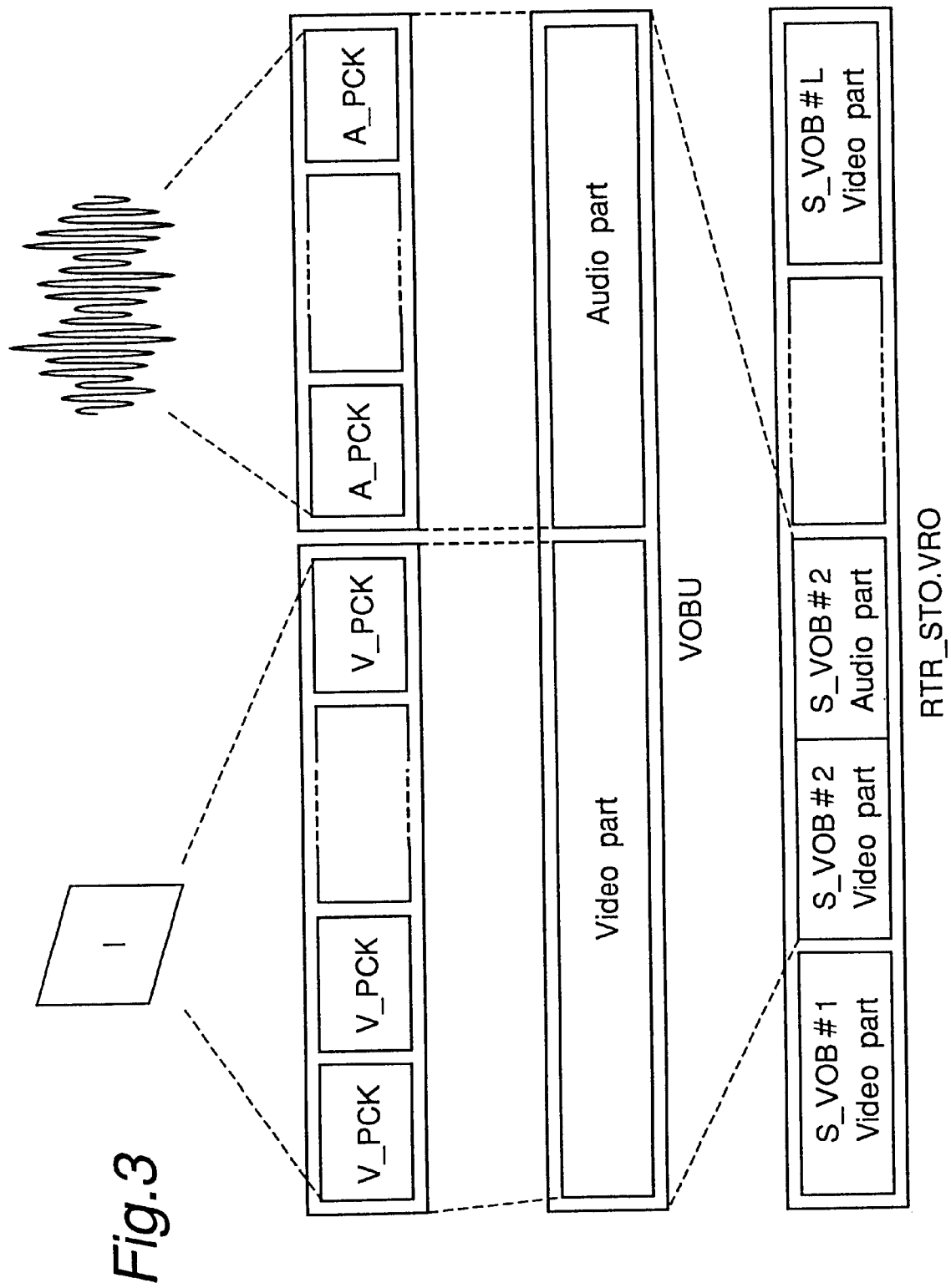
FIG. 3 shows the internal structure of an AV file for still images.

The video data in each VOBU further comprises one or more Group of Pictures (GOP). The GOP is the decoding unit for MPEG video, starts with an I-picture, and contains plural P- or B-pictures, FIG. 3 shows the structure of an RTR_STO.VRO file for recording still images and audio data. As shown in FIG. 3, an RTR_STO.VRO file contains S_VOB (Still Picture Video Objects), the MPEG program stream for still images, arranged in recording sequence.

The greatest difference between an S_VOB and M_VOB is that an S_VOB records still image data instead of moving picture data, and the still image data (video part) is followed by the audio data (audio part) instead of multiplexing the video and audio.

An S_VOB also contains one VOBU, which comprises a V_PCK, A_PCK, and SP_PCK.

An RTR_AUDIO.VRO contains only the audio part of an MPEG program stream.

AV Data and Management Information

Figure 4:
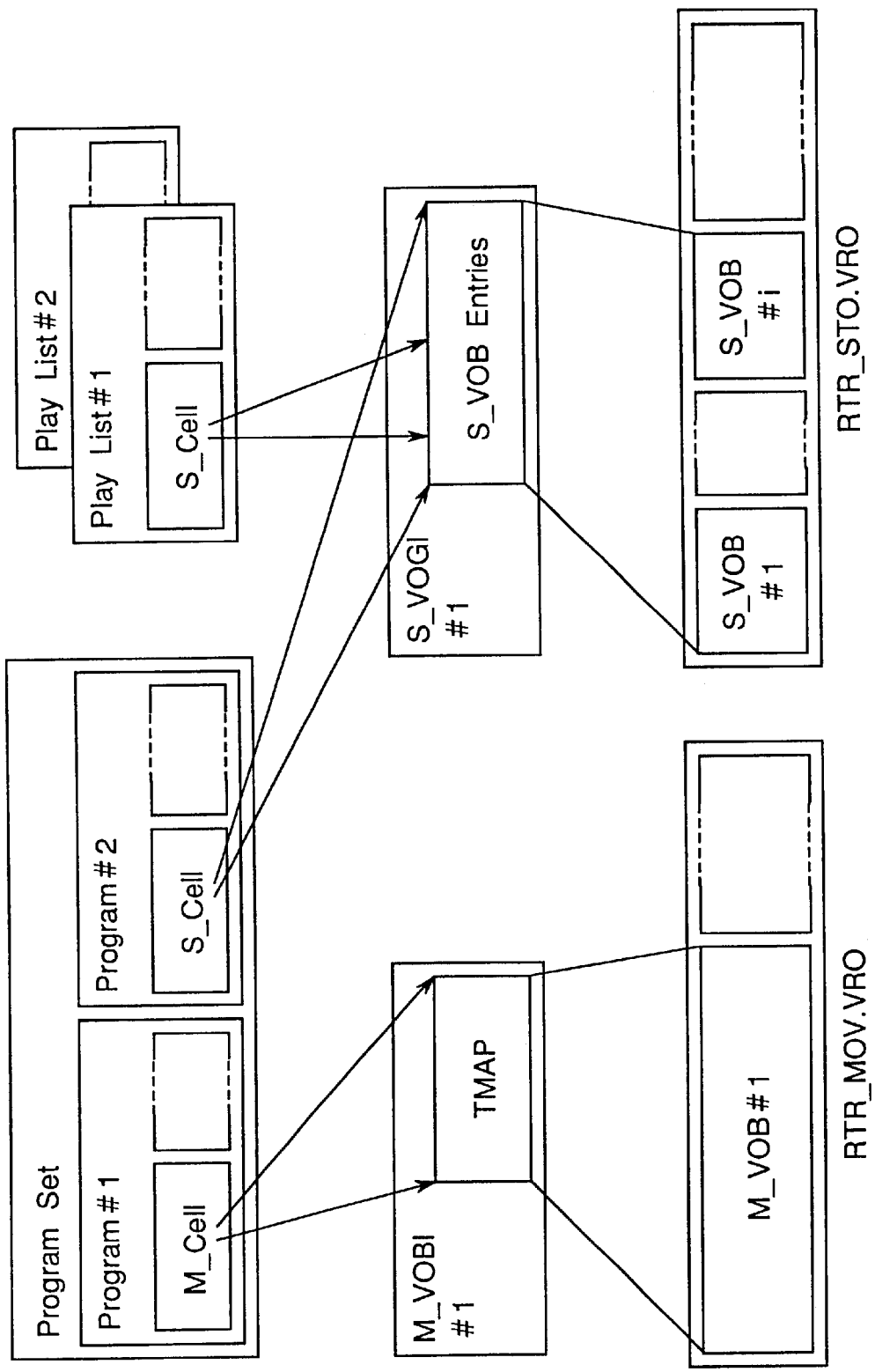
FIG. 4 shows the relationship between AV data and management information.

The relationship between M_VOB, S_VOB, and management information is described next below with reference to FIG. 4.

As described above, there are two types of AV data, M_VOB and S_VOB. Management information M_VOBI for each M_VOB is stored for each M_VOB where the M_VOBI records attributes of the corresponding M_VOB. Individually managing S_VOBs, however, would greatly increase the amount of management information. Management information S_VOGI is therefore used to manage a group S_VOG containing plural S_VOB units. This S_VOGI records attributes for the corresponding S_VOB group.

What is important to note here is that MPEG stream data does not have a linear correlation between time and data size. As noted above, the MPEG system stream is compressed using temporal correlation characteristics and variable length coding techniques (including variable bit rate coding) in order to achieve high compression efficiency. As a result, there is not necessarily a direct correlation between (reproduction) time and data size (address).

Therefore, an M_VOBI also contains a filter (TMAP) for converting time and address information, and an S_VOGI also contains a filter (S_VOB Entries) for converting a still image number in an S_VOG group and address.

Management information for the reproduction path is described next below.

The reproduction path is defined as a program chain (PGC) or sequence of cells describing all or part of a range of M_VOB or S_VOG blocks. The reproduction path can be either of two types: an original PGC referring to all AV data on the disc, or a user-defined PGC defining a user-selected reproduction sequence of AV data on the disc. The original PGC is also called a Program Set having a Program layer logically bundling a plurality of cells. A user-defined PGC is also called a Play List. Unlike an original PGC, a Play List does not have a Program layer.

Management Information File

The content of the management information file RTR.IFO, also shown as VR_MANGR.IFO, is described next below with reference to FIG. 5 to FIG. 55.

RTR_VMG (FIG. 5)

The VR_MANGR.IFO file contains real-time recording video management information RTR_VMG.RTR_VMG comprises seventables: RTR_VMGI, M_AVFIT, S_AVFIT, ORG_PGCI, UD_PGCIT, TXTDT_MG, and MNFIT.

These seven tables are described in detail below.

RTR_VMGI (FIG. 6)

Real-time recording video management information RTR_VMGI includes video management information table VMGI_MAT and play list search pointer table PL_SRPT.

VMGI_MAT (FIG. 6)

The video management information management table VMGI_MAT stores the following information relating to the entire disc. The reproducing device and recording device, referred to simply as the disc player and recorder, respectively, below, first read this VMGI_MAT to detect the overall structure of the disc.

VMG_ID (video management identifier)
  Stores the identifier DVD_RTAV_VMG0 identifying the disc as storing video recording data.

RTR_VMG_EA (RTR_VMG end address)
  Stores the RTR_VMG end address.

VMGI_EA (VMGI end address)
  Stores the VMGI end address.

VERN (version number)
  Records the version number of the recording format of the stored video recording data according to the format shown in FIG. 7.

TM_ZONE (time zone)
  Records the time zone used for all time information recorded to the disc. As shown in FIG. 7, the TM_ZONE stores a time zone stamp TZ_TY indicating whether time information is based on Greenwich Mean Time or a regional time standard (such as Eastern Standard Time (EST) or Japan Standard Time (JST)), and a time zone offset TZ_OFFSET recording the time difference to Greenwich Mean Time.

STILL_TM, (still time)
  Stores the still time used for presenting still images without sound.

CHRS (character set code for primary text display)
  Defines the character set code to use for primary text displays described below.

RSM_MRKI (resume marker management information)
  Stores the time code of the video at which playback last stopped.

DISC_REP_PICTI (disc representative picture information)
  Stores the time code of the still image selected as representative of the disc.

DISC_REP_NM (disc representative name)
  Stores the character string representing the disc.

M_AVFIT_SA (M_AVFIT start address)
  Stores the start address of the movie AV file information table M_AVFIT. This start address is used in the seek operation for accessing the M_AVFIT table.

S_AVFIT_SA (S_AVFIT start address)
  Stores the start address of the still image AV file information table S_AVFIT. This start address is used in the seek operation for accessing the S_AVFIT table.

ORG_PGCI_SA (ORG_PGCI start address)
  Stores the start address of the original PGC information. This start address is used in the seek operation for accessing the original PGC.

UD_PGCIT_SA (UD_PGCIT start address)
  Stores the start address of the user-defined PGC information table. This start address is used in the seek operation for accessing the user-defined PGC information table.

TXTDT_MG_SA (TXTDT_MG start address)
  Stores the start address of the text data management information TXTDT_MG. This start address is used in the seek operation for accessing the text data management information TXTDT_MG.

MNFIT_SA (MNFIT start address)
  Stores the start address of the management file information table MNFIT. This address is used in the seek operation for accessing the MNFIT table.

PL_SRPT (play list search pointer table) (FIG. 8)
  The play list search pointer table PL_SRPT records play list search pointer table information PL_SRPTI and n play list search pointers PL_SRP.

PL_SRPTI (play list search pointer table information) (FIG. 8)
  The play list search pointer table information PL_SRPTI records the following information for accessing a play list search pointer PL_SRP.

PL_SRP_Ns (number of play list search pointers)
  Stores the number of play list search pointers PL_SRP.

PL_SRPT_EA (PL_SRPT end address)
  Stores the end address of this play list search pointer table PL_SRPT.

PL_SRP (play list search pointer) (FIG. 8)
  Records the following information for accessing the actual play list data, that is, the user-defined PGC.

PL_TY (play list type)
  Stores one of the following values for identifying the play list type using the format shown in FIG. 9.
  0000b: video only
  0001b: still images only
  0010b: both video and still images PGCN (PGC number)
  Stores the PGC number for the associated play list. The PGC number is the recording sequence of PGC information in the UD_PGCIT described below, PL_CREATE_TM (play list creation date/time)
Stores the date and time the play list was created according to the format shown in FIG. 9.
PRM_TXTI (play list text information)
Stores text information indicative of play list content. For example, if the play list is a television program, PRM_TXTI could record the name of the show. PRM_TXTI includes an ASCII code field, and a field for the character code set defined by the above-noted CHRS.
IT_TXT_SRPN (IT_TXT_SRP number)
If the optional IT_TXT containing the play list content is recorded in addition to the above-noted primary text, the IT_TXT_SRP number is stored as a link to the IT_TXT recorded in TXTDT_MG. This IT_TXT_SRP number is the recording sequence in TXTDT_MG, described below.
THM_PTRI (thumbnail pointer information)
Stores thumbnail image information for the play list.
THM_PTRI (FIG. 8)
THM_PTRI stores the following information indicating a thumbnail image location.
CN (cell number)
Stores the cell number containing the thumbnail image. The cell number is the recording sequence of the cell information in the UD_PGCI for this play list.
THM_PT (thumbnail image pointer)
Stores the presentation time of the video frame used as the thumbnail image according to the PTM (presentation time) describing format as shown in FIG. 10, if the cell indicated by CN is a video cell. PTM is written according to the reference time of the time stamp written in the MPEG program stream.
Stores the still image VOB entry number of the still image used as the thumbnail image according to the S_VOB_ENTN describing format as shown in FIG. 11 if the cell indicated by CN is a still image cell.
M_AVFIT (FIG. 12)
The movie AV file information table M_AVFIT stores management information for the movie AV file RTR_MOV.VRO, and comprises M_AVFITI, M_VOB_STI, and M_AVFI.
M_AVFITI (movie AV file information table information) (FIG. 12)
Stores the following information for accessing M_VOB_STI and M_AVFI.
M_AVFI_Ns (movie AV file information number)
Indicates the number of AVFI information fields following. If 0, no AVFI is present; if 1, an AVFI is present. AVFI presence corresponds to the presence of move AV file RTR_MOV.VRO.
M_VOB_STI_Ns (M_VOB_STI number)
Indicates the number of following M_VOB_STI fields.
M_AVFIT_EA (M_AVFIT end address)
Stores the M_AVFIT end address.
M_VOB_STI (movie VOB stream information) (FIG. 12)
Stores the following as movie VOB stream information.
V_ATR (video attributes)
Stores the following video attributes according to the format as shown in FIG. 13.
Video compression mode
Stores one of the following values indicating the video compression mode.
00b: MPEG_1
01b: MPEG_2
TV system
Stores one of the following values indicating the television system.
00b: 525/60 (NTSC)
01b: 625/50 (PAL)
Aspect ratio
Stores one of the following values indicating the aspect ratio.
00b: 4x3
01b: 16x9
line21_switch_1
Stores one of the following values indicating whether closed caption data for field 1 is contained in the video stream.
1b: recorded
0b: not recorded
line21_switch_2
Stores one of the following values indicating whether closed caption data for field 2 is contained in the video stream.
1b: recorded
0b: not recorded
Video resolution
Stores one of the following values indicating the video resolution.
000b: 720x480 (NTSC), 720x576 (PAL)
001b: 702x480 (NTSC), 702x576 (PAL)
010b: 352x480 (NTSC), 352x576 (PAL)
011b: 352x240 (NTSC), 352x288 (PAL)
100b: 544x480 (NTSC), 544x576 (PAL)
101b: 480x480 (NTSC), 480x576 (PAL)
AST_Ns (audio stream number)
Stores the number of audio streams recorded to the corresponding VOB.
SPST_Ns (still picture stream number)
Stores the number of still picture streams recorded to the corresponding VOB.
A_ATRO (audio stream 0 attributes)
Stores the following attributes for the audio recorded to audio stream 0 using the format as shown in FIG. 13.
Audio coding mode
Stores one of the following values indicating the audio compression method.
000b: Dolby AC-3
001b: MPEG audio without an extension stream
010b: MPEG audio with an extension stream
011b: linear PCM
Application Flag
Stores one of the following values indicating the audio application.
00b: not applicable
01b: mixed number of audio channels
10b: enhancement channel included
Quantization/DRC
Stores one of the following values for identifying whether dynamic range control (DRC) information is present.
00b: DRC not contained in MPEG stream
01b: DRC contained in MPEG stream
If LPCM is used, the following value is stored to identify the quantization level.
00b: 16 bit
fs
The following value is stored to identify the sampling frequency.
00b: 48 kHz
Number of Audio channels
Stores one of the following values indicating the number of audio channels.
0000b: 1 channel (monaural)
0001b: 2 channel (stereo)
0010b: 3 channel
0011b: 4 channel 0100b: 5 channel
0101b: 6 channel
0110b: 7 channel
0111b: 8 channel
1001b: 2 channel (dual monaural)
Bitrate
Stores one of the following values indicating the bitrate.
0000 0001b: 64 kbps
0000 0010b: 89 kbps
0000 0011b: 96 kbps
0000 0100b: 112 kbps
0000 0101b: 128 kbps
0000 0110b: 160 kbps
0000 0111b: 192 kbps
0000 1000b: 224 kbps
0000 1001b: 256 kbps
0000 1010b; 320 kbps
0000 1011b: 384 kbps
0000 1100b: 448 kbps
0000 1101b: 768 kbps
0000 1110b: 1536 kbps What is important here is that if the corresponding audio stream is an MPEG audio stream with an extension stream, only the bitrate of the base channel, not including the extension stream, is recorded. This is because compression using a VLC technique is used for the extension stream, and the extension stream therefore cannot be defined using a fixed bitrate as above.

A_ATR1 (audio stream 1 attributes)
Stores the following attributes of audio stream 1 using the format as shown in FIG. 13. Note that these attributes are defined using the same fields used with A_ATR0 and described above, and further description is thus omitted here.

SP_PLT (subpicture color palette)
Records the subpicture color palette information using the format shown in FIG. 14.

M_AVFI (FIG. 15)
The movie AV file information M_AVFI comprises the following information for accessing a movie VOB: M_AVFI_GI, M_VOBI_SRP, and M_VOBI.

M_AVFI_GI (movie AV file general information) (FIG. 15)
Stores the movie VOB information search pointer count M_VOBI_SRP_Ns.

M_VOBI_SRP_Ns (movie VOB information search pointer number)
Records the number of movie VOB information search pointers M_VOBI_SRP.

M_VOBI_SRP (movie VOB information search pointer) (FIG. 15)
Stores address information for accessing each M_VOBI.

M_VOBI_SA (movie VOB information start address)
Stores the M_VOBI start address used for a seek operation accessing the corresponding VOBI information.

M_VOBI (movie VOB information) (FIG. 16)
Stores the following movie VOB management information: M_VOB_GI, SMLI, AGAPI, TMAPI, and CP_MNGI.

M_VOB_GI (general information) (FIG. 16)
Records the following general information relating to a movie VOB.

VOB_TY (VOB type)
Stores VOB attributes according to the format as shown in FIG. 17. TE
Stores one of the following values indicating the VOB status.
0b: normal
1b: temporarily deleted condition A0_STATUS
Stores one of the following values indicating the status of audio stream 0.
00b: original state
01b: overwritten A1_STATUS
Stores one of the following values indicating the status of audio stream 1.
00b: original state
01b: overwritten
10b: dummy for additional audio content
11b: additional audio content added SML_FLG
Stores one of the following values indicating whether the VOB is to be seamlessly reproduced with the preceding VOB.
0b: seamless reproduction not possible
1b: seamless reproduction possible A0_GAP_LOC
Stores one of the following values indicating the presence of an audio reproduction gap in audio stream 0, and identifying the VOBU to which the audio reproduction gap is multiplexed.
00b: no audio reproduction gap recorded
01b: audio reproduction gap multiplexed to first VOBU
10b: audio reproduction gap multiplexed to second VOBU
11b: audio reproduction gap multiplexed to third VOBU A1_GAP_LOC
Stores one of the following values indicating the presence of an audio reproduction gap in audio stream 1, and identifying the VOBU to which the audio reproduction gap is multiplexed.
00b: no audio reproduction gap recorded
01b: audio reproduction gap multiplexed to first VOBU
10b: audio reproduction gap multiplexed to second VOBU
11b: audio reproduction gap multiplexed to third VOBU VOB_REC_TM (VOB recording date/time)
The date and time the VOB was recorded is stored in the same format used for PL_CREATE_TM shown in FIG. 9. What is important to note here is that this indicates the date/time that the first video presentation frame of the VOB was recorded. If the first video frame is changed by editing or deletion, this VOB_REC_TM value must be updated. It should be further noted that the date/time of recording can be displayed synchronized to the VOB presentation similar to the way a date/time is displayed on the viewfinder of a video camcorder by simply adding the time elapsed in the VOB to the time stored as VOB_REC_TM.

VOB_REC_TM_SUB (VOB recording date/time difference information)
This field is used to absorb error in a VOB_REC_TM field that has been updated because the first video frame in the VOB was changed by VOB editing or deletion. As shown in FIG. 9, VOB_REC_TM is only accurate to the second. This means that if the video was edited or deleted at the frame or field level (precision), the recording time cannot be expressed with sufficient accuracy using only VOB_REC_TM. This field is therefore used to adjust for any difference.

M_VOB_STIN (M_VOB_STI number)
Stores the M_VOB_STI number corresponding to the VOB. This M_VOB_STI number is the recording sequence in the above-noted M_VOB_STI table.

VOB_V_S_PTM (VOB video start PTM)
Stores the VOB presentation start time based on the same reference time as the time stamp of the video stream.

VOB_V_E_PTM (VOB video end PTM)

Stores the VOB presentation end time based on the same reference time as the time stamp of the video stream. It should be noted that the time stamp of the stream indicates the presentation start time of the frame, but this VOB_V_E_PTM field records the presentation end time, that is, the sum of the start time plus the frame presentation period.

Figure 16:
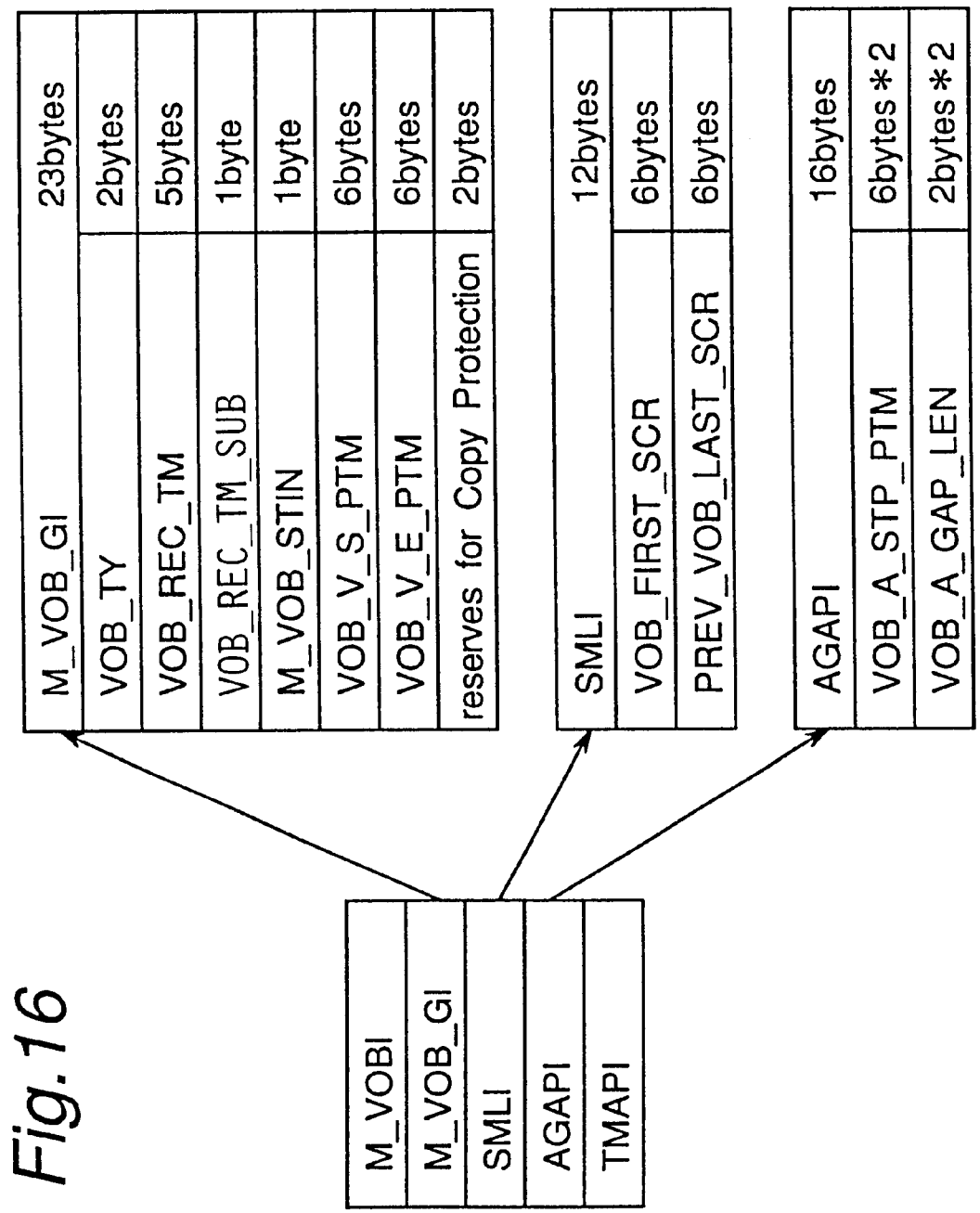
FIG. 16 shows the structure of the M_VOBI block.

SMLI (seamless information) (FIG. 16)

SMLI stores the following information required for seamless reproduction with the preceding VOB. Note that this field is only recorded when the above-noted SML_FLG is 1b.

VOB_FIRST_SCR

Stores the SCR of the first pack in the VOB.

PREV_VOB_LAST_SCR

Stores the SCR of the last pack in the previous VOB.

AGAPI (audio gap information) (FIG. 16)

AGAPI records the following information required for the decoder to process an audio reproduction gap. This field is only recorded when a value other than 00b is written to the above-noted A0_GAP_LOC or A1_GAP_LOC.

VOB_A_STP_PTM (VOB audio stop PTM)

Records the time of the audio reproduction gap, that is, the time at which the decoder is to temporarily stop audio reproduction. This time is recorded using the same reference time as the stream time stamp.

VOB_A_GAP_LEN (VOB audio gap length)

Records the length of the audio reproduction gap in 90 kHz precision.

Figure 18:
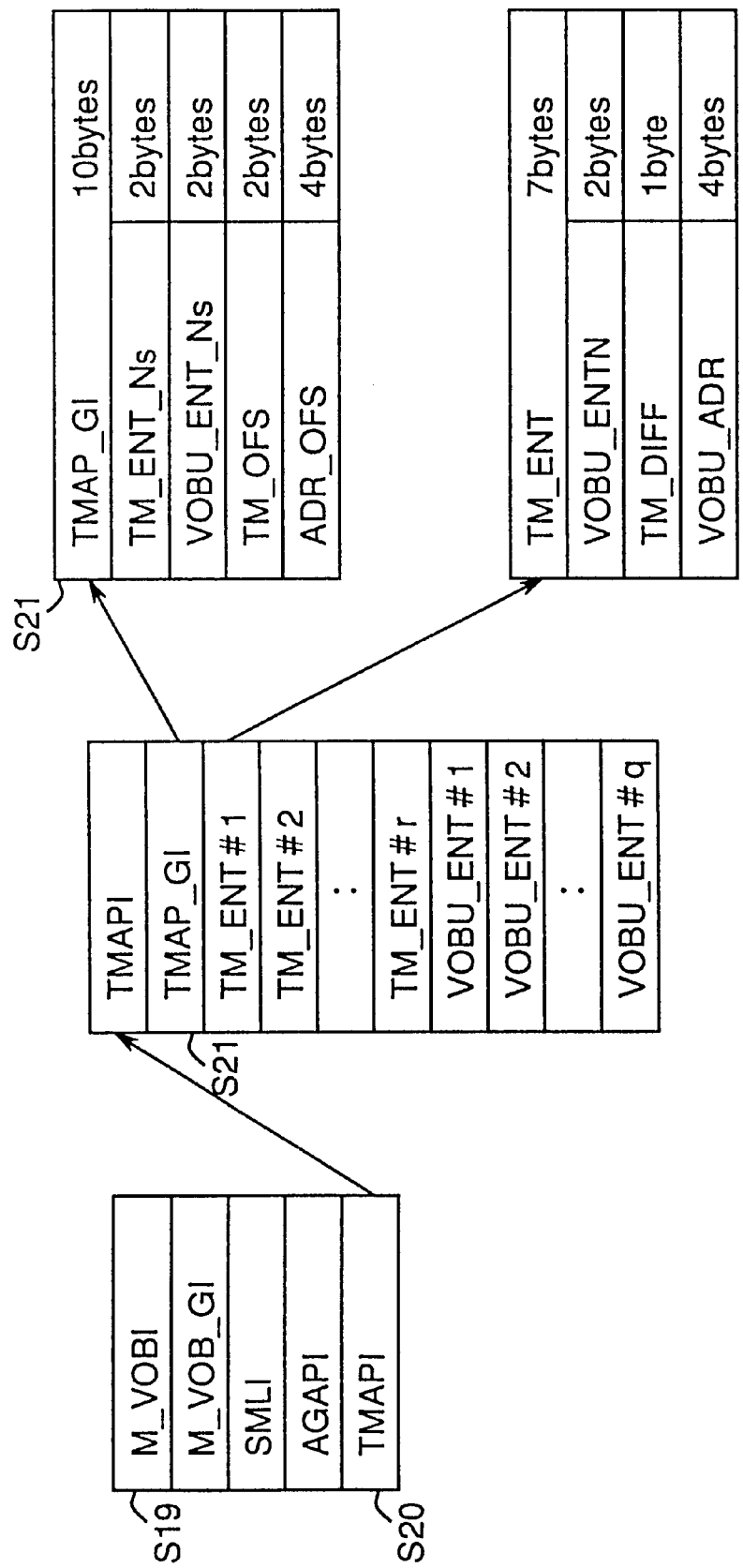
FIG. 18 shows the structure of the TMAPI block.

TMAPI (time map information) (FIG. 18)

The time map information comprises TMAP_GI, TM_ENT, and VOBU_ENT fields.

TMAP_GI (FIG. 18)

The general TMAP information TMAP_GI comprises TM_ENT_Ns, VOBU_ENT_Ns, TM_OFS, and ADR_OFS fields as described below.

TM_ENT_Ns (TM_ENT number)

Records the number of TM_ENT fields in the TMAPI block as described below.

VOBU_ENT_Ns (VOBU_ENT number)

Records the number of VOBU_ENT fields in the TMAPI block as described below.

TM_OFS (time offset)

Records the time map offset with the video field precision.

ADR_OFS (address offset)

Records the offset in the first AV field in the VOB.

TM_ENT (time entry) (FIG. 18)

A time entry comprises the following fields as access point information at a constant time interval TMU. If the video format is NTSC, the TMU is 600 video fields; if PAL, it is 500 video fields.

VOBU_ENTN (VOBU_ENT number)

Records the entry number of a VOBU containing the time (TMUx(N_1)+TM_OFS for the N-th TM_ENT) indicated by the TM_ENT.

TM_DIFF (time difference)

Records the difference between the time indicated by this TM_ENT and the presentation start time of the VOBU pointed to by VOBU_ENTN.

VOBU_ADR (VOBU address)

Records the start address in the VOB of the VOBU pointed to by VOBU_ENTN.

VOBU_ENT (FIG. 19)

The VOBU entry (VOBU_ENT) has the fields shown below for the corresponding VOBU. The fields are formatted as shown in FIG. 19. The time and address information required to access a desired VOBU can be obtained by simply adding the following fields in sequence.

1STREF_SZ

Stores the number of packs from the first pack in the VOBU to the pack containing the last data block of the first I-picture in the VOBU.

VOBU_PB_TM

Records the playback time of this VOBU.

VOBU_SZ

Records the data size of this VOBU.

S_AVFIT (FIG. 20).

The still image AV file information table comprises the following management information fields for the still image AV file RTR_STO.VRO: S_AVFITI, S_VOB_STI, and S_AVFI.

Figure 20:
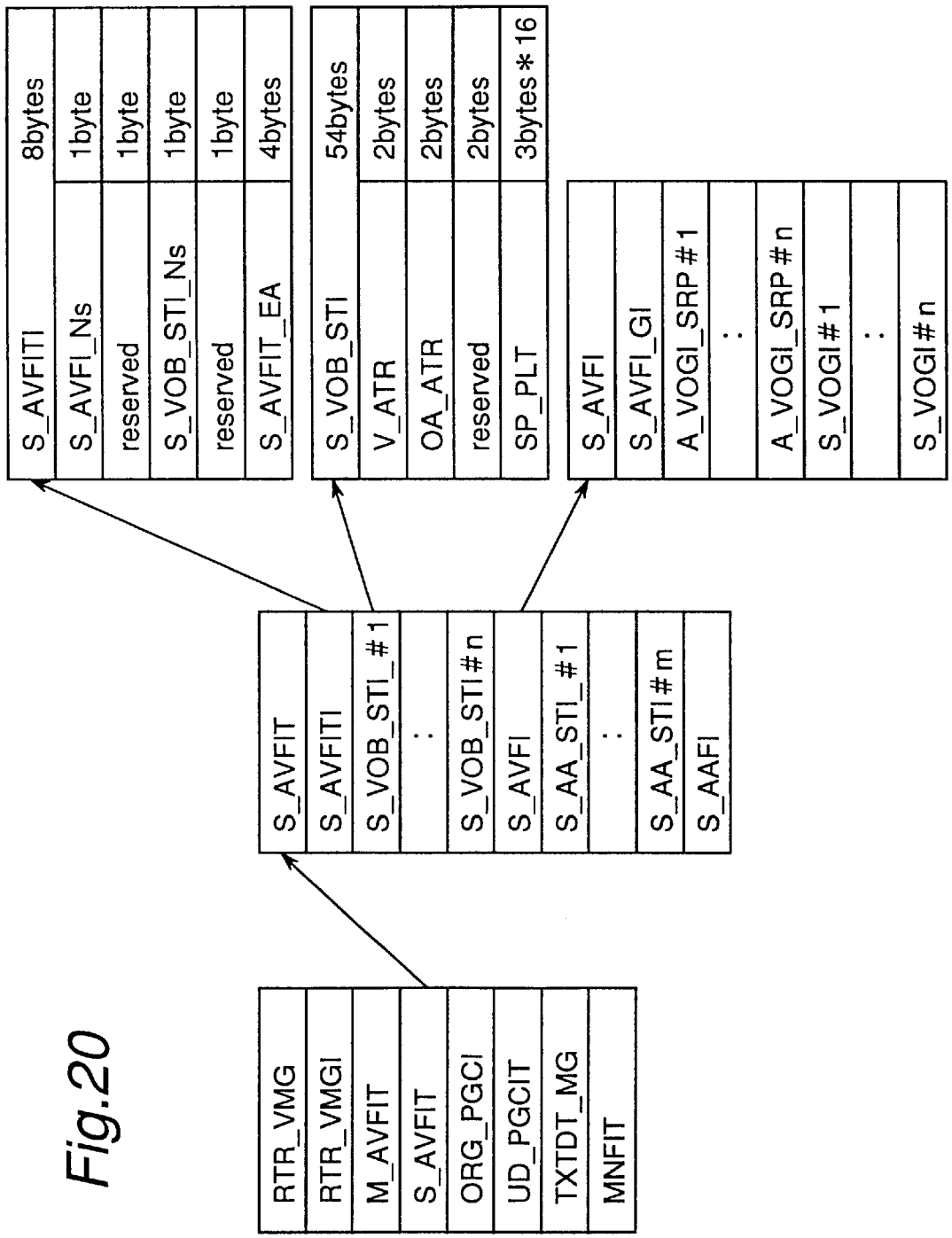
FIG. 20 shows the structure of the S_AVFIT block.

S_AVFITI (still image AV file information table information) (FIG. 20)

Figure 21:
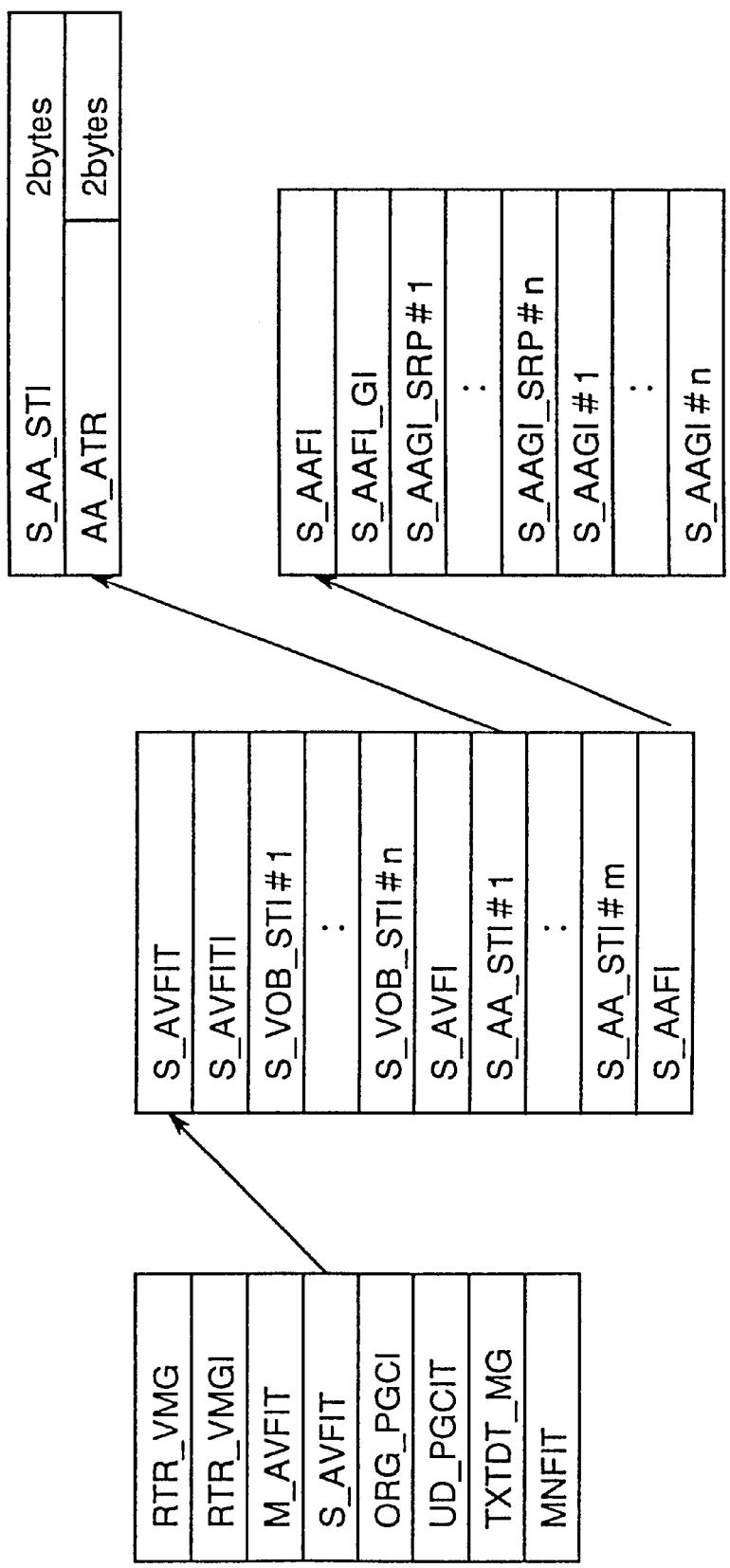
FIG. 21 shows the structure of the S_AA_STI and S_AAFI block.

Stores the following information required to access S_VOB_STI, S_AVFI, S_AA_STI (FIG. 21), and S_AAFI (FIG. 21).

S_AVFI_Ns (still image AV file information number)

This is a value of either 0 or 1. This value corresponds to the number of still image AV files, that is, whether a RTR_STO.VRO file is present.

S_VOB_STI_Ns (still image VOB stream information number)

Records the number of S_VOB_STI described below.

S_AVFI_EA (still image AV file information end address)

Records the S_AVFI end address.

S_VOB_STI (still image VOB stream information) (FIG. 20)

Records the following still image VOB stream information.

V_ATR (video attributes)

Information recorded as the video attributes are the Video compression mode, TV system, Aspect ratio, and Video resolution. These fields are as described above with reference to the video attributes of the M_VOB_STI.

OA_ATR (audio stream attributes)

The audio stream attribute fields are: Audio coding mode, Application Flag, Quantization/DRC, fs, Number of Audio channels. These are also as described above with reference to the A_ATRO fields of the M_VOB_STI.

SP_PLT (subpicture color palette)

Stores the color palette information for subpictures. The format is as described with reference to the SP_PLT of M_VOB_STI.

Figure 24:
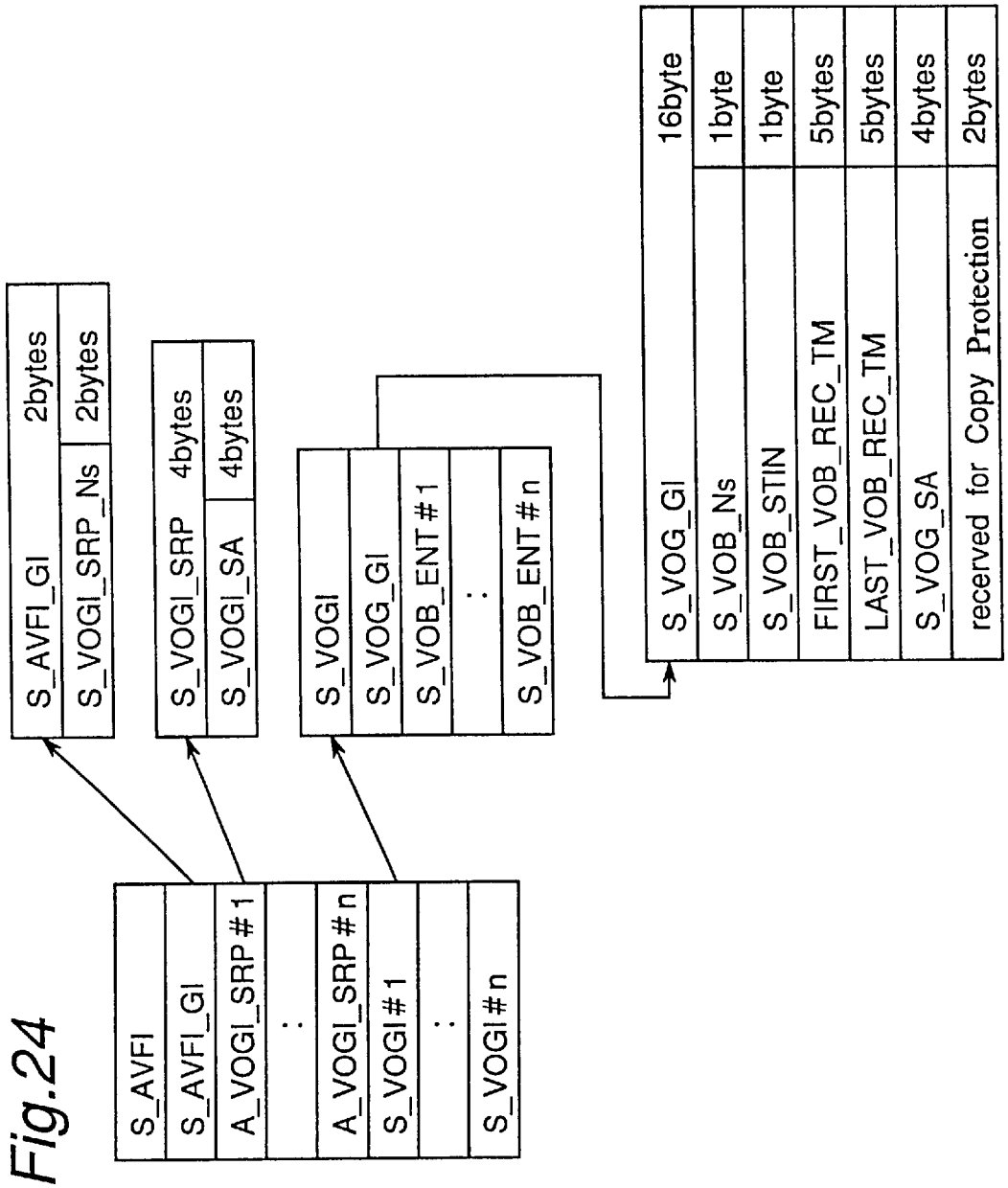
FIG. 24 shows the structure of the S_AVFI block.
Figure 27:
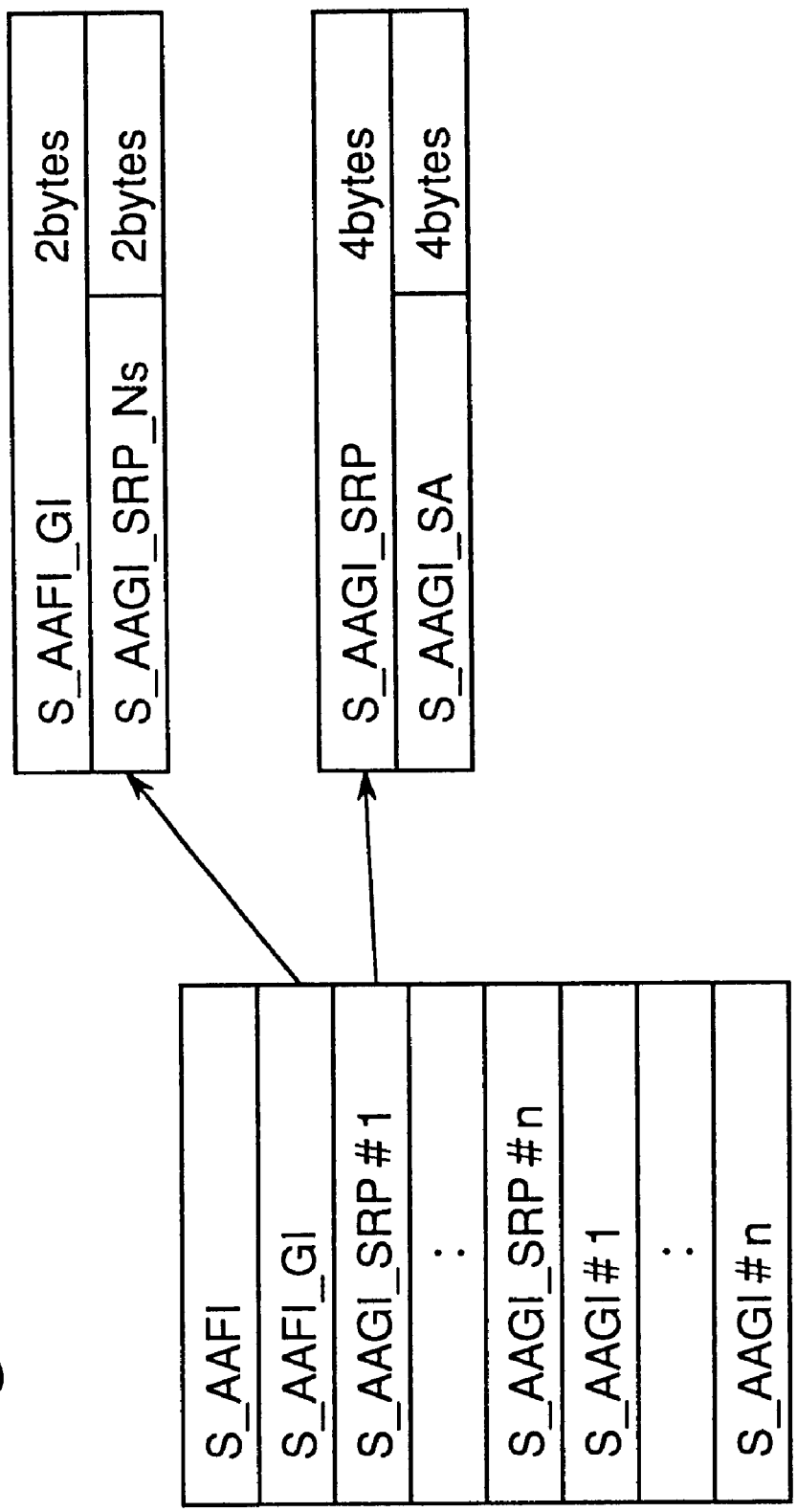
FIG. 27 shows the structure of the S_AAFI_GI and S_AAGI_SRP block.
Figure 28:
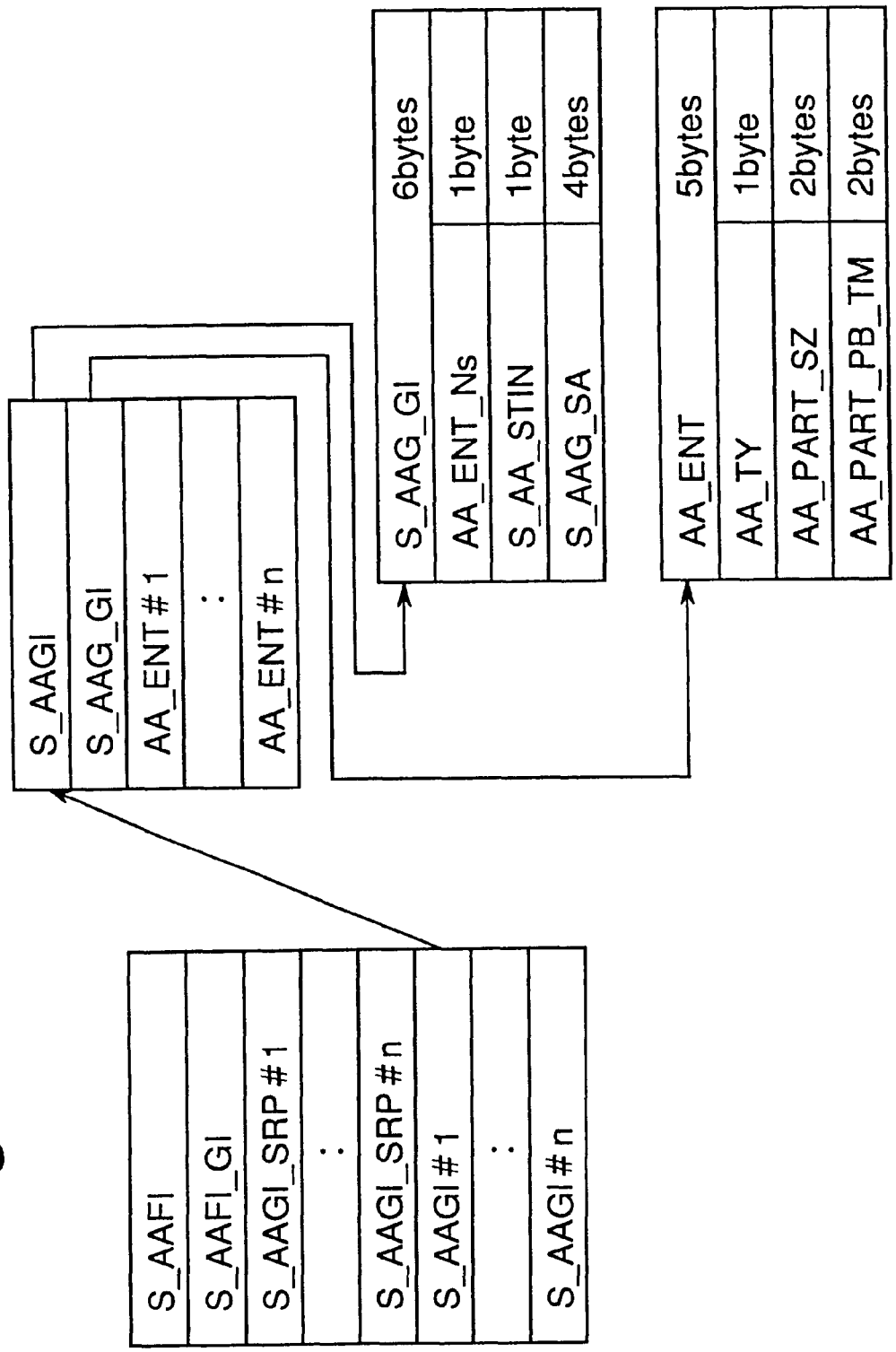
FIG. 28 shows the structure of the S_AAGI block.
Figure 30:
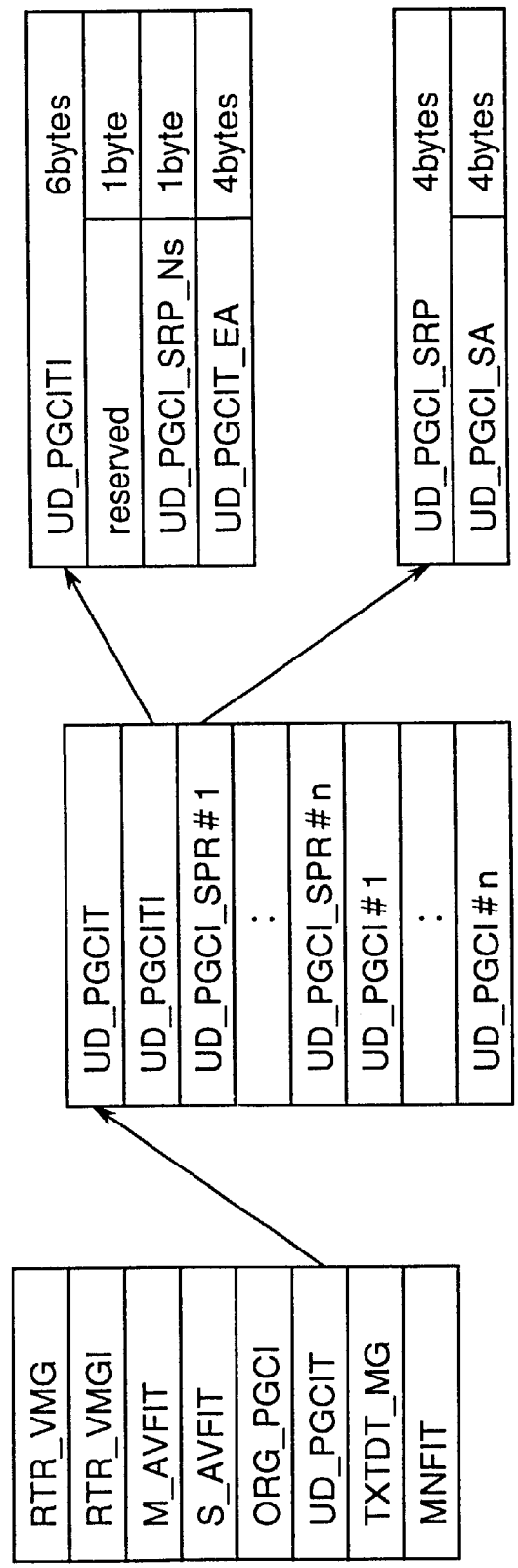
FIG. 30 shows the structure of the UD_PGCIT block.
Figure 31:
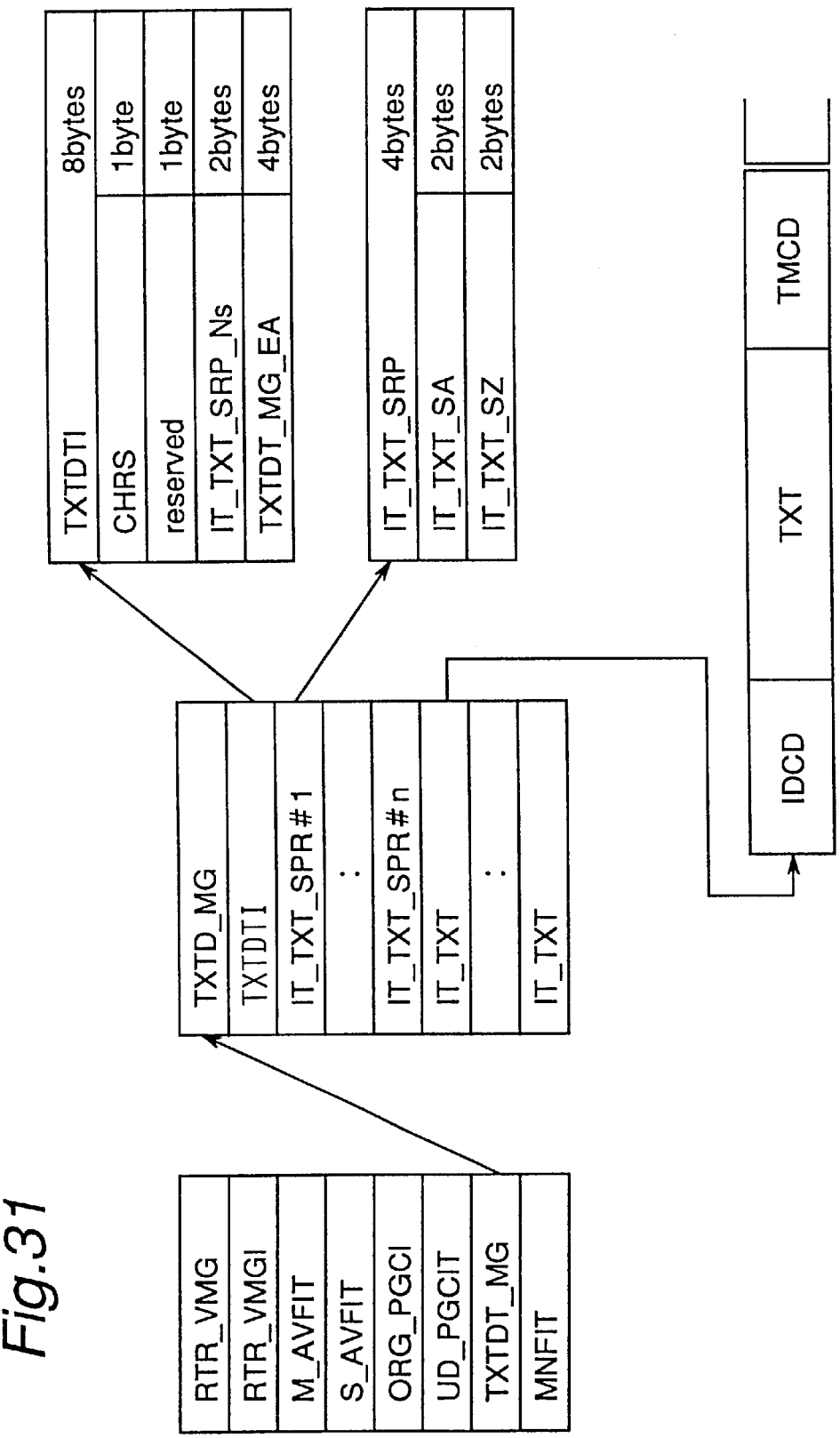
FIG. 31 shows the structure of the TXTDT_MG block.

S_AVFI (still image AV file information) (FIG. 24)

Comprises the following fields required to access a still image VOG: S_AVFI_GI, S_VOGI_SRP, and S_VOGI.

S_AVFI_GI (FIG. 24)

General still image AV file information S_AVFI_GI records S_VOGI_SRP_Ns.

S_VOGI_SRP_Ns (still image VOB group search pointer number)

Records the number of S_VOGI_SRP fields described below.

S_VOGI_SRP (still image VOB group information search pointer) (FIG. 24)

Records S_VOGI_SA.

S_VOGI_SA (still image VOB group information start address) records the start address of this S_VOGI.

S_VOGI (FIG. 24)

The still image VOB group information S_VOGI comprises the following still image VOB management information fields: S_VOG_GI, S_VOB_ENT, and CP_MNGI.

S_VOG_GI (FIG. 24)

General still image VOB group information S_VOG_GI records the following fields as general information relating to the still image VOB group.

S_VOB_Ns (still image VOB number)
Records the number of still image VOBs in the still image VOB group.

S_VOB_STIN (S_VOB_STI number)
Records the S_VOB_STI number storing the still image VOB stream information. This S_VOB_STI number is the recording sequence in the S_VOB_STI table.

FIRST_VOB_REC_TM (first VOB recording date/time)
Records the recording date/time information of the first still image VOB in the still image VOB group.

LAST_VOB_REC_TM (last VOB recording date/time)
Records the recording date/time information of the last still image VOB in the still image VOB group.

S_VOG_SA (still image VOB group start address)
Records the start address of the still image VOB group in the RTR_STO.VRO file.

S_VOB_ENT (FIG. 25)
Still image VOB entries S_VOB_ENT are defined as either type A or type B as described below according to whether there is audio recorded for individual still image VOBs in the still image VOB group.

S_VOB_ENT (Type A) (FIG. 25)
Type A comprises the fields S_VOB_ENT_TY and V_PART_SZ, defined as follows.

S_VOB_ENT_TY (still image VOB entry type)
Still image VOB type information is formatted as shown in FIG. 26.

MAP_TY
Stores one of the following values for identifying type A or type B.
00b: type A
01b: type B TE
Stores one of the following values indicating the status of the still image VOB.
0b: normal
1b: temporarily deleted SPST_Ns
Stores the number of subpicture streams in the still image VOB. V_PART_SZ (video part size)
Stores the data size of the video part of the still image VOB.

S_VOB_ENT (Type B) (FIG. 25)
In addition to S_VOB_ENT_TY and V_PART_SZ fields, type B also has A_PART_SZ and A_PB_TM fields as defined below.

S_VOB_ENT_TY (still image VOB entry type)
Records the type of the still image VOB. These fields are as described above with reference to type A and FIG. 26.

V_PART_SZ (video part size)
Stores the data size of the video part of the still image VOB.

A_PART_SZ (audio part size)
Stores the data size of the audio part of the still image VOB.

A_PB_TM (audio playback time)
Stores the playback time (length) of the audio part of the still image VOB.

S_AAFI (FIG. 27)
The still image added audio file information comprises the following information fields: S_AAFI_GI, S_AAGI_SRP, and S_AAGI.

S_AAFI_GI (general information) (FIG. 27)
General information about still image added audio files contains the following information.

S_AAGI_SRP_Ns (still image added audio group information number)
Records the number of S_AAGI_SRP fields in the S_AAFI block.

S_AAGI_SRP (FIG. 27)
Records the following information as a search pointer to the still image added audio group information.

S_AAGI_SA (still image added audio group information start address)
Records the start address of the S_AAGI field in the still image added audio file information.

S_AAGI (FIG. 28)
The still image added audio group information comprises the following fields: S_AAG_GI and AA_ENT.

S_AAG_GI (FIG. 28)
The general still image added audio group information includes the following fields.

AA_ENT_Ns
Records the number of AA_ENT fields in the still image added audio group.

S_AA_STIN (FIG. 21, FIG.: 28)
Records the S_AA_STI number in the still image added audio group.

S_AAG_SA
Records the S_AAG start address in the still image added audio group.

AA_ENT (FIG. 28)
The added audio entry AA_ENT records the following fields.

AA_TY (FIG. 29)
Records the type of each added audio entry.

AA_PART_SZ
Records the size of the added audio entry.

AA_PART_PB_TM
Records the playback time the added audio entry.

UD_PGCIT (FIG. 30)
The user-defined PGC information table comprises the following fields: UD_PGCITI, UD_PGCI_SRP, and UD_PGCI.

UD_PGCITI (FIG. 30)
The user-defined PGC information table information UD_PGCITI records the following fields constituting the user-defined PGC information table.

UD_PGCI_SRP_Ns (user-defined PGC information search pointer number)
Records the number of UD_PGCI_SRP fields.

UD_PGCIT_EA (user-defined PGC information table end address)
Records the UD_PGCIT end address.

UD_PGCI_SRP (FIG. 30)
The user-defined PGC information search pointer UD_PGCI_SRP records the UD_PGCI_SA field.

UD_PGCI_SA (user-defined PGC information start address)
Records the UD_PGCI start address. This address is used to seek and access the PGCI.

UD_PGCI (FIG. 30)
The detailed structure of the user-defined PGC information is described further below under the PGC information PGCI.

ORG_PGCI (FIG. 5)
The detailed structure of the original PGC information is described further below under the PGC information PGCI.

TXTDT_MG (FIG. 31)
The text data management field TXTDT_MG comprises TXTDTI, IT_TXT_SRP, and IT_TXT fields as described below.

TXTDTI (FIG. 31)
Text data information TXTDTI comprises the following fields: CHRS, IT_TXT_SRP_Ns, and TXTDT_MG_EA.

CHRS (character set code)
   Records the character set code used for IT_TXT.
IT_TXT_SRP_Ns (IT_TXT search pointer number)
   Records the number of IT_TXT_SRP fields.
TXTDT_MG_EA (text data management end address)
   Records the end address of the TXTDT_MG block.
IT_TXT_SRP (FIG. 31)
   The IT_TXT search pointer IT_TXT_SRP records the following information for accessing IT_TXT.
IT_TXT_SA (IT_TXT start address)
   Records the IT_TXT start address. This address is used to seek and access the IT_TXT block.
IT_TXT_SZ (IT_TXT size)
   Records the IT_TXT data size. A desired IT_TXT block can be read by reading this amount of data.
IT_TXT (FIG. 31)
   IT_TXT comprises one or more sets of three fields: identification code IDCD, the text TXT corresponding to that ID code, and an end code TMCD defining the end of the set. If there is no TXT field for an IDCD, the TXT field can be omitted and IDCD and TMCD recorded as one set. Valid IDCD values are defined as follow.
Genre codes
30h: movie
31h: music
32h: drama
33h: animation
34h: sports
35h: documentary
36h: news
37h: weather
38h: educational
39h: hobby
3Ah: entertainment
3Bh: performing arts (plays, opera)
3Ch: shopping
Input source codes
60h: broadcasting station
61h: camcorder
62h: photograph
63h: memo
64h; other
PGCI (FIG. 32)
   PGCI (PGC information) is common to both ORG_PGCI and UD_PGCI, and comprises the following fields: PGC_GI, PGI, CI_SRP, CI.
PGC_GI (FIG. 32)
   PGC_GI (PGC general information) comprises the fields PG_Ns and CI_SRP_Ns as general information about the PGC.
PG_Ns (program number)
   Records the number of programs in the PGC. If a user-defined PGC, this field is 0 because there is no program.
CI_SRP_Ns (CI_SRP number)
   Records the number of CI_SRP, described below.
PGI (FIG. 32)
   PGI (program information) comprises the following fields as described below: PG_TY, C_Ns, PRM_TXTI, IT_TXT_SRPN, and THM_PTRI.
PG_TY (program type)
   Records the following information formatted as shown in FIG. 33.
Protect (protected)
0b: normal
1b: protected
C_Ns (cell number)
   Records the cell number in the program.

PRM_TXTI (primary text information)
   Records the text information describing program content. For further details, see the above-noted PL_SRPT.
IT_TXT_SRPN (IT_TXT_SRP number)
   If IT_TXT containing program content information is recorded in addition to the primary text noted above, the IT_TXT_SRP number recorded in TXTDT_MG is stored to this field.
THM_PTRI (thumbnail image pointer information)
   Records the thumbnail image information representing this program. Details about the THM_PTRI are identical to the above-noted THM_PTRI of PL_SRPT.
CI_SRP (FIG. 32)
   The cell information search pointer (CI_SRP) records address information required for accessing this cell information.
CI_SA (cell information start address)
   Records the start address of the cell information. The cell is accessed by seeking this address.
CI (FIG. 32)
   CI (cell information) is one of two types: M_CI for movies, or S_CI for still image.
M_CI (FIG. 34)
   M_CI (movie cell information) comprises the following fields: M_C_GI and M_C_EPI.
M_C_GI (FIG. 34)
   M_C_GI (movie cell general information) contains the following basic information for each cell.
C_TY (cell type)
   Records the following information formatted as shown in FIG. 35 for identifying movie cells and still image cells.
C_TY1
000b: movie cell
001b: still image cell
M_VOBI_SRPN (movie VOB information search pointer number)
   Records the search pointer number of the movie VOB information corresponding to this cell. To access the stream data corresponding to this cell, it is first necessary to access the movie VOB information search pointer number indicated by this field.
C_EPI_Ns (cell entry point information number)
   Records the number of an entry point to this cell. An entry point is an address in the reproduction path which can be used in a seek operation to find a specific point from which reproduction is to commence. If entry points are used and playback advances to an entry point in the reproduction path, playback can jump to the recorded absolute address and continue reproduction therefrom, thereby enabling a reproduction path to skip from point to point. These entry points can be set as desired in the reproduction stream in a manner similar to marking a page in a book with a bookmark so that if reproduction is interrupted it can be resumed as desired from a particular location.
C_V_S_PTM (cell video start time)
   Records the playback start time of the cell using the format shown in FIG. 10.
C_V_E_PTM (cell video end time)
   Records the playback end time of the cell using the format shown in FIG. 10. Used in conjunction with C_V_S_PTM and C_V_E_PTM to define the cell period within the corresponding VOB.
M_C_EPI (FIG. 36)
   M_C_EPI (movie cell entry point information) is categorized as Type A or Type B based on the presence of primary text.

M_C_EPI (Type A) (FIG. 36)

M_C_EPI (Type A) contains the following information indicative of an entry point.

EP_TY (entry point type)

Figure 37:
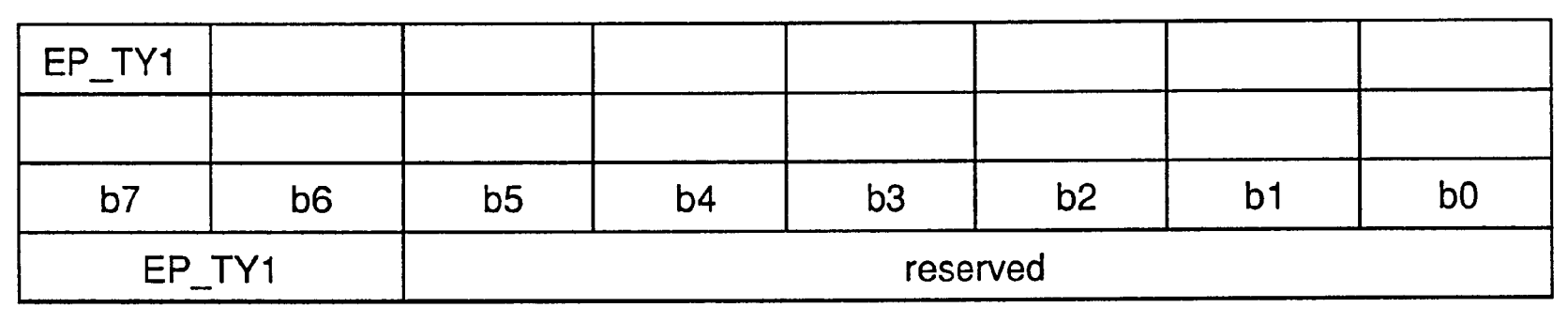

Records the following information formatted as shown in FIG. 37 for identifying the entry point type.

EP_TY1

00b: Type A

01b: Type B

EP_PTM (entry point time)

Records the time at which the entry point is set according to the format as shown in FIG. 10.

M_C_EPI (Type B) (FIG. 36)

In addition to the same EP_TY and EP_PTM fields of Type A, M_C_EPI (Type B) has a PRM_TXTI field as described below.

PRM_TXTI (primary text information)

Records text information describing the content of the location indicated by the entry point. Details of this information are as described in the above-noted PL_SRPT.

S_CI (FIG. 34)

S_CI (still image cell information) comprises S_C_GI and S_C_EPI fields.

S_C_GI (FIG. 34)

S_C_GI (still image cell general information) contains the basic cell information described below.

C_TY (cell type)

Records information for identifying movie cells and still image cells. This cell type information is as described above with reference to a movie cell.

S_VOGI_SRPN (still image VOB group information search pointer number)

Records the search pointer number of the still image VOB group information for the cell. To access the stream data corresponding to the cell, it is first necessary to access the still image VOB group information search pointer number indicated by this field.

C_EPI_Ns (cell entry point information number)

Records the number of an entry point in this cell.

S_S_VOB_ENTN (starting still image VOB number)

Records the still image VOB number from which cell reproduction starts according to the format as shown in FIG. 11. The still image VOB number is the sequence number in the S_VOG pointed to by the above-noted S_VOGI_SRPN.

E_S_VOB_ENTN (end still image VOB number)

Records the still image VOB number at which cell reproduction ends according to the format as shown in FIG. 11. The still image VOB number is the sequence number in the S_VOG pointed to by the above-noted S_VOGI_SRPN. It should be noted that the valid cell period in the S_VOG to which the cell belongs is defined by this field in conjunction with S_S_VOB_ENTN and E_S_VOB_ENTN.

S_C_EPI (FIG. 36)

S_C_EPI (still image cell entry point information) is categorized as Type A or Type B depending upon the presence of primary text.

S_C_EPI (Type A) (FIG. 36)

S_C_EPI (Type A) contains the following information indicative of an entry point.

EP_TY (entry point type)

Records the following information formatted as shown in FIG. 37 for identifying the entry point type.

EP_TY1

00b: Type A

01b: Type B

S_VOB_ENTN (still image VOB entry number)

Records the still image number in which the entry point is set according to the format as shown in FIG. 11.

S_C_EPI (Type B) (FIG. 36)

In addition to the same EP_TY and S_VOB_ENTN fields of Type A, S_C_EPI (Type B) has a PRM_TXTI as described below.

PRM_TXTI (primary text information)

Records text information describing the content of the located indicated by the entry point. Details of this information are as described in the above-noted PL_SRPT.

Entry Points and Management Information

Figure 44:
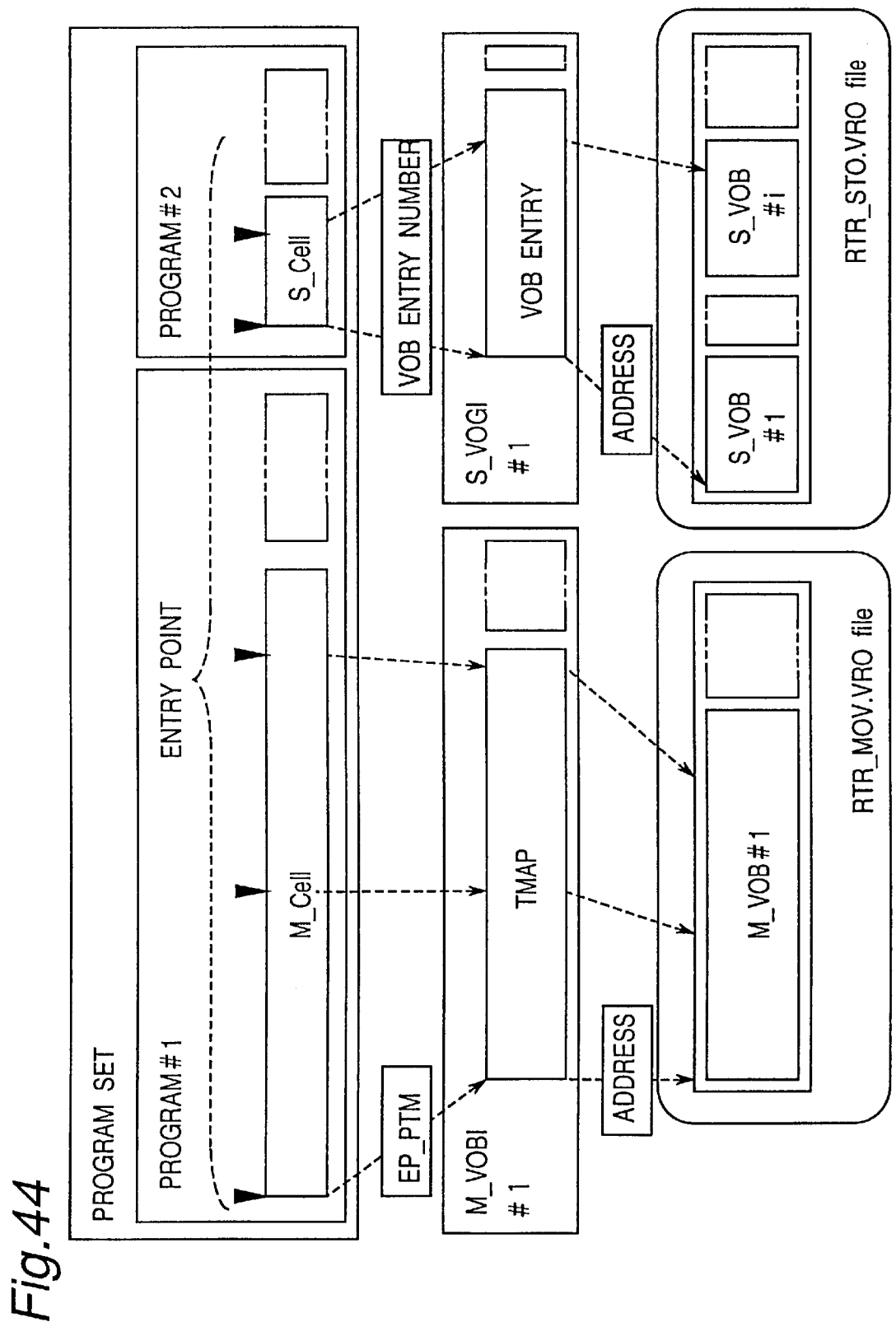
FIG. 44 shows the correlation between AV data and entry points.

The relationship between entry points and management information is described next with reference to FIG. 44. As noted above, there are two types of AV data: M_VOB and S_VOB.

M_VOB has M_VOBI management information for each M_VOB. M_VOBI record attributes about the corresponding M_VOB.

Attempting to manage S_VOB with management information recorded for each individual S_VOB would significantly increase the amount of management information stored. A number of S_VOB are therefore combined in S_VOB groups (S_VOG), which are then managed using management information S_VOGI. The S_VOGI stores attributes for the S_VOB group.

Plural entry points can be set for the movie cells corresponding to an individual M_VOB with the M_C_EPI (movie cell entry point information) recorded in M_CI. As described above, M_C_ EPI is either Type A or Type B depending on the presence of primary text. If Type A, the entry point time (EP_PTM), that is, the time at which the entry point is set, is recorded with the entry point type (EP_TY). If Type B, text information (PRM_TXT) describing the content of the address indicated by the entry point is recorded in addition to the information recorded for Type A.

Using the recorded entry point time (EP_PTM) and filter TMAP for converting time and address information in the M_VOBI, the time at which the entry point is placed can be converted to a M_VOB address. The TMAP records the size of the VOBU corresponding to this time, and playback time information. This information can thus be used to calculate the address of the corresponding M_VOB.

A method for converting time information to an address using this TMAP is taught in detail in Japanese Unexamined Patent Application (kokai) 11-155130 (EU Patent 0 903 738 A2), the content of which is contained herein by reference.

Plural entry points can be set for the still image cells corresponding to an individual S_VOB with the S_C_EPI (still image cell entry point information) recorded in S_CI. As described above, S_C_EPI is either Type A or Type B depending on the presence of primary text. If Type A, the still image VOB number S_VOB_ENTN is recorded with the entry point type (EP_TY). If Type B, text information (PRM_TXT) describing the content of the address indicated by the entry point is recorded in addition to the information recorded for Type A.

The time at which the entry point is set can be converted to an S_VOB address using the recorded still image VOB number S_VOB_ENTN in conjunction with the filter S_VOB Entries for converting an address and still image number in the still image VOB group of the S_VOBI. S_VOB Entries records the Video Part size, which can be used to calculate the address of the Video Part contained in the corresponding still image VOB group.

Figure 45:
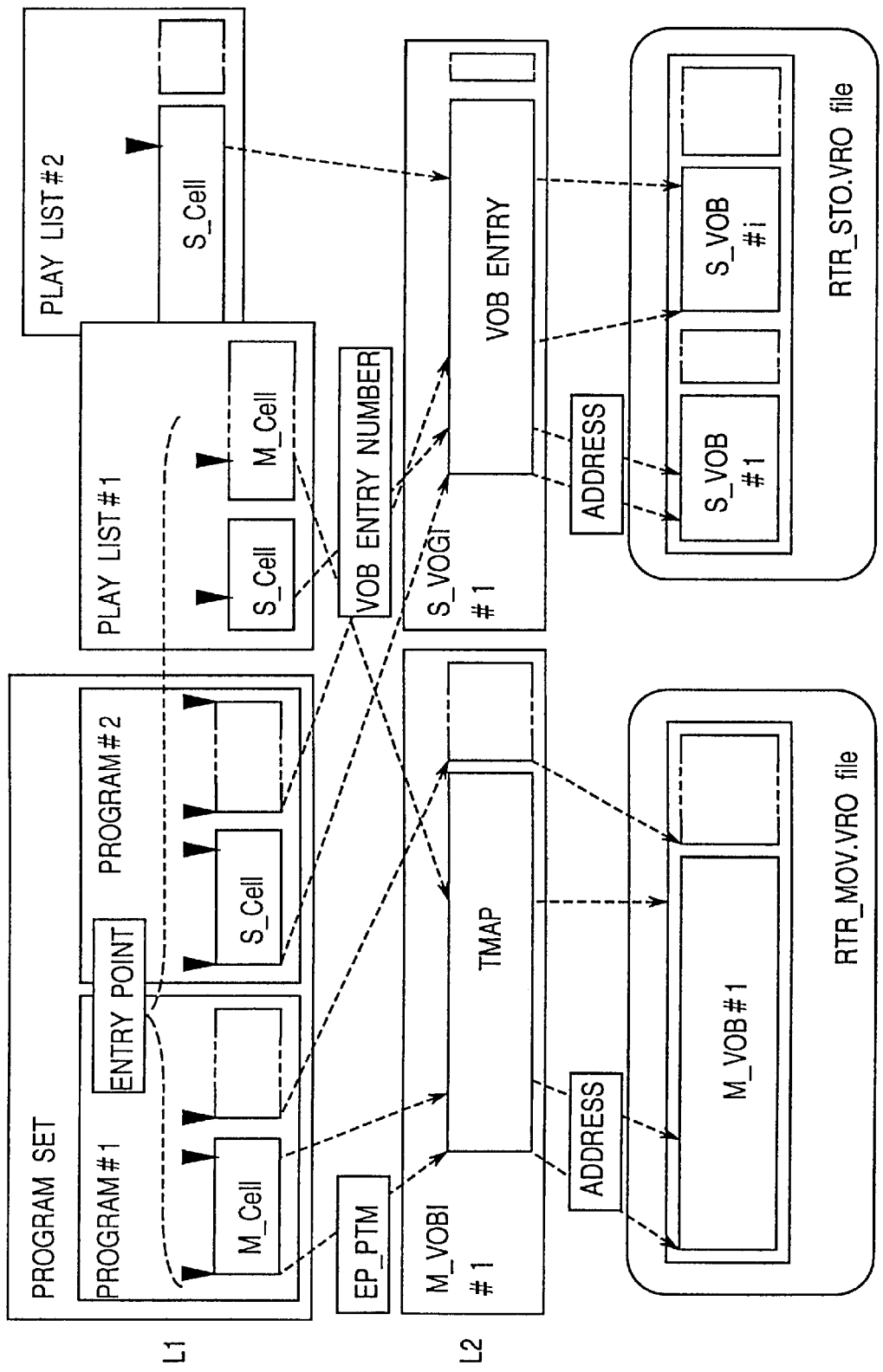
FIG. 45 shows the correlation between a program chain PGC and entry points.

As shown in FIG. 45, when plural reproduction paths are present, such as the user-defined PGC indicated by Play List

1 and Play List #2, it is still possible to set a plurality of entry points for each movie cell or still image cell.

If plural entry points are set for each M_VOB movie cell, the M_C_EPI (movie cell entry point) field is recorded to M_CI.

If plural entry points are set for each S_VOB still image cell, the S_C_EPI (still image cell entry point) field is recorded to S_CI.

Figure 34:
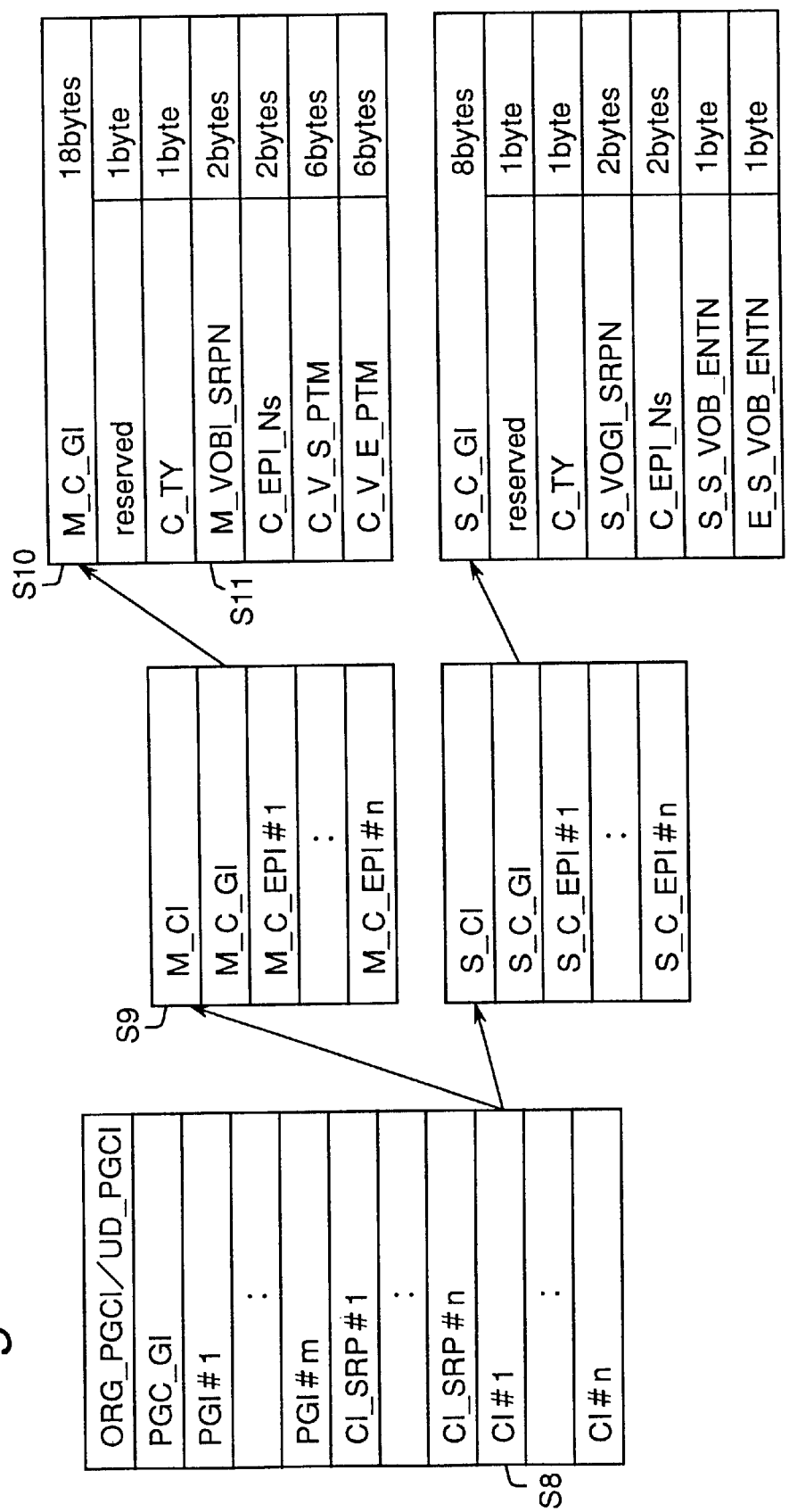
FIG. 34 shows the structure of the CI block.
Figure 38:
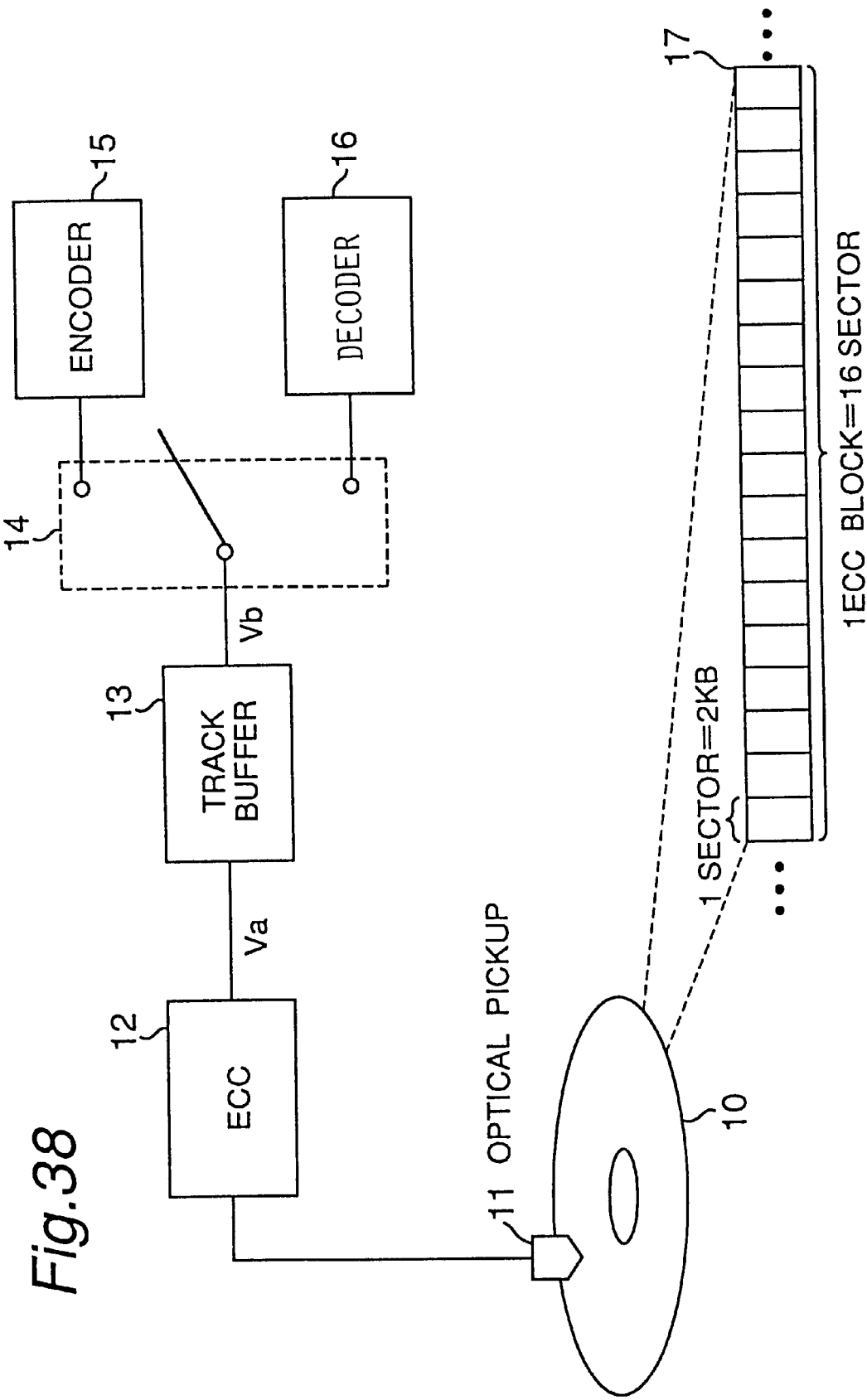
FIG. 38 is a block diagram of a DVD recorder drive.
Figure 39A:
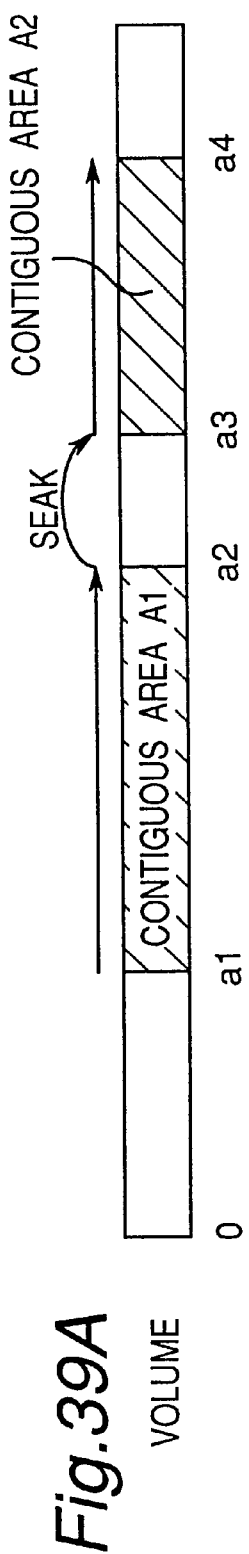
FIG. 39(*a*) shows the volume address space of a disc, and (*b*) shows the change in data accumulation in the track buffer.
Figure 39B:
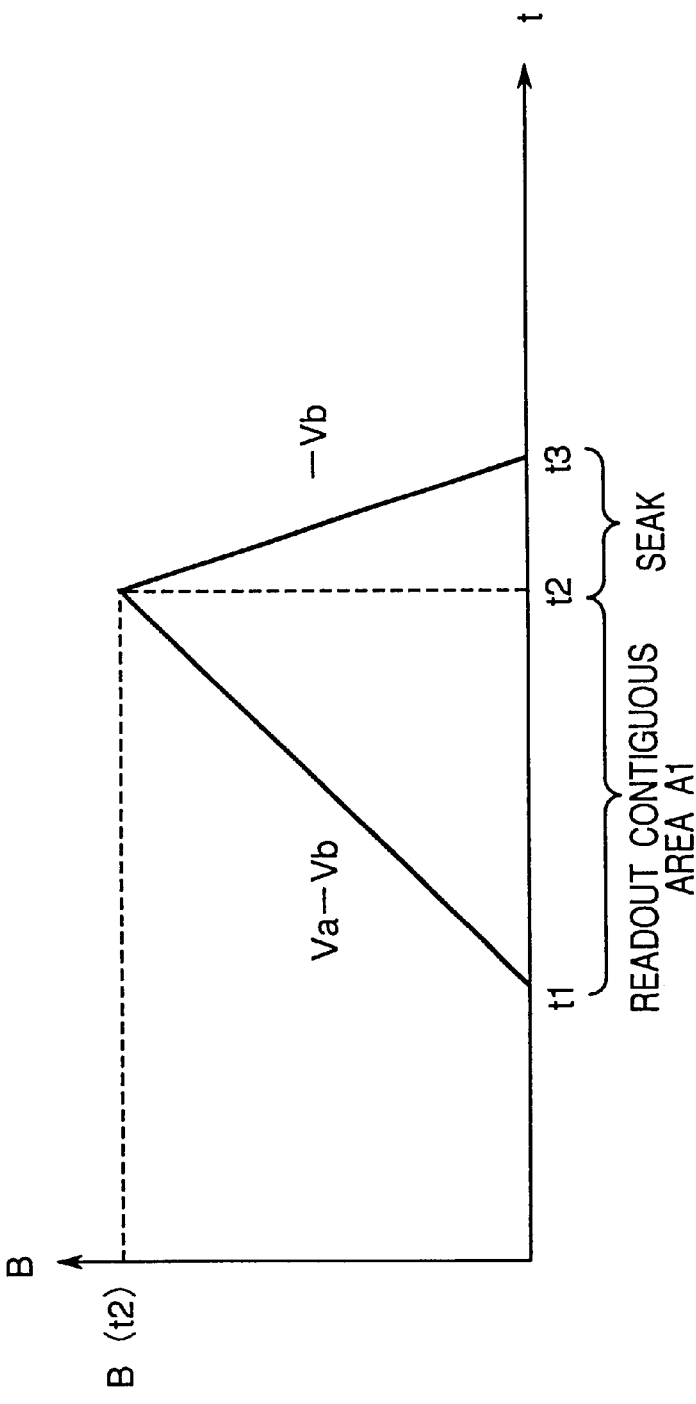
Figure 40:
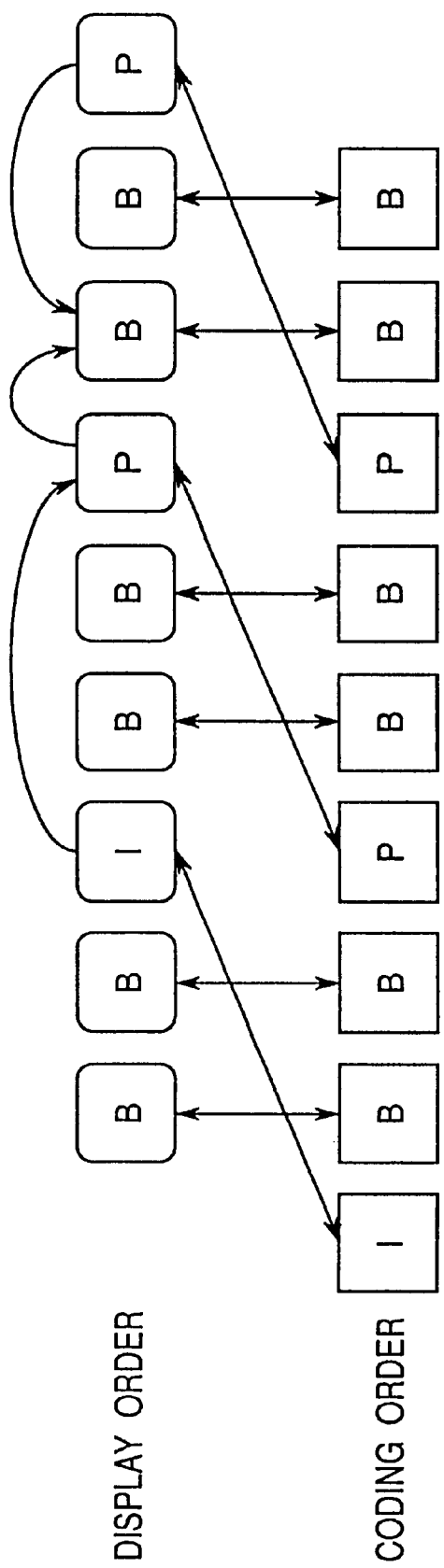
FIG. 40 shows the correlation between picture types in an MPEG video system stream.
Figure 41:
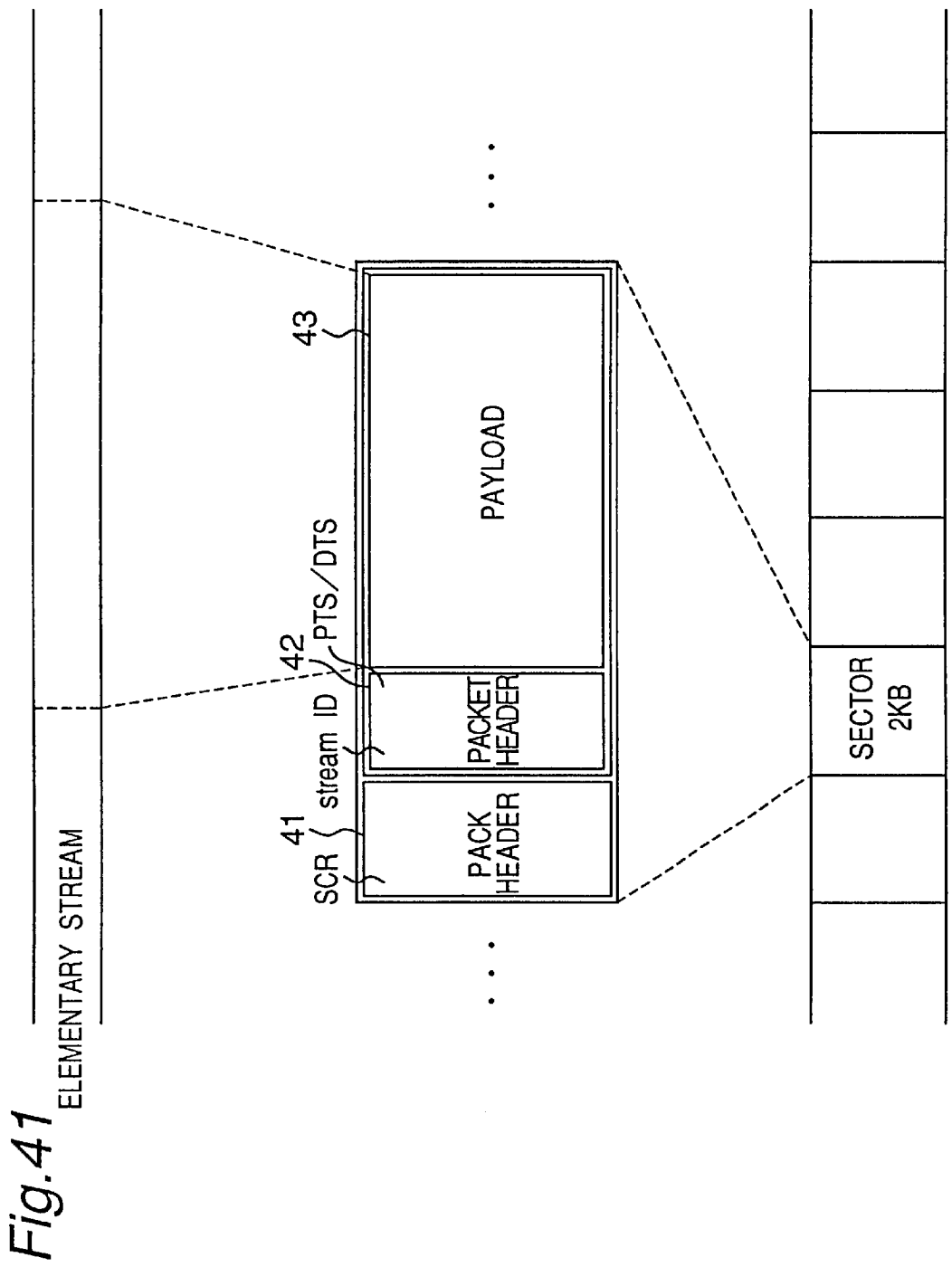
FIG. 41 shows the structure of an MPEG system stream.
Figure 42:
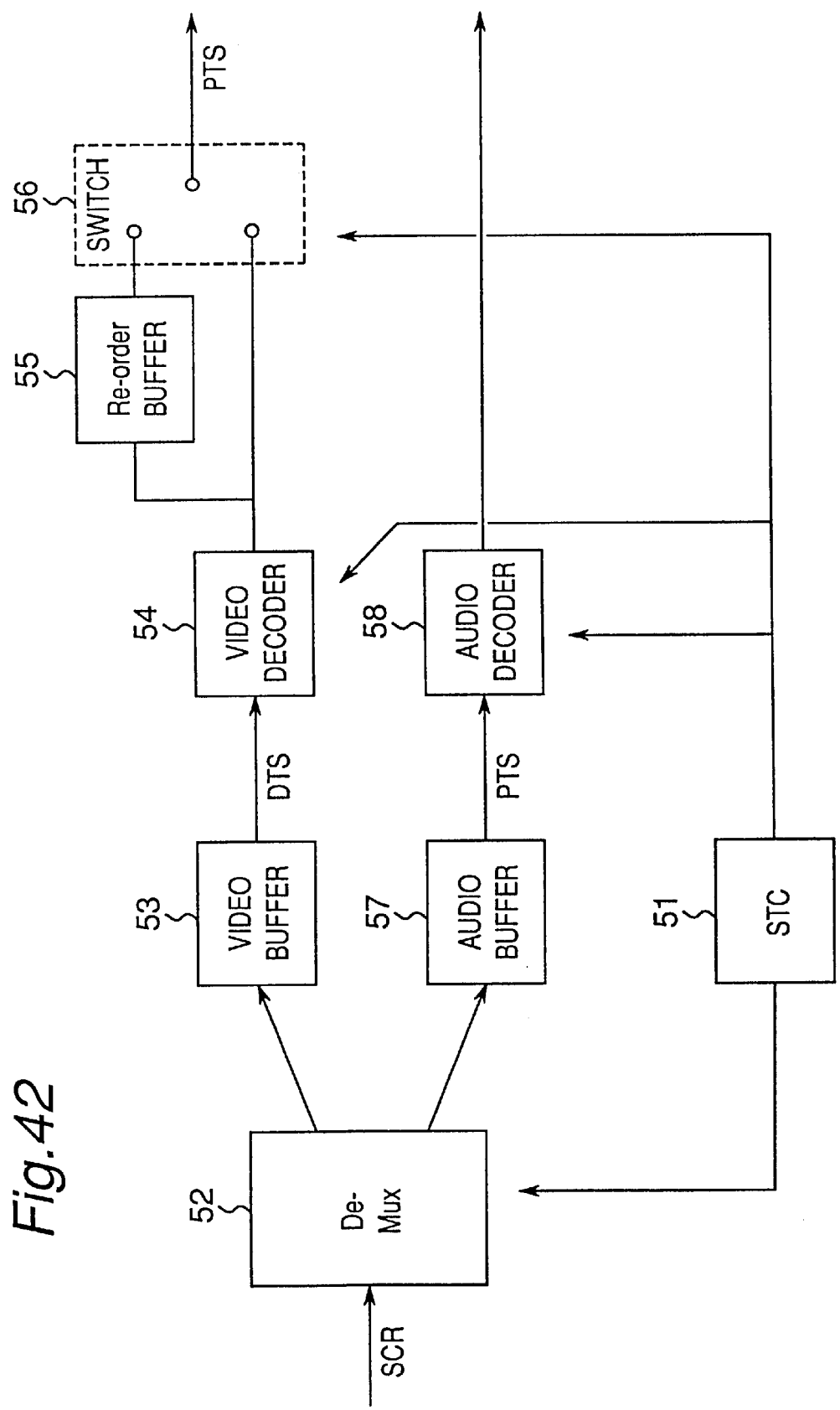
FIG. 42 is a block diagram of an MPEG system decoder (P_STD)
Figure 43:
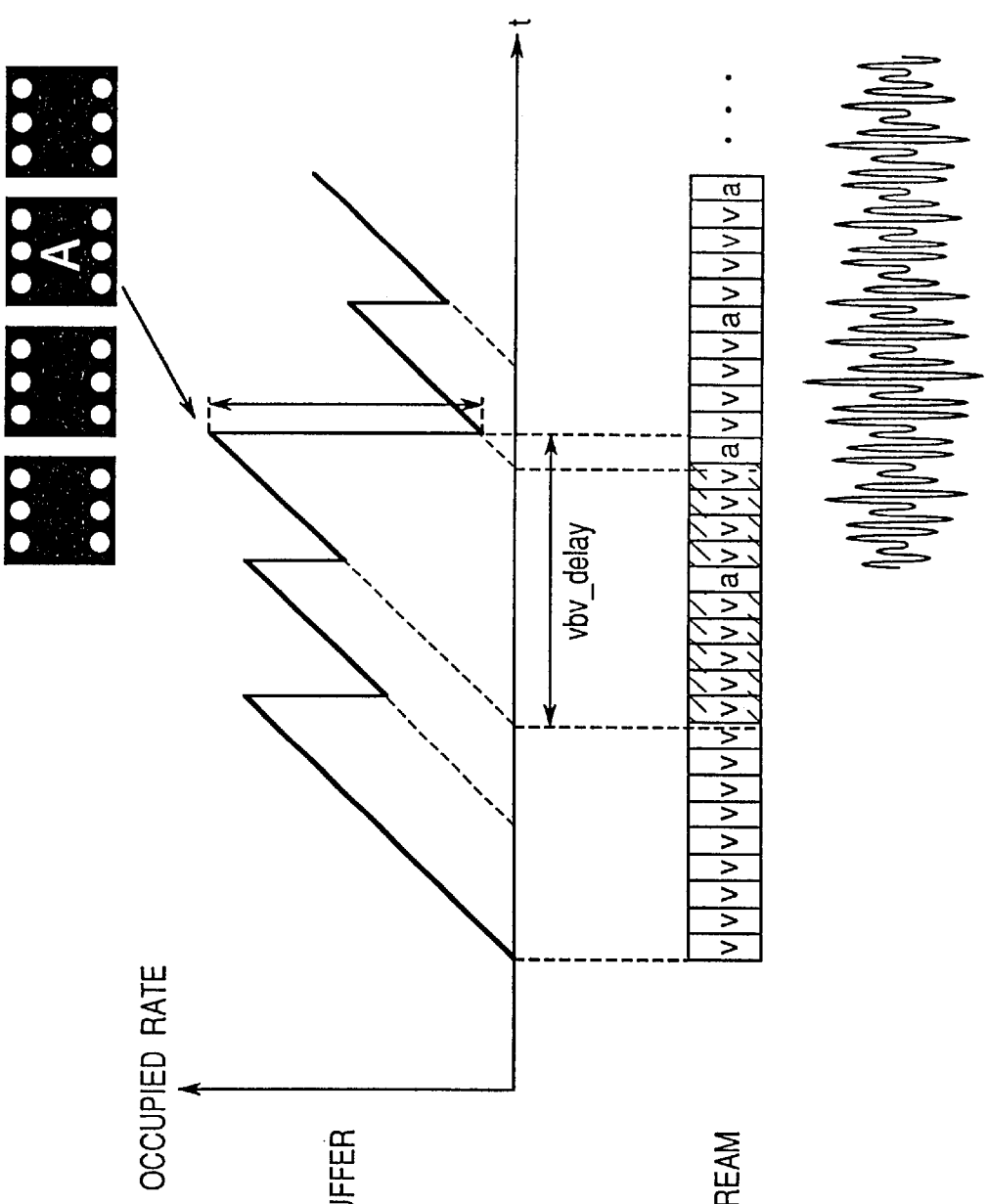
FIG. 43(*a*) shows video data, (*b*) shows the change in data accumulation in the video buffer, (*c*) shows the MPEG system stream, and (*d*) show the audio data.

The part shown as the program set in FIG. 45 corresponds to the original program information (ORG_PGCI), and program #1 corresponds to PGI#1 of ORG_PGCI in FIG. 34. Play list #1 also corresponds to UD_PGCI PGI#1 in FIG. 34. The solid black triangles in FIG. 45 indicate entry point positions, the triangles at the M_Cell corresponding to M_C_EPI#1 and #2 in FIG. 34, and the triangles at the S_Cell corresponding to S_C_EPI#1 and #2 in FIG. 34.

M_Cell contains information indicating from and to where in the M_VOBI block to reproduce. S_Cell contains information indicating which still image in the S_VOBI (still image VOB information) to reproduce.

A program for reproducing the program stream in the sequence recorded is set in the original program information (ORG_PGCI). Play list #1 and #2 define a group of cells and a reproduction sequence as defined by the user. The time at which a particular cell is reproduced, that is, the presentation time, will thus vary for cells in the same program stream depending on whether the original program #1, play list #1, or play list #2 is reproduced. It will thus be obvious that the reproduction sequence can be changed, and parts of a program stream can be effectively deleted, by applying user-defined play lists to a same program stream. In other words, plural reproduction paths can be defined.

In addition, an entry point set for an M_VOB in original program #1 (referred to as a first entry point) is managed by the original program management information (ORG_PGCI), and an entry point (second entry point) set for the same M_VOB but associated with play list #1 is managed by the management information UD_PGCI of the play list #1. Therefore, when the program stream is reproduced according to program #1, only the first entry point operates as a valid entry point, and the second entry point is not used. Likewise when reproducing play list #1, only the second entry point operates as a valid entry point, and the first entry point is not used. It is thus possible as indicated by the black triangles in FIG. 45 to independently set entry points for each of plural reproduction paths.

Figure 5:
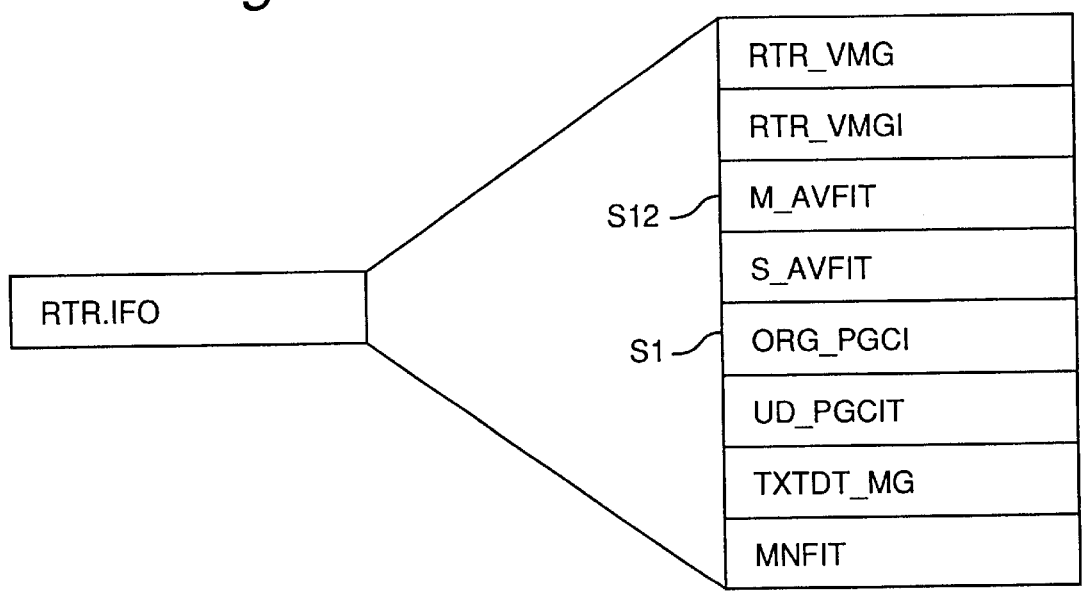
FIG. 5 shows the structure of the RTR_VMG block.
Figure 6:
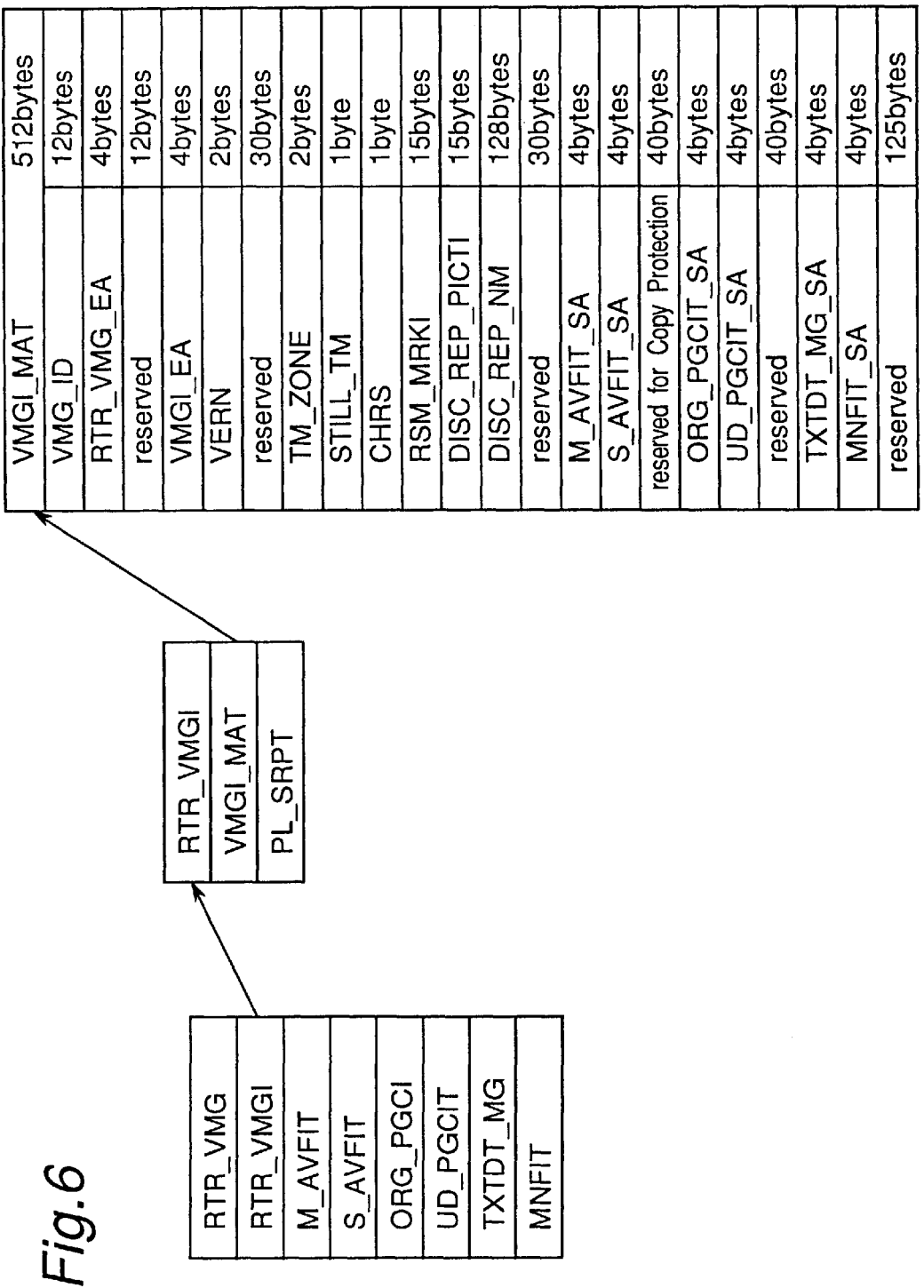
FIG. 6 shows the structure of the RTR_VMGI block.
Figure 8:
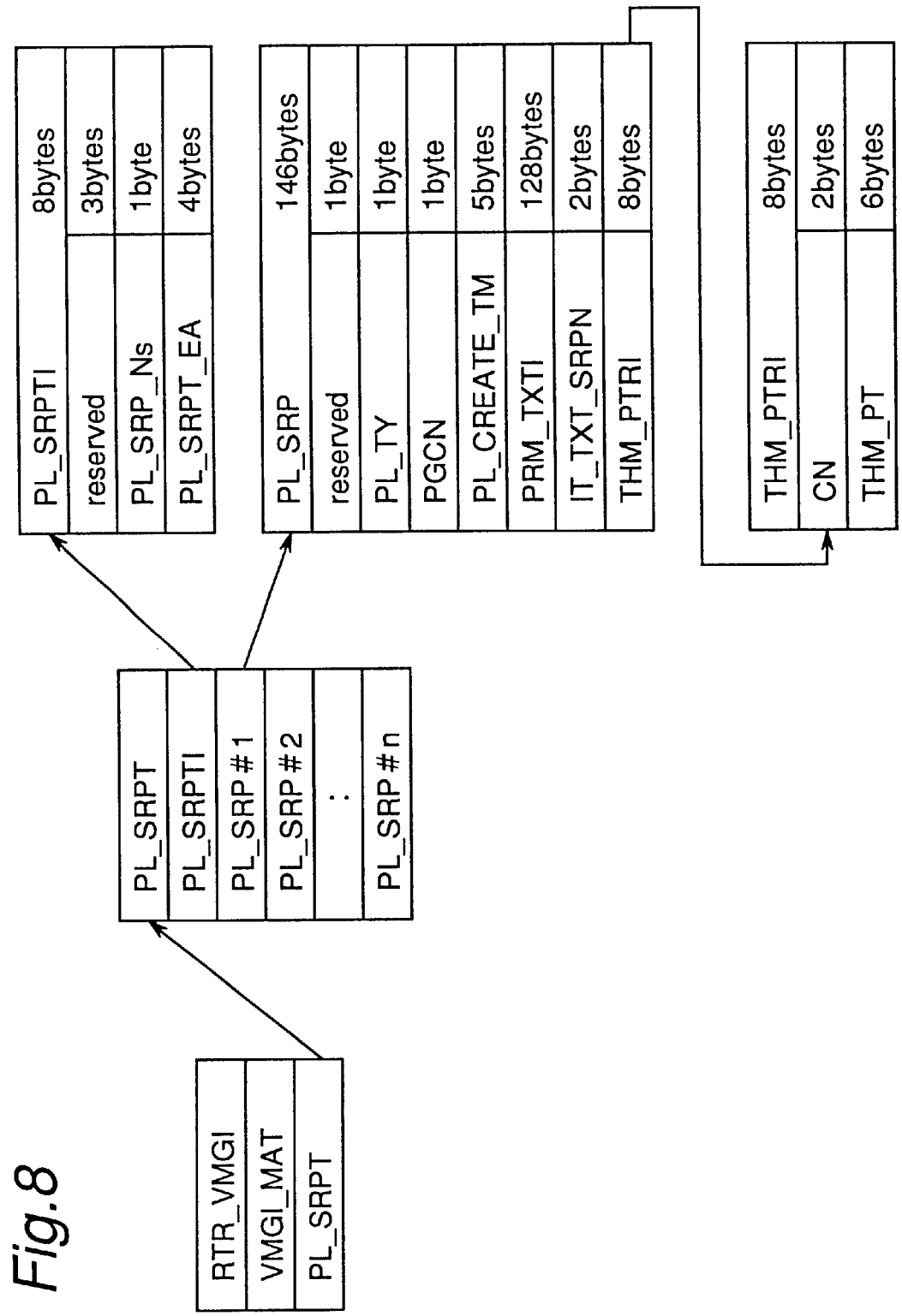
FIG. 8 shows the structure of the PL_SRP block.
Figure 12:
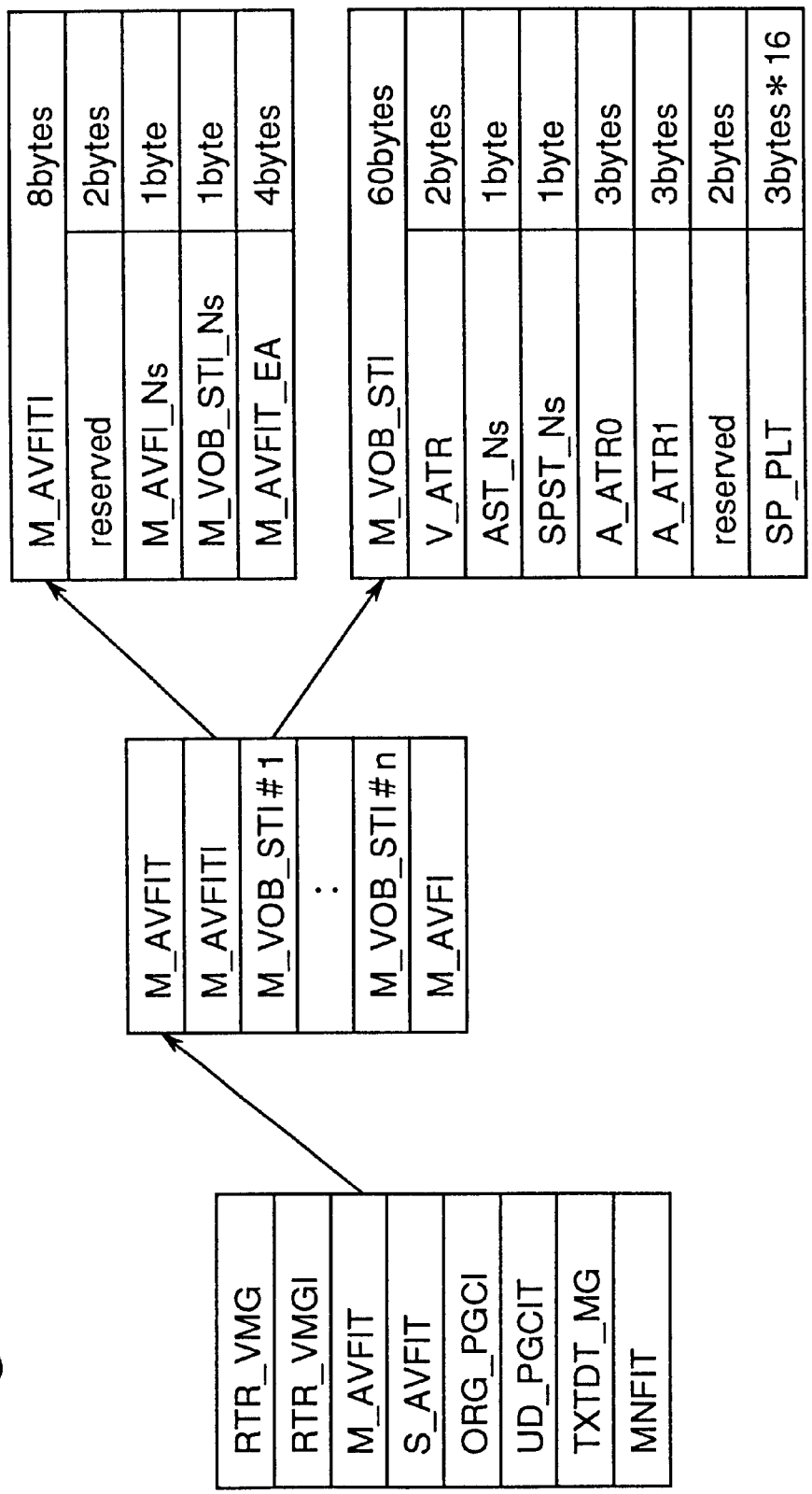
FIG. 12 shows the structure of the M_AVFIT block.
Figure 32:
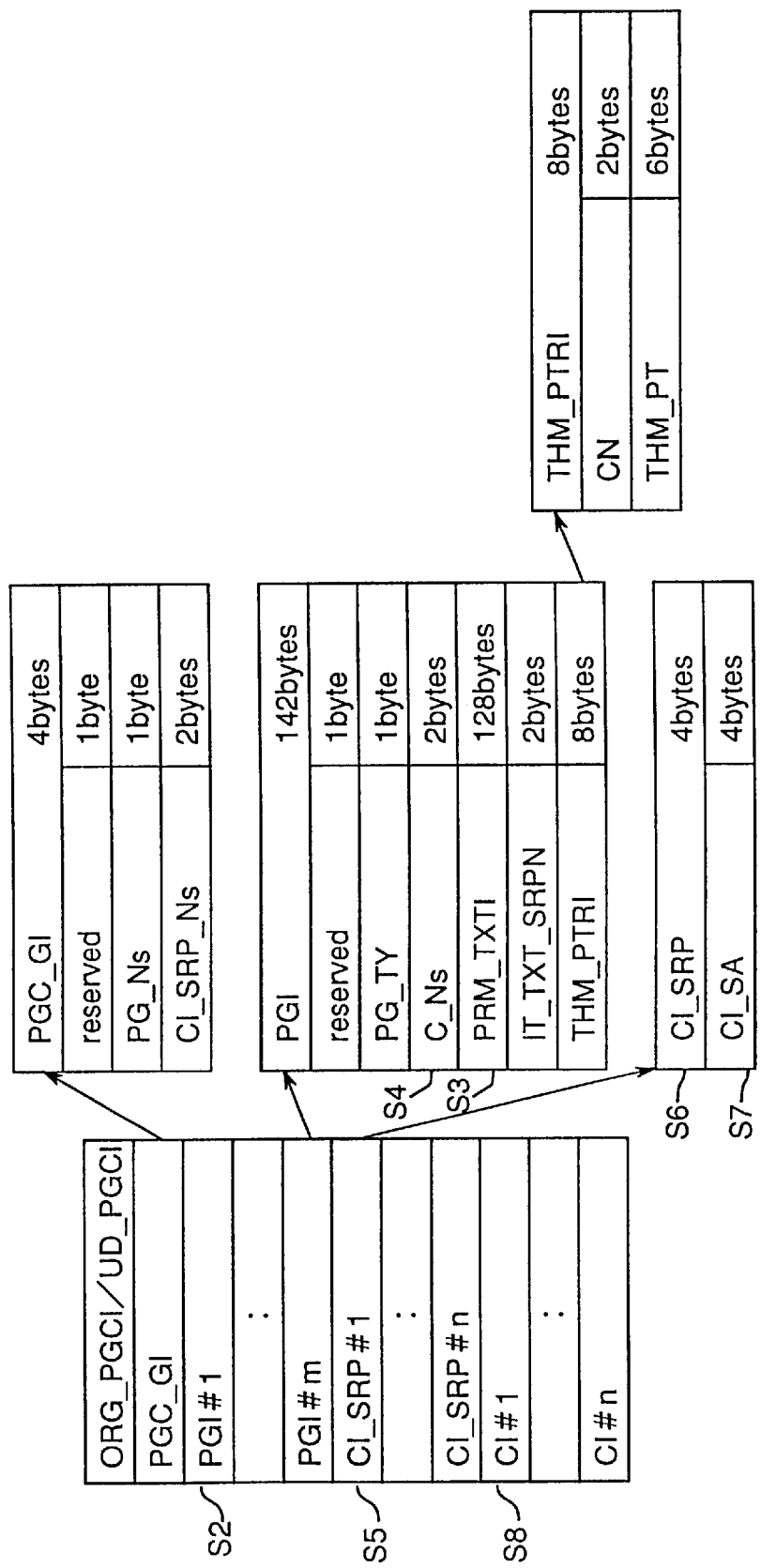
FIG. 32 shows the structure of the PGCI block.

The hierarchical structure of the ORG_PGCI management information is shown in FIG. 5, FIG. 32, and FIG. 34, The hierarchical structure of the UD_PGCI management information is shown in FIG. 5, FIG. 30, FIG. 32, and FIG. 34. It should be noted that UD_PGCIT (user defined program chain information table) is shown in FIG. 5 because there can be plural UD_PGCIT. A UD_PGCI table is therefore provided so that a desired single UD_PGCIT can be selected.

Figure 15:
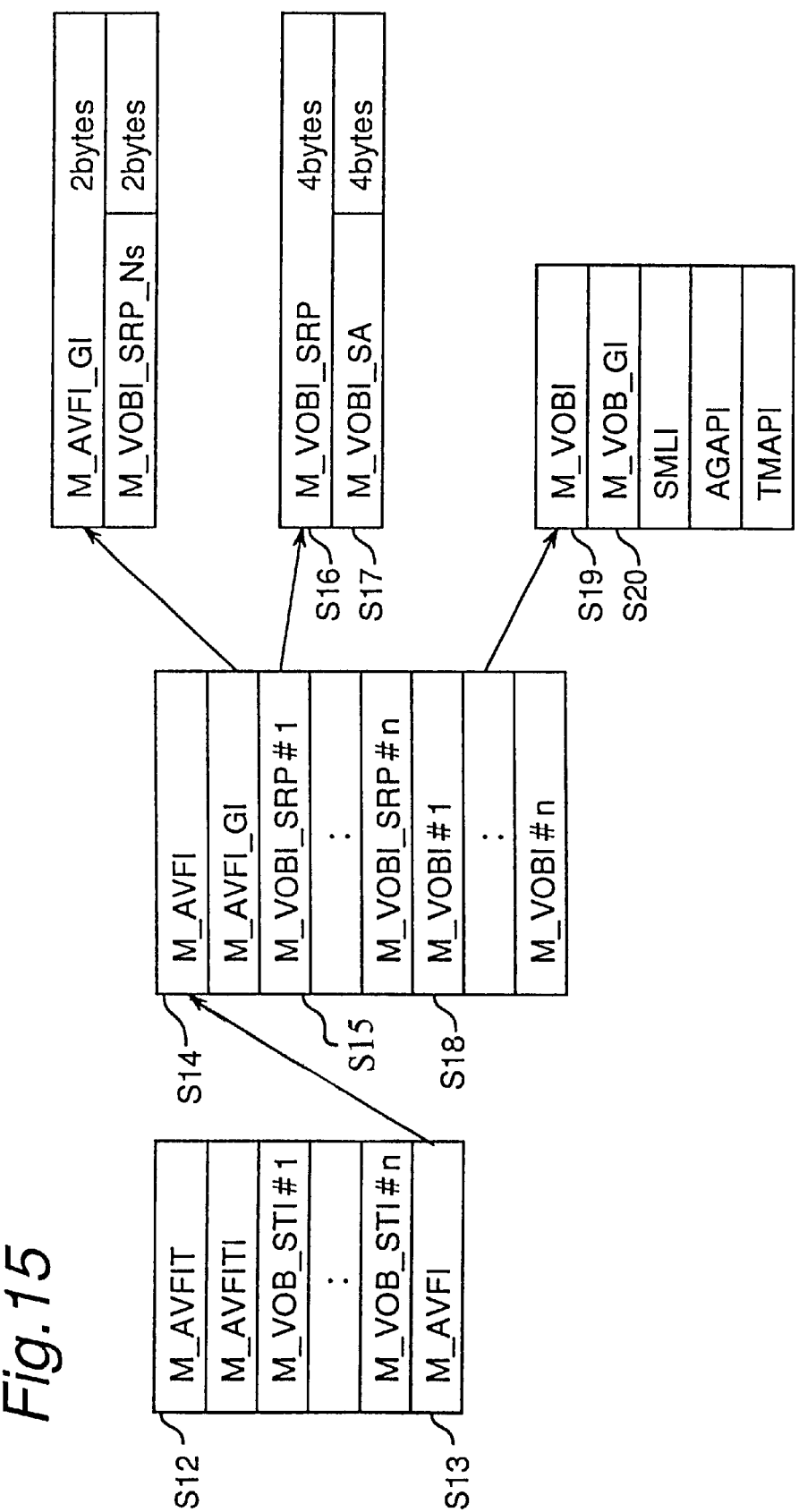
FIG. 15 shows the structure of the M_AVFI block.

The S_VOGI (Still Video Object Group Information) and movie management information M_VOBI are shown in row L2 of FIG. 45. A maximum 999 M_VOBI blocks can be created on an optical disc. The hierarchical structure of this M_VOBI management information is shown in FIG. 5, FIG. 15, and FIG. 16.

It can be determined by reading the management information described below in the sequence indicated by steps S1 to Sn whether a cell in the row L1 program chain information PGCI is associated with any M_VOBI management information for movies on row L2.

S1 in FIG. 5→S2→S4 in FIG. 32 (C_Ns is the number of cells in the program. The number of the cell contained in the desired program is obtained by counting from the first program. The number of the obtained cell is used as the cell search pointer CI_SRP#n.)

S5→S6→S7 (Obtain the cell address based on the cell search pointer.)

S8 (Obtain the number of the address cell information.)

FIG. 34, S9 (movie cell information M_CI)

S10 (movie cell general information M_C_GI)

S11 (movie VOB information search pointer number M_VOBI_SRPN)

FIG. 5, S12 (AV file information table)

FIG. 15, S13→S14→S15 (access the movie VOB information search pointer detected in S11)

S16→S17 (determine the movie VOB information start address)

S18→S19 (Step #495 in FIG. 49)

The start presentation time (VOB_V_S_PTM) of the movie can be determined from the movie VOB information M_VOBI in FIG. 18 using TMAPI (S20) and TMAP_GI (S21).

Configuration of a DVD Recorder

The configuration of a DVD recorder is described next below with reference to FIG. 46.

As shown in the Figure, this DVD recorder comprises a user interface 7801 for interaction with the user, a system controller 7802 for handling overall management and control of the recorder, an input block 7803 comprising an AD converter for audio and video input to the recorder, an encoder 7804, an output section 7805 for audio and video output, a decoder 7806 for MPEG stream decoding, a track buffer 7807, and a drive 7808.

Operation of a DVD Recorder

An entry point reproduction operation using entry points is described next below.

When the user interface 7801 receives an entry point play request from the user requiring access to an entry point, it posts an entry point play request to the system controller 7802. The system controller 7802 then performs the following steps.

A. To Play a Movie (1) If an optical disc is in the disc player, the system controller 7802 reads and stores the management information containing the entry point information from the disc.

(2) The system controller 7802 reads address information indicating the current playback position from the decoder 7806.

(3) The system controller 7802 converts this address information to time information T0 (in broad terms, a point) in the reproduction path.

(4) The system controller 7802 then compares this time information T0 with the time list (time EP_PTM recorded to M C_EPI#1, #2 . . . #n in FIG. 34), that is, the entry point information group in the management information. If forward playback is in progress, the system controller 7802 selects the entry point that is greater than (later than) time information T0 and is closest to T0 in the entry point time list. If reverse playback is in progress; the system controller 7802 selects the entry point that is lower (earlier) than and closest to T0.

(5) The system controller 7802 converts the time obtained from the time list to address information.

(6) The system controller 7802 instructs the drive 7808 to jump from the current playback position to the position identified by the converted address information.

(7) The system controller 7802 instructs the decoder 7806 to decode and output this new playback position to which the drive 7808 just jumped.

B. To Play Back (1) If an optical disc is in the disc player, the system controller 7802 reads and stores the management information containing the entry point information from the disc.

(2) The system controller 7802 reads address information indicating the current playback position from the decoder 7806.

(3) The system controller 7802 converts the address information to still image number information S0, that is, address information in the program stream. This still image number information S0 indicates the sequence number of the still image currently being reproduced in the reproduction path.

(4) The system controller 7802 compares the converted still image number information S0 with the still image number list (still image number S_VOB_ENTN (FIG. 36) recorded in S_C_EPI#1, #2 ... #n (FIG. 34), that is, entry point information in the management information. If forward playback is in progress, the system controller 7802 selects the still image with a still image number next greater than still image number information S0 from the still image number list of entry points. If in reverse playback, it selects the still image with a still image number next lower than still image number information S0 from the still image number list of entry points.

(5) The system controller 7802 converts the still image number selected from the still image number list to address information.

(6) The system controller 7802 instructs the drive 7808 to jump from the current playback position to the position identified by the converted address information.

(7) The system controller 7802 instructs the decoder 7806 to decode and output this new playback position to which the drive 7808 just jumped.

The process whereby the system controller 7802 converts an entry point to a VOB address during reproduction using an entry point is described next with reference to FIG. 47 and FIG. 48.

The system controller 7802 requires an entry point number as well as PGC number and cell number information to set an entry point (FIG. 49 #492).

Next, the system controller 7802 detects whether the cell containing the entry point specified in the cell information entered by the user by way of the user interface 7801 is a movie cell M_Cell or still image cell S_Cell (FIG. 49 #493).

Figure 47:
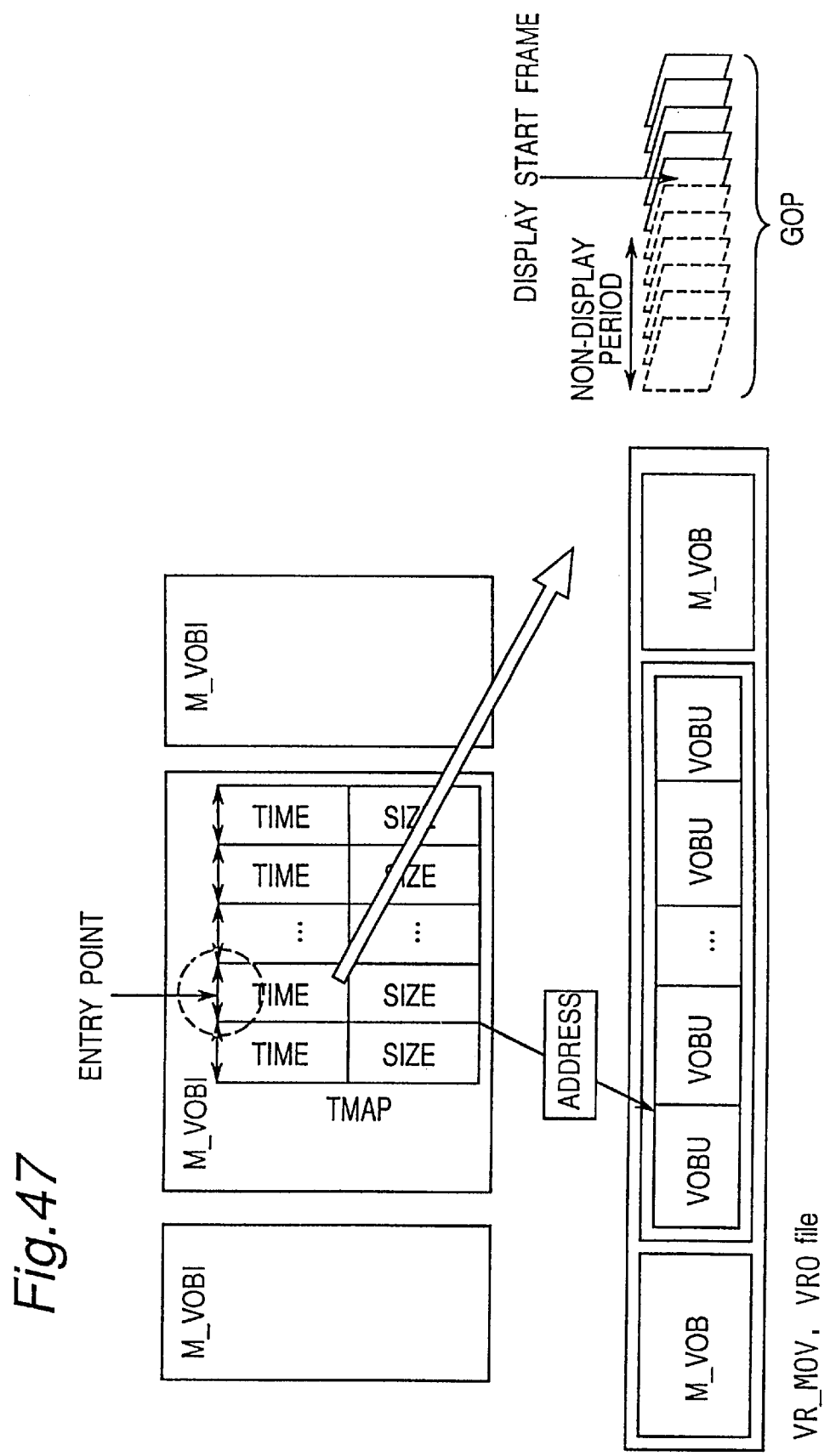
FIG. 47 is used to describe movie cell entry point reproduction in the DVD recorder shown in FIG. 46.

If reproduction from an entry point in a movie cell M_Cell is specified, the system controller 7802 converts the time at which the entry point is set to an M_VOB address using the filter TMAP for converting a time in an M_VOBI to an address (FIG. 47).

A process for converting a time to a movie VOB address is described next below with reference to FIG. 49.

The first step in this process is to read the entry point time EP_PTM (formatted as shown in FIG. 36) recorded to the movie cell entry point information M_C_EPI obtained from the specified entry point (#494). The system controller 7802 then retrieves the corresponding movie VOB information search pointer number M_VOBI_SRPN from the movie cell information M_CI specified by the cell number, and detects the search pointer number of the movie VOB information for the cell (#495).

The system controller 7802 then obtains the corresponding M_VOBI from M_VOBI_SRPN, and using the TMAP filter in M_VOBI obtains the EP_PTM detected in #494 as the address of a specific location in M_VOB. (#496)

The drive then accesses the detected address, and begins reproduction therefrom (#500). It is therefore possible to start playback from the entry point.

Figure 48:
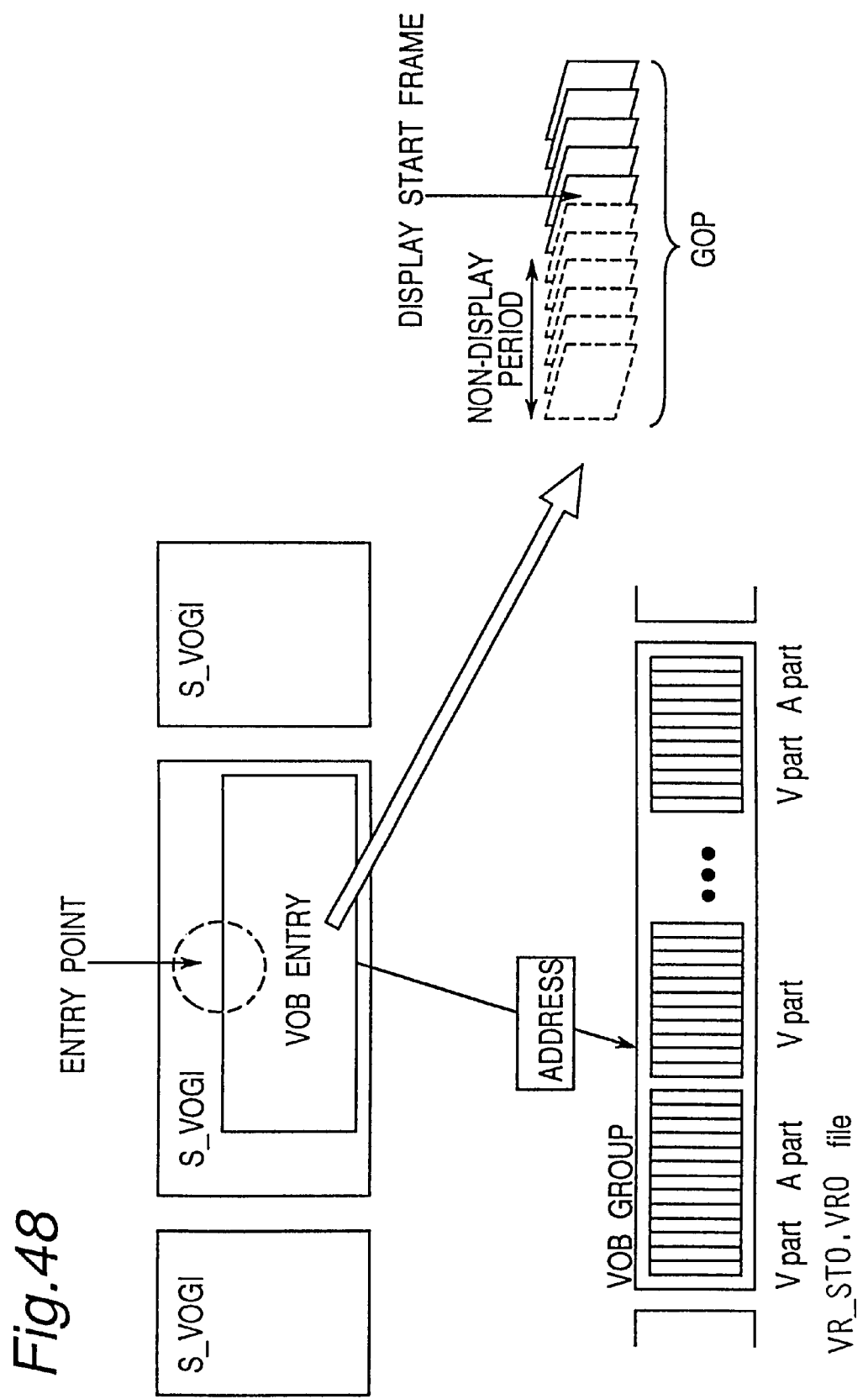
FIG. 48 is used to describe still image cell entry point reproduction in the DVD recorder shown in FIG. 46.

If playback from an entry point in a still image cell S_Cell is specified, the DVD recorder converts the S_VOB in which the entry point is set to an S_VOB address using the S_VOB Entries filter for converting the still image number and address information of the S_VOBI within the group (FIG. 48).

A process for converting a time to a still image VOB address is described next below with reference to FIG. 49.

The first step in this process is to read the still image VOB entry number S_VOB_ENTN (formatted as shown in FIG. 36) recorded to the still image entry point information S_C_EPI obtained from the specified entry point (#497). The system controller 7802 then retrieves the corresponding still image VOB group information search pointer number S_VOGI_SRPN from the still image cell information S_CI specified by the cell number, and detects the search pointer number of the still image VOB group information for the cell (#498).

The system controller 7802 then obtains S_VOB Entries corresponding to S_VOGI_SRPN, calculates the video part size V_PART_SZ to the S_VOB_ENTN detected in #497, and converts the time where the entry point is set to a still image VOB address (#499).

The drive then accesses the detected address, and begins reproduction therefrom (#500). It is therefore possible to start playback from the entry point. By thus converting entry point information to address information, the DVD recorder is able to use entry points set in the bitstream to begin playback from any desired point in the reproduction path.

Figure 46:
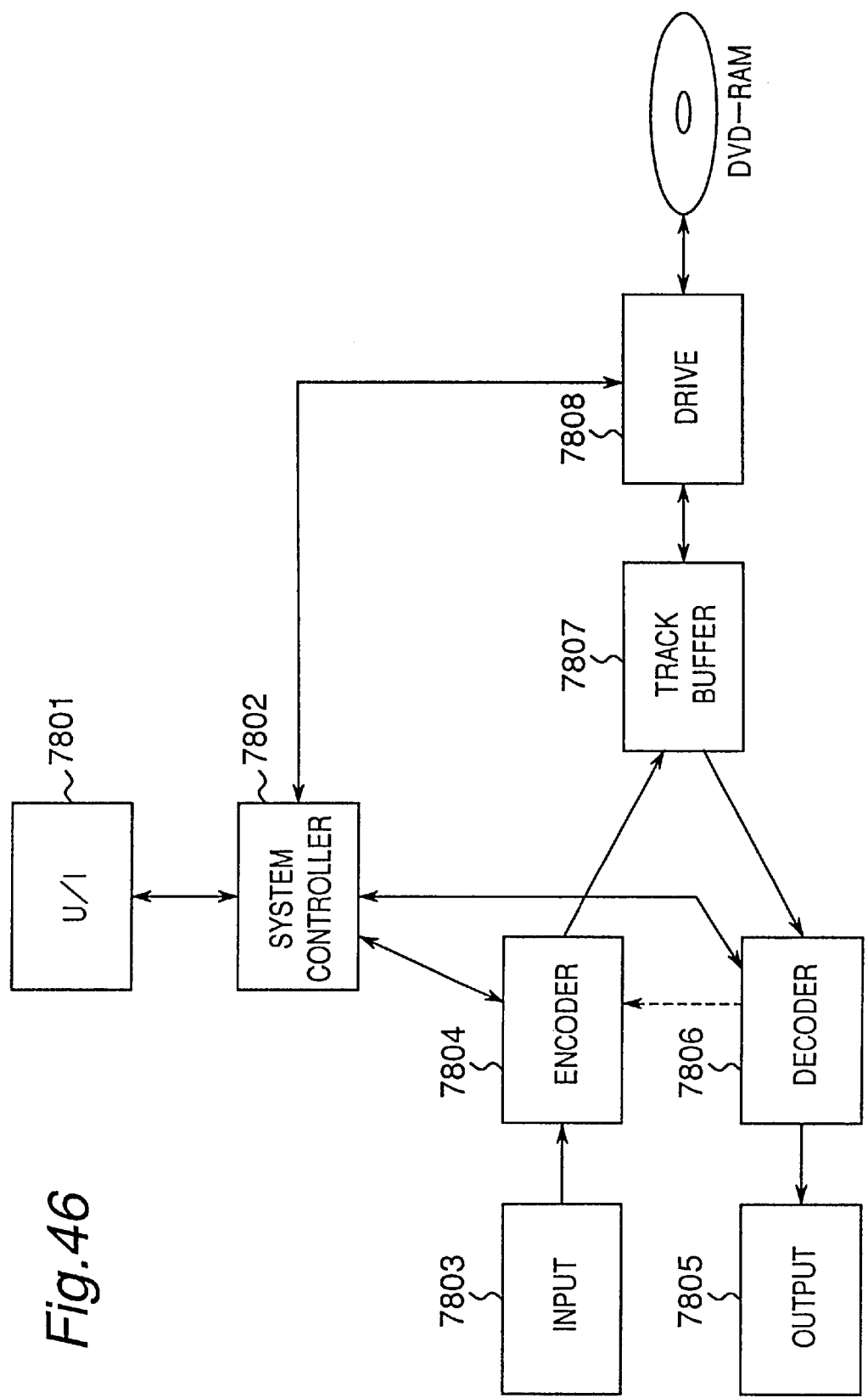
FIG. 46 is a block diagram of a DVD recorder according to the present invention.

Referring to FIG. 46, the system controller 7802 requests the drive 7808 to begin reading the stream based on address information converted from the disc, and instructs the decoder 7806 to decode and output the stream thus read. The drive 7808 thus reads the stream from DVD-RAM and passes the stream to the track buffer 7807. The decoder 7806 reads the stream from the track buffer 7807, decodes the stream, and passes the decoded stream to output section 7805. The output section 7805 then outputs the decoded video and audio to the monitor (screen) and speakers.

A method for jumping reproduction to a desired point in a reproduction path containing still images with no-accompanying audio is described next with reference to FIG. 50.

The playback time is not specified for still images with no accompanying audio. The playback time in this case is determined by STILL_TM or by user operations. A particular entry point therefore does not necessarily always indicate the same time (presentation time). Therefore, even if "00:07:50" is specified as the playback start time (FIG. 50), image "A" is not necessarily the image displayed because image "B" may still be displayed depending on any change in the value of STILL_TM.

On the other hand, an entry point is contained in a cell, and is therefore not affected by the playback time of the reproduction path. Playback from the same entry point is therefore always possible even if the playback time or playback end time of the part of the bitstream other than the cell containing the specified entry point changes as a result of the STILL_TM value or user operations.

Figure 51:
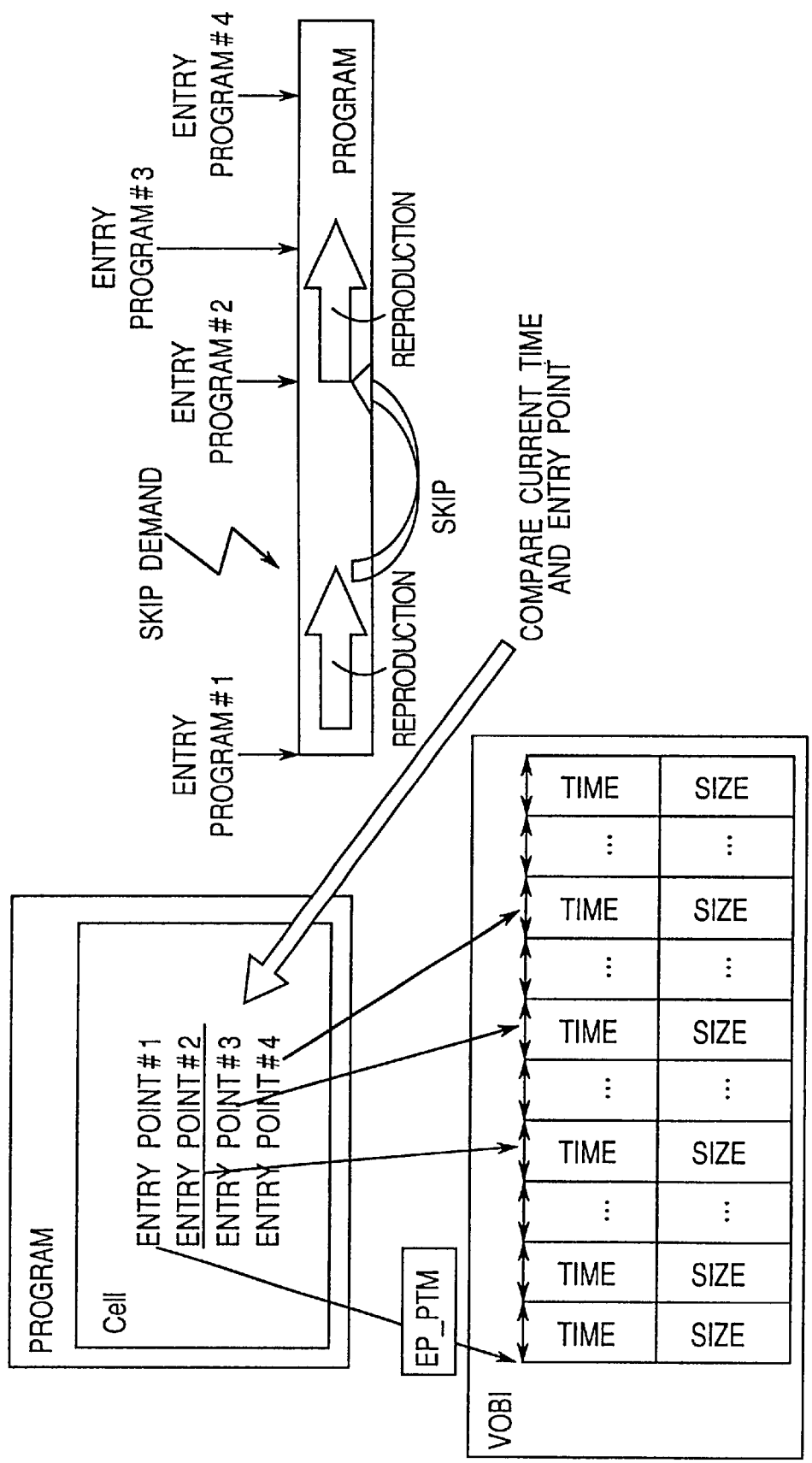
FIG. 51 is used to describe a high speed search in the DVD recorder shown in FIG. 46.
Figure 52:
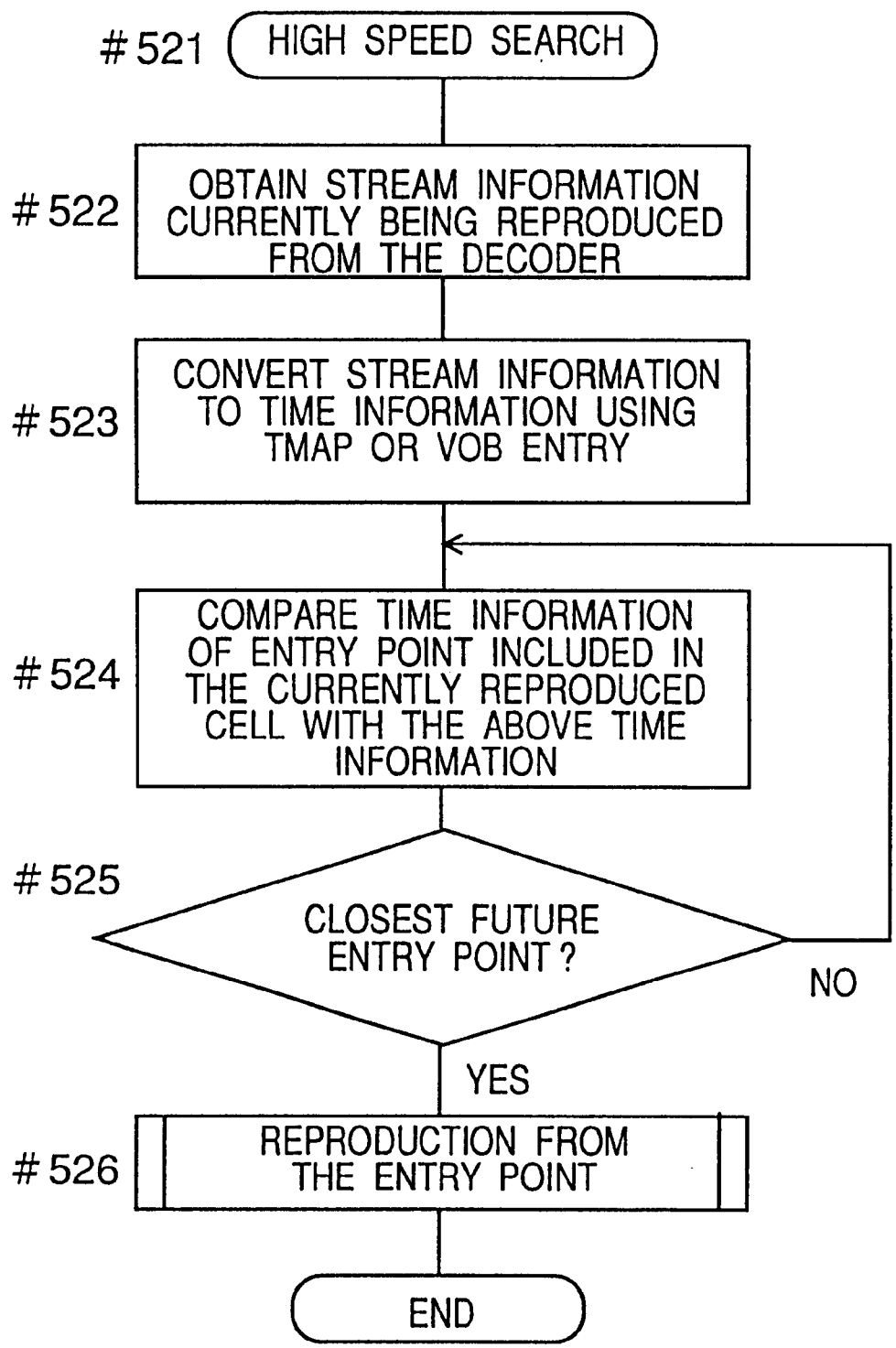
FIG. 52 is a flow chart of the high speed search operation described in FIG. 51.

A high speed search (entry point skip) operation using these entry points is described next with reference to FIGS. 46, 51, and 52.

When the system controller 7802 performs a high speed search (such as to skip commercials) during stream reproduction (FIG. 46), it compares the current playback time with the time at which an entry point is set, and searches for the closest future entry point from the current time. The system controller 7802 then converts the entry point resulting from this search to a VOB address, requests the drive 7808 to begin reading the bitstream from the disc based on this converted address information, and requests the decoder 7806 to decode and output the stream.

The drive 7808 thus reads the bitstream from DVD-RAM, and outputs the bitstream to the track buffer 7807. The decoder 7806 thus reads and decodes the bitstream from the track buffer, and outputs the decoded stream to the output section 7805. The output section 7805 then outputs the decoded video and audio to the display monitor and speakers.

The operation of the system controller during a high speed search using these entry points is described next with reference to FIG. 52. The system controller 7802 receives from a user or disc player a request to jump to the next entry point (#521). The system controller 7802 thus detects the address of the VOB currently being reproduced from the decoder 7806 (#522). The system controller 7802 converts the VOB address to a time to determine the current time (#523).

Next, the system controller 7802 obtains a table of entry points in the cell being reproduced, and compares the current time with the entry point times in the table to retrieve the closest future entry point from the current time (#524, #525). The system controller 7802 then jumps to and starts playback from the retrieved entry point according to the entry point playback procedure described above with reference to FIGS. 47, 48, and 49 (#526).

A DVD recorder can thus perform a high speed search such as one for skipping commercials by using entry points as described above.

Figure 53:
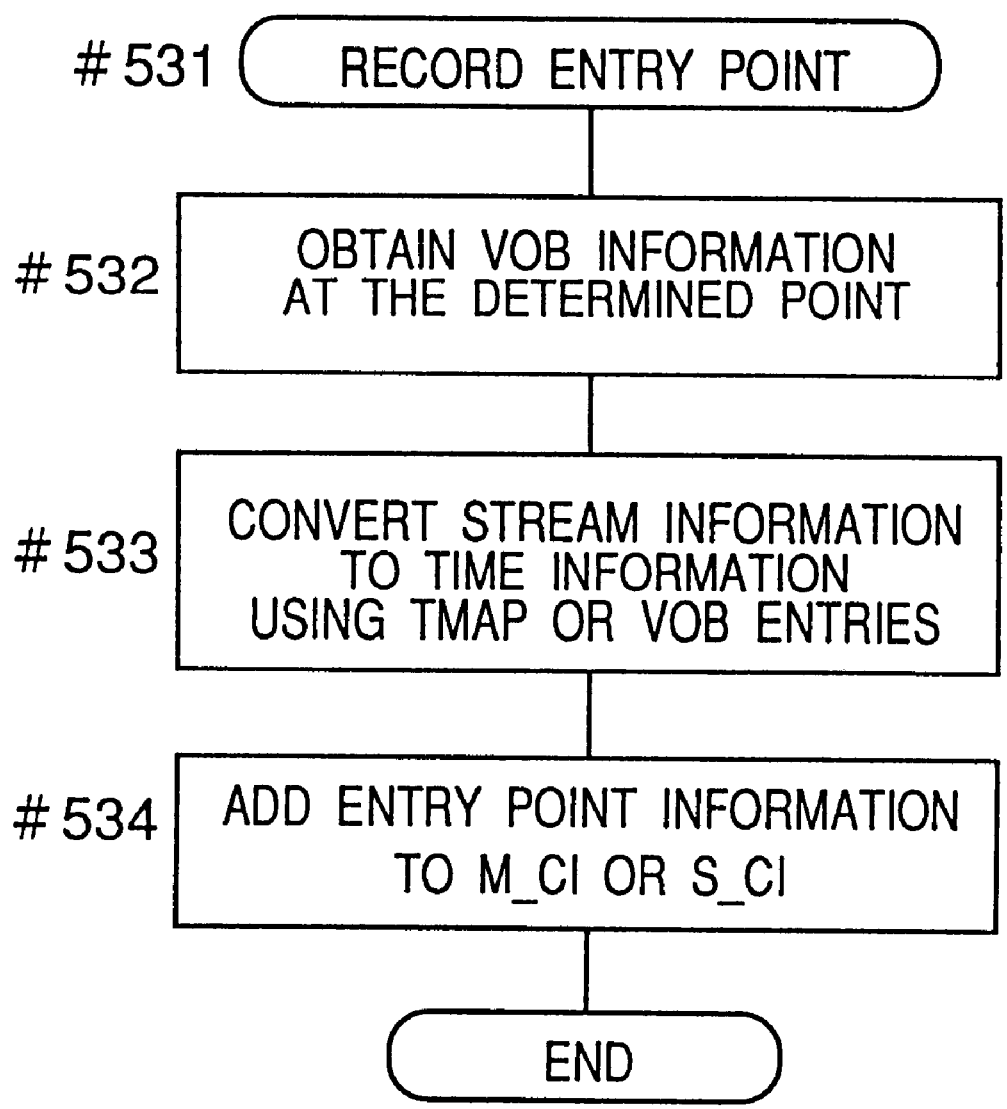
FIG. 53 is a flow chart of an entry point recording operation according to the present invention.

An entry point recording operation is described next below with reference to FIGS. 46 and 53.

When the user interface 7801 receives a user request to set an entry point at a particular time, it requests the system controller 7802 to perform an entry point setting process.

The system controller 7802 generates and stores a time at which to set an entry point in the movie cell M_Cell or still image cell S_Cell corresponding to the M_VOB or S_VOB in which the entry point is to be set.

If the entry point is to be set to a movie cell M_Cell, the system controller 7802 adds movie cell entry point information M_C_EPI to the corresponding movie cell information M_CI, and generates and stores the entry point type EP_TY and entry point time EP_PTM. If the entry point type is M_C_EPI Type B shown in FIG. 36, text information PRM_TXT is also generated and stored.

If the entry point is to be set to a still image cell S_Cell, the system controller adds still image entry point information S_C_EPI to the corresponding still image cell information S_CI, and generates and stores the entry point type EP_TY and stilt image VOB entry number S_VOB_ENTN. If the entry point type is S_C_EPI Type B shown in FIG. 36, text information PRM_TXT is also generated and stored.

The entry point information stored by the system controller 7802 is then recorded to the optical disc as part of the management information.

System controller operation for entry point recording is described next with reference to FIG. 53.

The system controller 7802 obtains the VOB address currently being reproduced or recorded from the decoder (during playback) or encoder (during recording) (#532).

Next, the system controller 7802 converts this VOB address information to time information or a specific still image number to detect the current time information or still image number information (#533). The TMAP information and VOB Entries information are continuously generated as necessary even during bitstream encoding. It is therefore possible to convert the detected VOB address information to time or image number information and obtain the current time or image number.

Finally, the system controller 7802 additionally records entry point information to the movie cell information M_CI or still image cell information S_CI corresponding to the M_VOB or S_VOB for which an entry point is to be set (#534). This results in entry point time EP_PTM being newly recorded to movie cell information M_CI, and still image VOB entry number S_VOB_ENTN, that is, the sequential still image number, being newly recorded to still image cell information S_CI. It should be noted that this recording step refers to the entry point information being temporarily stored by system controller 7802 and recorded to optical disc in the management information format.

A DVD recorder is thus enabled by the above described process to record entry points.

Screen Display

Figure 54:
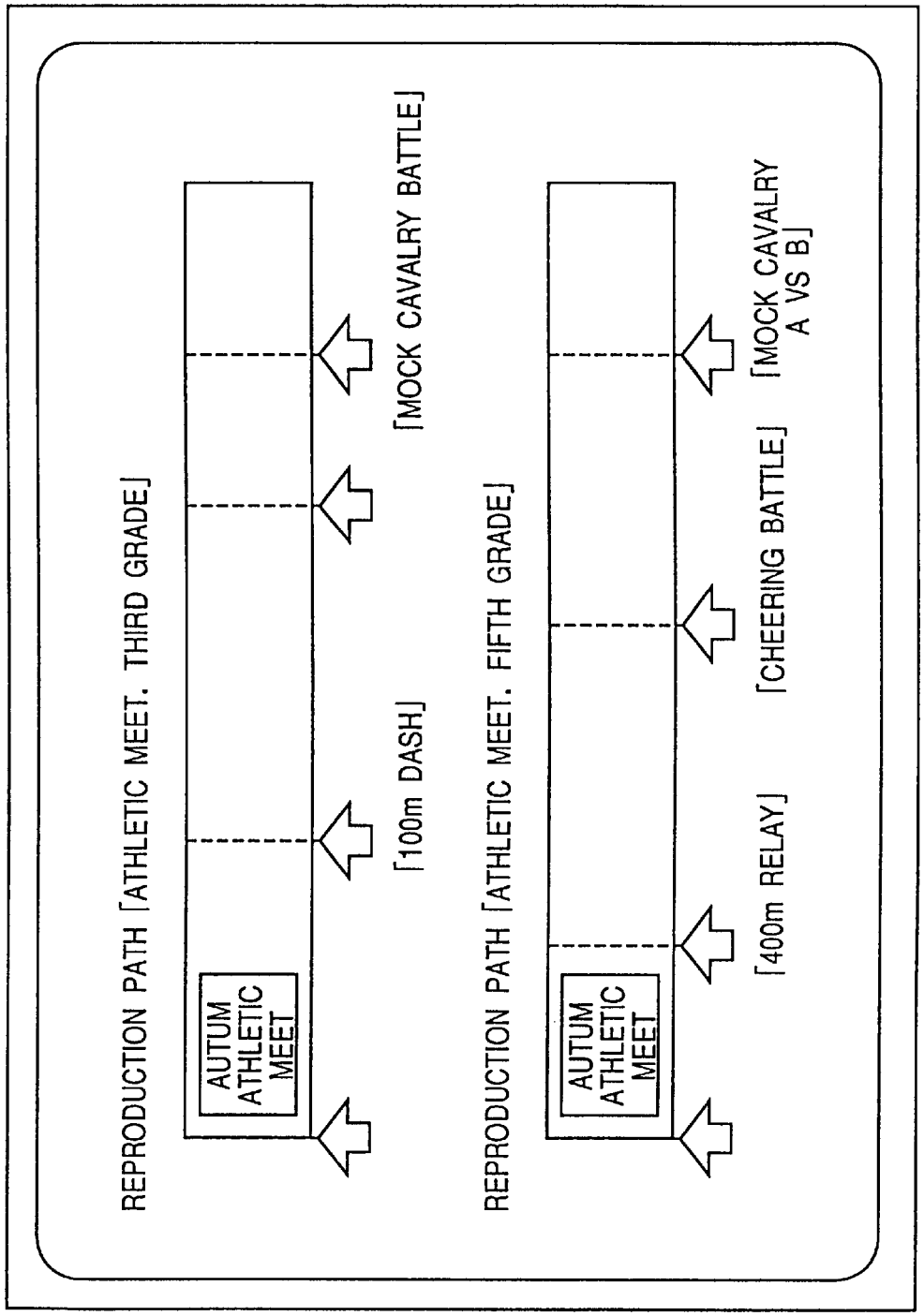
FIG. 54 is an exemplary display of entry points to a bitstream in a DVD recorder shown in FIG. 46.

FIG. 54 is used to describe a typical screen display using entry points.

Two reproduction paths are shown on screen, "third grade field day" and a separate "fifth grade field day," each having a plurality of entry points set therein. It is therefore possible for a user to select any one of plural entry points, each having logical meaning, from which to start playback so that playback in each case starts from a meaningful place in the bitstream.

If the entry point is of Type B, it is also possible to display text, such as "100 m sprint" or "rooting fans." In this case the user can select the playback starting point by referring not only to time information but also to text indicative of the bitstream content, thus making it even easier to select the point from which to start playback.

FIG. 55 shows a further exemplary screen display using information about the cells for which an entry point is set.

Information about the entry points recorded to the reproduction path is displayed on screen. The type of cell for which an entry point is set is indicated by the labels "M" for movie cell and "S" for still image cell. The user is thus able to know whether the image for which each entry point is set is a movie or still image.

It should be noted that the present invention has been described with reference to DVD-RAM media. It will be also obvious, however, that entry points can be similarly set using other types of media, and the present invention shall therefore not be limited to DVD-RAM discs or even to optical discs.

It should be noted that movie VOBs and still image VOBs are recorded to AV files separately from other VOBs in the preferred embodiment described above, but these can also be recorded with other types of VOBs to the same AV file.

In addition, the present invention shall not be limited to the AV file structure described above.

Benefits of the Invention

An optical disc or other random access capable data storage medium for recording at least moving picture data is recorded with information about a plurality of reproduction paths for each of which is recorded a plurality of entry points.

It is therefore possible to use a plurality of entry points for each reproduction path, and thereby achieve random accessibility, a feature of disc media that tape media does not have, in each of a plurality of reproduction paths each having logical meaning.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An optical disc for recording a program stream of audio-visual content, original program management information for managing reproduction of the program stream, play list management information for managing reproduction of at least a part of the program stream, and a number-address conversion table, wherein the program stream and the part of the program stream, each contains a plurality of still images, each of the plurality of still images having a data size, the original program management information containing:

first start number information representing a start number of a still image from which a reproduction of an original program starts;

first end number information representing an end number of a still image at which the reproduction of the original program ends; and first entry point information to be set for the program stream for arbitrary access and reproduction, the first entry point information comprising first number information representing a number of a still image contained within the program stream, the play list management information containing:

second start number information representing a start number of a still image from which a reproduction of the part of the program stream starts;

second end number information representing an end number of a still image at which the reproduction of the part of the program stream ends; and second entry point information to be set for the part of the program stream for arbitrary access and reproduction, the second entry point information comprising second number information representing a number of a still image contained within the part of the program stream, and the number-address conversion table defining a relationship between the number of the still image and the data size of the still image to convert between the number of the still image and an address on the optical disc for the still image.

2. An optical disc as described in claim 1, wherein the program stream and the part of the program stream, each further contains a moving picture, the original program management information further containing:

first start time information representing a start time of the moving picture from which the reproduction of the original program starts; and first end time information representing an end time of the moving picture at which the reproduction of the original program ends, the first entry point information further comprising first time information representing time at which the moving picture contained in the original program is reproduced, the play list management information further containing:

second start time information representing a start time of the moving picture from which the reproduction of the part of the program stream starts;

second end time information representing an end time of the moving picture at which the reproduction of the part of the program stream ends, the second entry point information further comprising second time information representing time at which the moving picture contained in the part of the program stream is reproduced, and the optical disc is further recorded with a time-address conversion table which defines a relationship between reproduction time and an address on the optical disc for the moving picture, to convert between the reproduction time and the address for the moving picture, wherein the original program management information and the play list management information each comprises cell type information indicating whether a cell, which is provided for defining the program stream and the part of the program stream, carries data for at least one of a moving picture and still images.

3. An optical disc as described in claim 1, wherein at least one of the first and second entry point information further comprises text information representing contents of the respective at least one of the first and second entry point information.

4. An optical disc as described in claim 3, wherein at least one of the first and second entry point information comprises entry point type information indicating the presence or absence of the text information.

5. An optical disc as described in claim 1, wherein the play list management information comprises, for each of a plurality of parts of the program stream, the second start number information, the second end number information and the second entry point information.

6. An optical disc player for reproducing an optical disc for recording a program stream of audio-visual content, original program management information for managing reproduction of the program stream, play list management information for managing reproduction of at least a part of the program stream, and a number-address conversion table, wherein the program stream and the part of the program stream, each contains a plurality of still images, each of the plurality of still images having a data size, the original program management information containing first start number information representing a start number of a still image from which a reproduction of an original program starts, first end number information representing an end number of a still image at which the reproduction of the original program ends and first entry point information to be set for the program stream for arbitrary access and reproduction, the first entry point information comprising first number information representing a number of a still image contained within the program stream, the play list management information containing second start number information representing a start number of a still image from which a reproduction of the part of the program stream starts, second end number information representing an end number of a still image at which the reproduction of the part of the program stream ends and second entry point information to be set for the part of the program stream for arbitrary access and reproduction, the second entry point information comprising second number information representing a number of a still image contained within the part of the program stream, and the number-address conversion table defining a relationship between the number of the still image and the data size of the still image to convert between the number of the still image and an address on the optical disc for the still image, said optical disc player comprising:

reading/storage means for reading and storing at least one of the first entry point information and the second entry point information from the optical disc;

a decoder for decoding the program stream and generating address information during program stream reproduction;

conversion means for converting the address information to point information in the program stream;

selection means for selecting entry point information closest to the point information;

conversion means for converting the selected entry point information to address information using the number-address conversion table; and drive means for jumping to a location on based on the converted address information, wherein the decoder decodes and reproduces the program stream from the location jumped to by said drive means.

7. An optical disc player as described in claim 6, wherein the point information is time information when the program stream is moving picture content.

8. An optical disc player as described in claim 6, wherein the point information is still image number information when the program stream is still image content.

9. An optical disc player as described in claim 6, wherein the entry point information further comprises text information, and said decoder further reproduces the text information.

10. An optical disc playback method for playing back an optical disc for recording a program stream of audio-visual content, original program management information for managing reproduction of the program stream, play list management information for managing reproduction of at least a part of the program stream, and a number-address conversion table, wherein the program stream and the part of the program stream, each contains a plurality of still images, each of the plurality of still images having a data size, the original program management information containing first start number information representing a start number of a still image from which a reproduction of an original program starts, first end number information representing an end number of a still image at which the reproduction of the original program ends and first entry point information to be set for the program stream for arbitrary access and reproduction, the first entry point information comprising first number information representing a number of a still image contained within the program stream, the play list management information containing second start number information representing a start number of a still image from which a reproduction of the part of the program stream starts, second end number information representing an end number of a still image at which the reproduction of the part of the program stream ends and second entry point information to be set for the part of the program stream for arbitrary access and reproduction, the second entry point information comprising second number information representing a number of a still image contained within the part of the program stream, and the number-address conversion table defining a relationship between the number of the still image and the data size of the still image to convert between the number of the still image and an address on the optical disc for the still image, said optical disc playback method comprising:

reading and storing at least one of the first entry point information and the second entry point information from the optical disc;

decoding the program stream and generating address information during program stream reproduction;

converting the address information to point information in the program stream using the number-address conversion table;

selecting entry point information closest to the point information;

converting the selected entry point information to address information;

jumping to a location based on the converted address information; and decoding and reproducing the program stream from the location jumped to in said jumping operation.

11. An optical disc recorder for recording to an optical disc for recording a program stream of audio-visual content, original program management information for managing reproduction of the program stream, play list management information for managing reproduction of at least a part of the program stream, and a number-address conversion table, wherein the program stream and the part of the program stream, each contains a plurality of still images, each of the plurality of still images having a data size, the original program management information containing first start number information representing a start number of a still image from which a reproduction of an original program starts, first end number information representing an end number of a still image at which the reproduction of the original program ends and first entry point information to be set for the program stream for arbitrary access and reproduction, the first entry point information comprising first number information representing a number of a still image contained within the program stream, the play list management information containing second start number information representing a start number of a still image from which a reproduction of the part of the program stream starts, second end number information representing an end number of a still image at which the reproduction of the part of the program stream ends and second entry point information to be set for the part of the program stream for arbitrary access and reproduction, the second entry point information comprising second number information representing a number of a still image contained within the part of the program stream, and the number-address conversion table defining a relationship between the number of the still image and the data size of the still image to convert between the number of the still image and an address on the optical disc for the still image, said optical disc recorder comprising:

an interface for receiving entry point information input;

means for generating address information at the time the entry point information is received;

a conversion means for converting the address information to at least one of the first entry point information and the second entry point information in the program stream using the number-address conversion table;

a storage means for temporarily storing the at least one of the first entry point information and the second entry point information; and a drive means for recording the stored at least one of the first entry point information and the second entry point information to the optical disc.

12. An optical disc recorder as described in claim 11, wherein the first entry point information and the second entry point information are still image number information.

13. An optical disc recorder as described in claim 11, wherein at least one of the first entry point information and the second entry point information further comprises text information, and said storage means generates and stores the text information.

14. An optical disc recorder as described in claim 11, wherein the first entry point information and the second entry point information further comprise time information when the audio-visual content further comprises a moving picture.

15. An optical disc recording method for recording to the optical disc for recording a program stream of audio-visual content, original program management information for managing reproduction of the program stream, play list management information for managing reproduction of at least a part of the program stream, and a number-address conversion table, wherein the program stream and the part of the program stream, each contains a plurality of still images, each of the plurality of still images having a data size, the original program management information containing first start number information representing a start number of a still image from which a reproduction of an original program starts, first end number information representing an end number of a still image at which the reproduction of the original program ends and first entry point information to be set for the program stream for arbitrary access and reproduction, the first entry point information comprising first number information representing a number of a still image contained within the program stream, the play list management information containing second start number information representing a start number of a still image from which a reproduction of the part of the program stream starts, second end number information representing an end number of a still image at which the reproduction of the part of the program stream ends and second entry point information to be set for the part of the program stream for arbitrary access and reproduction, the second entry point information comprising second number information representing a number of a still image contained within the part of the program stream, and the number-address conversion table defining a relationship between the number of the still image and the data size of the still image to convert between the number of the still image and an address on the optical disc for the still image, said optical disc recording method comprising:

receiving entry point information input;

generating address information at a time the entry point information is received;

converting the address information to at least one of the first entry point information and the second entry point information in the program stream using the number-address conversion table;

temporarily storing the at least one of the first entry point information and the second entry point information; and recording the stored at least one of the first entry point information and the second entry point information to the optical disc.

* * * * *